(12) United States Patent
Yashiro et al.

(10) Patent No.: US 11,754,901 B2
(45) Date of Patent: Sep. 12, 2023

(54) ELECTROCHROMIC DEVICE, WEARABLE DEVICE, AND METHOD FOR DRIVING ELECTROCHROMIC DEVICE

(71) Applicant: Ricoh Company, Ltd., Tokyo (JP)

(72) Inventors: Tohru Yashiro, Kanagawa (JP); Keiichiroh Yutani, Kanagawa (JP); Fuminari Kaneko, Kanagawa (JP); Tohru Hasegawa, Kanagawa (JP); Naoki Ura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 651 days.

(21) Appl. No.: 16/820,271

(22) Filed: Mar. 16, 2020

(65) Prior Publication Data

US 2020/0301226 A1  Sep. 24, 2020

(30) Foreign Application Priority Data

Mar. 20, 2019 (JP) ................................. 2019-053781
Feb. 20, 2020 (JP) ................................. 2020-027317

(51) Int. Cl.
*G02F 1/15* (2019.01)
*G02B 26/00* (2006.01)
(Continued)

(52) U.S. Cl.
CPC ............. *G02F 1/155* (2013.01); *G02C 7/101* (2013.01); *G02F 1/1508* (2013.01); *G02F 1/163* (2013.01)

(58) Field of Classification Search
CPC ...... G02F 1/155; G02F 1/1523; G02F 1/1525; G02F 1/1521; G02F 1/1533; G02F 1/03;
(Continued)

(56) References Cited

U.S. PATENT DOCUMENTS 4,801,195 A * 1/1989 Kawai .................. G02F 1/1525
                                                        359/275
8,384,983 B2  2/2013 Yashiro et al.
(Continued)

FOREIGN PATENT DOCUMENTS

JP   60-242428 A   12/1985
JP      2503519    4/1996
(Continued)

OTHER PUBLICATIONS

Extended European Search Report dated May 28, 2020 in European Patent Application No. 20162730.4, citing documents AA and AO-AR therein, 13 pages.

*Primary Examiner* — Dawayne Pinkney
(74) *Attorney, Agent, or Firm* — XSENSUS LLP

(57) ABSTRACT

Electrochromic device including: first electrode; a first auxiliary electrode; a second electrode; a second auxiliary electrode having average distance of 100 mm or less with the first auxiliary electrode; an electrochromic layer; a solid electrolyte layer; and controlling unit configured to control to apply voltage according to a driving pattern that is at least one selected from the group consisting of a first driving pattern, a second driving pattern, and an initialization driving pattern, wherein the first driving pattern is a driving pattern configured to turn the electrochromic layer into first coloring state, the second driving pattern is a driving pattern configured to turn the first coloring state into a second coloring state that has coloring density lower than coloring density of the first coloring state, and the initialization driving pattern is driving pattern for forming an initial decolored state.

13 Claims, 13 Drawing Sheets

(51) Int. Cl.
*G02F 1/1503* (2019.01)
*G09G 3/19* (2006.01)
*F21V 14/00* (2018.01)
*G02F 1/155* (2006.01)
*G02C 7/10* (2006.01)
*G02F 1/1506* (2019.01)
*G02F 1/163* (2006.01)

(58) Field of Classification Search
CPC .......... G02F 1/0316; G02F 3/16; G02F 1/163; C09K 9/02; B60R 1/088; H04N 9/3137; H04N 9/22
USPC ........ 359/265–275, 277, 245–247, 242, 254; 345/49, 105; 250/70; 348/817; 438/929
See application file for complete search history.

(56) References Cited

U.S. PATENT DOCUMENTS

| | | | |
|---|---|---|---|
| 8,531,754 B2 | 9/2013 | Fujimura et al. | |
| 8,593,715 B2 | 11/2013 | Yashiro et al. | |
| 8,687,262 B2 | 4/2014 | Yashiro et al. | |
| 8,736,941 B2 | 5/2014 | Yashiro et al. | |
| 8,902,151 B2 | 12/2014 | Yashiro et al. | |
| 8,937,758 B2 | 1/2015 | Kim et al. | |
| 9,041,997 B2 | 5/2015 | Takahashi et al. | |
| 9,069,222 B2 | 6/2015 | Naijo et al. | |
| 9,304,368 B2 | 4/2016 | Yashiro et al. | |
| 9,389,480 B2 | 7/2016 | Naijo et al. | |
| 9,500,926 B2 | 11/2016 | Fujimura et al. | |
| 9,632,385 B2 | 4/2017 | Okada et al. | |
| 9,688,706 B2 | 6/2017 | Inoue et al. | |
| 9,829,762 B2 | 11/2017 | Takahashi et al. | |
| 9,891,497 B2 | 2/2018 | Yashiro et al. | |
| 9,932,522 B2 | 4/2018 | Goto et al. | |
| 10,012,885 B2 | 7/2018 | Okada et al. | |
| 10,054,834 B2 | 8/2018 | Shinoda et al. | |
| 10,093,693 B2 | 10/2018 | Sagisaka et al. | |
| 10,126,623 B2 | 11/2018 | Goto et al. | |
| 10,139,692 B2 * | 11/2018 | Kim | G02F 1/13439 |
| 10,281,793 B2 | 5/2019 | Ohshima et al. | |
| 10,495,937 B2 | 12/2019 | Yashiro et al. | |
| 10,527,905 B2 | 1/2020 | Kaneko et al. | |
| 2009/0103036 A1 | 4/2009 | Onodera et al. | |
| 2009/0231663 A1 | 9/2009 | Hirano et al. | |
| 2009/0256157 A1 | 10/2009 | Kondo et al. | |
| 2010/0193775 A1 | 8/2010 | Yutani et al. | |
| 2012/0050838 A1 | 3/2012 | Hirano et al. | |
| 2015/0002919 A1 * | 1/2015 | Jack | G02F 1/1533 359/275 |
| 2015/0168796 A1 | 6/2015 | Yashiro et al. | |
| 2016/0005375 A1 | 1/2016 | Naijo et al. | |
| 2016/0209721 A1 * | 7/2016 | Matsumoto | G02F 1/155 |
| 2017/0235203 A1 | 8/2017 | Yamamoto et al. | |
| 2017/0329198 A1 | 11/2017 | Matsuoka et al. | |
| 2017/0329199 A1 | 11/2017 | Yashiro et al. | |
| 2018/0017835 A1 | 1/2018 | Kim et al. | |
| 2018/0044581 A1 | 2/2018 | Sagisaka et al. | |
| 2018/0173070 A1 | 6/2018 | Yamamoto et al. | |
| 2018/0231857 A1 | 8/2018 | Kim et al. | |
| 2018/0314125 A1 | 11/2018 | Goto et al. | |
| 2019/0011794 A1 | 1/2019 | Lee et al. | |
| 2019/0031694 A1 | 1/2019 | Sagisaka et al. | |
| 2019/0184694 A1 | 6/2019 | Yashiro et al. | |
| 2019/0212625 A1 * | 7/2019 | Lee | G02F 1/1525 |
| 2019/0227401 A1 | 7/2019 | Yutani et al. | |
| 2019/0285960 A1 | 9/2019 | Sasa et al. | |
| 2019/0310530 A1 | 10/2019 | Kaneko et al. | |
| 2019/0324338 A1 | 10/2019 | Takauji et al. | |

FOREIGN PATENT DOCUMENTS

| | | |
|---|---|---|
| JP | 09-211497 | 8/1997 |
| JP | 2696827 | 9/1997 |
| JP | 10-063216 | 3/1998 |
| JP | 2011-248191 A | 12/2011 |
| JP | 2016-218364 | 12/2016 |
| JP | 2016-218437 A | 12/2016 |
| WO | WO 00/77559 A1 | 12/2000 |

\* cited by examiner

ELECTROCHROMIC DEVICE, WEARABLE DEVICE, AND METHOD FOR DRIVING ELECTROCHROMIC DEVICE

CROSS-REFERENCE TO RELATED APPLICATIONS

The present application claims priority under 35 U.S.C. § 119 to Japanese Patent Application No. 2019-053781 filed Mar. 20, 2019 and Japanese Patent Application No. 2020-027317 filed Feb. 20, 2020. The contents of which are incorporated herein by reference in their entirety.

BACKGROUND OF THE INVENTION

Field of the Invention

The present disclosure relates to an electrochromic device, a wearable device, and a method for driving an electrochromic device.

Description of the Related Art

Electrochromism is a phenomenon where redox reactions are preformed reversibly to reversibly change a color as voltage is applied. Devices utilizing the electrochromism are electrochromic devices. Since the electrochromic devices are applicable for various use, many researches have been conducted on the electrochromic devices.

Examples of an electrochromic material used for the electrochromic devices include organic materials and inorganic materials. Since an electrochromic device using an organic material can express various colors owing a molecular structure thereof, the electrochromic device is used as a color display device. Meanwhile, an electrochromic device using an inorganic material is applied for dimming glass or an anti-glare mirror, as application using low chroma saturation as an advantage.

In the electrochromic device, for example, an electrochromic material is formed between two electrodes facing each other, and redox reactions are performed in a state where an electrolyte layer capable of ion conduction fills the space between the electrodes. As the electrodes, a transparent electrode is often used as at least one of the electrodes in order to visually recognize colors.

Since electrochromism is an electrochemical phenomenon, the performance (e.g., ion conduction) of the electrolyte layer affects a response speed or a memory effect of coloring. In the case where the electrolyte layer is a liquid where an electrolyte is dissolved in a solvent, fast responsiveness is easily obtained. However, improvements through solidification or gelation have been studied in view of strength and reliability of an element.

For the purpose of improving responsiveness, moreover, known is a technique of an electrochromic device where voltage higher than original driving voltage is applied for a short period at the time when voltage is initially applied (see, for example, Japanese Unexamined Patent Application Publication Nos. 2016-218364 and 09-211497).

The present disclosure has an object to provide an electrochromic device having high responsiveness and uniformity of coloring density when coloring and decoloring driving is performed, has high strength and safety against externally applied impacts, has excellent durability when the electrochromic device is continuously driven over a long period of time, and can keep electricity consumption thereof low.

SUMMARY OF THE INVENTION

According to one aspect of the present disclosure, an electrochromic device includes a first electrode, a first auxiliary electrode formed to be in contact with the first electrode, a second electrode, a second auxiliary electrode formed to be in contact with the second electrode and to have an average distance of 100 mm or less with the first auxiliary electrode, an electrochromic layer formed to be in contact with the first electrode, or the second electrode, or both, but not to be in contact with the first auxiliary electrode and the second auxiliary electrode, a solid electrolyte layer formed to be in contact with at least one selected from the group consisting of the first electrode, the second electrode, and the electrochromic layer, but not to be in contact with the first auxiliary electrode and the second auxiliary electrode, and a controlling unit configured to control to apply voltage to the electrochromic layer with the first electrode and the second electrode according to a driving pattern that is at least one selected from the group consisting of a first driving pattern, a second driving pattern, and an initialization driving pattern. The first driving pattern is a driving pattern configured to turn the electrochromic layer into a first coloring state, and the first driving pattern is a driving pattern configured to apply a first voltage pulse A for increasing a response speed of the electrochromic layer, to apply a first voltage pulse B for forming the first coloring state where the first voltage pulse B is lower than the first voltage pulse A, and then to maintain a state where voltage is not applied. The second driving pattern is a driving pattern configured to turn the first coloring state into a second coloring state that has coloring density lower than coloring density of the first coloring state, and the second driving pattern is a driving pattern configured to apply a second voltage pulse A for increasing a response speed of the electrochromic layer, to apply a second voltage pulse B for forming the second coloring state where the second voltage pulse B is higher than the second voltage pulse A or has reverse polarity to the polarity of the second voltage pulse A, and then to maintain a state where voltage is not applied. The initialization driving pattern is a driving pattern configured to form an initial decolored state, and the initialization driving pattern is a driving pattern configured to apply initialization voltage pulse A that has reverse polarity to the polarity of the first voltage pulse A and is for increasing a response speed of the electrochromic layer, and then to apply initialization voltage pulse B that is for forming an initial decolored state and makes potential of the electrochromic layer substantially 0 V, or to cause a short-circuit.

Figure 1:
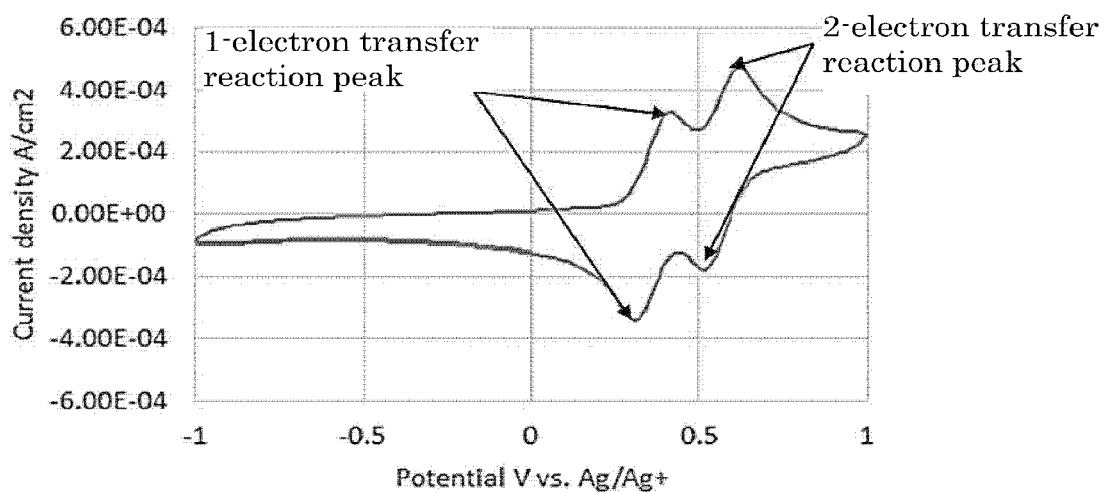
FIG. 1 is a graph depicting an amperage of one example of an electrochromic material capable of carrying out a two-electron transfer reaction, measured by means of a potentiostat.

DESCRIPTION OF THE EMBODIMENTS (Electrochromic Device and Method for Driving Electrochromic Device)

The electrochromic device of the present disclosure includes a first electrode, a first auxiliary electrode, a second electrode, a second auxiliary electrode, an electrochromic layer, a solid electrolyte layer, and a controlling unit. The electrochromic device preferably further includes a measuring unit, a support, a protective layer, and an antidegradation layer. The electrochromic device may further include other units according to the necessity.

The method for driving an electrochromic device of the present disclosure includes a controlling step. The controlling step includes controlling to apply voltage to an electrochromic layer of an electrochromic device according to a specific driving pattern, where the electrochromic device includes a first electrode, a first auxiliary electrode, a second electrode, a second auxiliary electrode, the electrochromic layer, and a solid electrolyte layer. The method preferably further includes a measuring step, and may further include other steps according to the necessity.

The method for driving an electrochromic device of the present disclosure can be suitably performed by the electrochromic device of the present disclosure.

Specifically, the method for driving an electrochromic device of the present disclosure is performed by the electrochromic device of the present disclosure. Therefore, details of the method for driving an electrochromic device of the present disclosure will be described through descriptions of the electrochromic device of the present disclosure.

Moreover, the electrochromic device of the present disclosure has been accomplished based on the following insights. That is, an electrochromic device in the related art has low responsiveness and uniformity of coloring density when coloring and decoloring thereof are performed, and has low strength and safety against externally applied impacts, and therefore, the electrochromic device of the related art has a problem in durability at the time of continuous driving over a long period of time, and may have high electricity consumption.

The electrochromic device is driven to color or decolor by applying voltage between the electrodes to inject charge into or release charge from the electrochromic layer used for a redox reaction. When the size of the electrochromic device is large, voltage is dropped due to an electric resistance vale of the transparent electrode. Therefore, coloring density is low in a region far from the electrode contact section (area in contact with the electrode) and density unevenness may be formed. Accordingly, a method for reducing density unevenness through formation of an electric resistance distribution for correction on a surface of the transparent electrode, or formation of a metal auxiliary electrode has been studied. However, such a method has a problem that transparency of the electrochromic device is not sufficient to reduce visibility.

As described above, moreover, a known technique for improving responsiveness of an electrochromic device is a technique for applying voltage higher than original driving voltage for a short period at the time when voltage is started to be applied, disclosed in Japanese Unexamined Patent Application Publication Nos. 2016-218364 and 09-211497.

In an electrochromic device using an electrolytic solution having excellent ionic conductivity (e.g., an ionic liquid, and a solution prepared by dissolving an electrolyte in a solvent), however, ions tend to move in a direction along a surface of an electrolyte layer (horizontal direction), as well as a direction between electrodes (vertical direction). Therefore, there has been a problem that only about the voltage-allied contact area (around the electrode) responds quickly to cause density unevenness, and it is difficult to improve response the electrochromic device as a whole. Moreover, there is a problem that ions are not easily diffused in an electrochromic device including a solid electrolyte layer that suppresses ion diffusion in the direction along the surface of the electrolyte layer (horizontal direction), and therefore the electrochromic layer tends to be deteriorated when the electrochromic device is continuously driven over a long period of time.

Moreover, wearable devices have recently attracted attentions as use of electrochromic devices for the next generation, and developments of wearable devices have been conducted. It is important for a battery used for a wearable device to be light and small in view of safety. Therefore, a wearable device is preferably a device that can be driven with low power. Since a wearable device is worn at the time of use, moreover, high safety thereof is important compared with other use of the electrochromic device.

The electrochromic device of the present disclosure includes a first electrode, a first auxiliary electrode, a second electrode, a second auxiliary electrode, an electrochromic layer, a solid electrolyte layer, and a controlling unit.

In the electrochromic device of the present disclosure, the electrolyte layer is a solid. Therefore, the electrochromic device has high mechanical strength against externally applied impacts, etc., and does not cause a problem, such as leakage of a liquid. The electrochromic device therefore has high safety.

Since the electrolyte layer is a solid, moreover, the electrochromic device has an memory effect where a colored state or a decolored state is maintained for a certain period even when a power source is turned off (voltage is not applied), and can maintain coloring density with intermittent application of voltage, such as a first driving pattern and a second driving pattern. Accordingly, the electrochromic device of the present disclosure can keep electricity consumption low, prevent deterioration of the electrochromic layer that is caused by continuous application of voltage, and can improve durability.

In addition, the second auxiliary electrode is formed in the electrochromic device of the present disclosure in a manner that an average distance between the second auxiliary electrode and the first auxiliary electrode is to be 100 mm or less. Specifically, the electrochromic device of the present disclosure can efficiently and uniformly conduct (diffuse) ions because the average distance between the auxiliary electrodes is 100 mm or less, and the electrochromic device includes a solid electrolyte layer. Therefore, uniformity of coloring density can be improved when the electrochromic device is driven to color and decolor.

In the electrochromic device of the present disclosure moreover, the electrochromic layer is formed to be in contact with the first electrode, or the second electrode, or both, and is formed not to be in contact with the first auxiliary electrode and the second auxiliary electrode. In the electrochromic device of the present disclosure, similarly, the solid electrolyte layer is formed to be in contact with at least one selected from the group consisting of the first electrode, the second electrode, and the electrochromic layer, and is formed not to be in contact with the first auxiliary electrode and the second auxiliary electrode. In other words, the first auxiliary electrode and the second auxiliary electrode are formed not to be in contact with the electrochromic layer and the solid electrolyte layer. Owing to the configuration as mentioned above, deterioration of the electrochromic layer due to electrochemical reactions can be prevented even when both the first auxiliary electrode and the second auxiliary electrode are formed of materials that are easily ionized, such as wiring materials (metal materials).

Moreover, the controlling unit of the electrochromic device of the present disclosure is configured to control to apply voltage according to at least one selected from the group consisting of the first driving pattern, the second driving pattern, and the initialization driving pattern. Since voltage pulse for increasing a response speed of the electrochromic layer is applied according to any of the above-mentioned driving patterns, responsiveness of the electrochromic layer can be improved when the electrochromic device is driven to color or decolor.

The first driving pattern for turning the electrochromic layer into the first coloring state (state where coloring density is high) and the second driving pattern for turning the electrochromic layer into the second coloring state (state where coloring density is low) include a pattern for maintaining a state where voltage is not applied (open-circuit state). Therefore, the electrochromic device of the present disclosure can suppress electricity consumption, and prevents deterioration of the electrochromic layer caused by continuous application of voltage, and therefore, durability of the electrochromic device can be improved.

<First Electrode and Second Electrode>

A material of each of the first electrode and the second electrode is not particularly limited and may be appropriately selected depending on the intended purpose. The material thereof is preferably a transparent conductive oxide material. Examples thereof include tin-doped indium oxide (referred to as "ITO" hereinafter), fluorine-doped tin oxide (referred to as "FTO" hereinafter), and antimony-doped tin oxide (referred to as "ATO" hereinafter). The above-listed materials may be used alone or in combination. Among the above-listed examples, preferred is an inorganic material including at least one of indium oxide (referred to as "ITO" hereinafter), tin oxide (referred to as "Sn oxide" hereinafter), and zinc oxide (referred to as "Zn oxide" hereinafter) formed by a vacuum film formation method.

In oxide, Sn oxide, and Zn oxide are materials that can be easily formed into films by sputtering, and are materials that can provide desirable transparency and electrical conductivity. Among the above-listed examples, a composition including InSnO, GaZnO, SnO, InO, ZnO, InZnO, or InZrO is particularly preferable.

Moreover, the material of the first electrode and the material of the second electrode are each preferably a transparent conductive metal thin film including silver, gold, copper, or aluminium, a carbon film of carbon nanotubes or graphene, a network electrode of conductive metal, conductive carbon, and conductive oxide, or a composite thereof.

The network electrode is an electrode obtained by forming carbon nanotubes or another highly conductive non-transparent material into a fine network to give transmittance. Moreover, the electrode layer more preferably has a laminate structure where the network electrode and the conductive oxide are laminated, or a laminate structure where the conductive metal thin film and the conductive oxide are laminated. Use of the laminate structure can color the electrochromic layer without unevenness.

Note that, the conductive oxide layer can be formed by applying a nano-particle ink through coating. The laminate structure where the conductive metal thin film and the conductive oxide are laminated is specifically a thin film laminate structure of ITO/Ag/ITO etc., which is an electrode achieving both conductivity and transparency. The above-mentioned electrode materials are used as long as a degree of reduction in visibility by the materials is acceptable.

An average thickness of the first electrode and an average thickness of the second electrode are not particularly limited and may be appropriately selected depending on the intended purpose. The average thickness of the first electrode and the average thickness of the second electrode are preferably adjusted to obtain an electric resistance value required for a redox reaction of the electrochromic layer. Specifically, in the case where ITO films formed by vacuum formation are used as the first electrode and the second electrode, the average thickness of the first electrode and the average thickness of the second electrode are preferably 20 nm or greater but 500 nm or less, and more preferably 50 nm or greater but 200 nm or less.

When the conductive oxide layer is formed by applying a nano-particle ink, an average thickness of the conductive oxide layer is preferably 0.2 µm or greater but 5 µm or less. Moreover, an average thickness of the network electrode is preferably 0.2 µm or greater but 5 µm or less.

In the case where the electrochromic device is used as a dimming mirror, moreover, either the first electrode or the second electrode may have a structure having a reflection function. In this case, a metal material is preferably included as a material of the first electrode or the second electrode. Examples of the metal material include Pt, Ag, Au, Cr, rhodium, Al, alloys of the foregoing metals, laminate structures of the foregoing metals, and laminate structures of metal oxides of the foregoing metals having excellent durability without causing electrochemical reactions.

Materials or average thicknesses of the first electrode and the second electrode may be identical or different from each other.

A production method of the first electrode and the second electrode is not particularly limited and may be appropriately selected depending on the intended purpose. Examples thereof include vacuum vapor deposition, sputtering, and ion plating. Examples of a method for forming an electrode through application of a material of each of the first electrode and the second electrode include spin coating, casting, microgravure coating, gravure coating, bar coating, roll coating, wire bar coating, clip coating, slit coating, capillary coating, spray coating, nozzle coating, and various printing methods, such as gravure printing, screen printing, flexographic printing, offset printing, reverse printing, and inkjet printing.

<First Auxiliary Electrode and Second Auxiliary Electrode>

The first auxiliary electrode is formed to be in contact with the first electrode.

The second auxiliary electrode is formed to be in contact with the second electrode and to have an average distance of 100 mm or less with the first auxiliary electrode. In other words, an average distance between the first auxiliary electrode and the second auxiliary electrode is 100 mm or less. According to the configuration as mentioned, unevenness in coloring density of the electrochromic layer can be prevented and uniformity of coloring density can be improved, when the electrochromic device is driven to color and decolor.

A plane shape of the first auxiliary electrode and a plane shape of the second auxiliary electrode are not particularly limited and may be appropriately selected depending on the intended purpose. Examples thereof include straight line shapes, curved line shapes, and dot shapes. In the case where the electrochromic device is used as dimming spectacles (dimming sun glasses) or a dimming filter, the plane shapes of the first auxiliary electrode and the second auxiliary electrode are preferably shapes corresponding to the shape of the electrochromic device.

In the case where the electrochromic device of the present disclosure is used as dimming spectacles, for example, the plane shapes of the first auxiliary electrode and the second auxiliary electrode are preferably selected depending on a shape of each lens (e.g., a shape of an electrochromic layer) in the dimming spectacles. In the case where a shape of each lens in the dimming spectacles is an oval, for example, the plane shapes of the first auxiliary electrode and the second auxiliary electrode are preferable shapes where the first auxiliary electrode and the second auxiliary electrode face each other along the circumferential shape of the lens. In the case where the dimming spectacles are of frame-less (no rims), moreover, the plane shapes of the first auxiliary electrode and the second auxiliary electrode are preferably dot shapes in the size with which functions as auxiliary electrodes can be obtained.

In the present specification, the average distance between the first auxiliary electrode and the second auxiliary electrode means an average gap (e.g., average distance between facing edges) of the first auxiliary electrode and the second auxiliary electrode.

When the average distance between the first auxiliary electrode and the second auxiliary electrode is measured, for example, in the case where the plane shapes of the first auxiliary electrode and the second auxiliary electrode are straight line shapes or curved line shapes, the minimum distance between an arbitrary point at an edge of the first auxiliary electrode and the second auxiliary electrode, where the edge is an edge of the first auxiliary electrode facing the second auxiliary electrode, can be measured as a "distance" between the arbitrary point of the first auxiliary electrode and the second auxiliary electrode. Moreover, the "distance" is measured at a number of arbitrary points other than the above-mentioned arbitrary point, and an average value of the measured values of the "distance" may be determined as an "average value between the first auxiliary electrode and the second auxiliary electrode."

The larger number of the arbitrary points is more preferable. The arbitrary points are preferably selected not to include the minimum value and the maximum value of the values of the "distance" to express an average of the "distance" between the first auxiliary electrode and the second auxiliary electrode.

When the average distance between the first auxiliary electrode and the second auxiliary electrode is measured, for example, in the case where the plane shapes of the first auxiliary electrode and the second auxiliary electrode are dot shapes (circular shapes or oval shapes), for example, the minimum distance between the center of the first auxiliary electrode and the center of the second auxiliary electrode can be determined as the "average distance between the first auxiliary electrode and the second auxiliary electrode."

When the thickness of the electrochromic layer and the thickness of the solid electrolyte layer are sufficiently thin, moreover, the average distance between the first auxiliary electrode and the second auxiliary electrode may be an average distance planar observed from the top surface.

A material of the first auxiliary electrode and a material of the second auxiliary electrode are not particularly limited and may be appropriately selected depending on the intended purpose. As the materials, materials identical to the materials of the first electrode and second electrode can be used. Materials for wiring (metal materials), such as Au, Ag, Cu, Al, W, Ni, Wo, and Cr, are preferably used. In other words, the first auxiliary electrode and the second auxiliary electrode in the electrochromic device of the present disclosure include a metal material. Use of such materials can further reduce electric resistance of the first auxiliary electrode and the second auxiliary electrode, and thus a voltage pulse is applied more efficiently, and responsiveness and uniformity of coloring density can be improved even more when the electrochromic device is driven to color or decolor.

Moreover, each of the first auxiliary electrode and the second auxiliary electrode may have a single layer structure, or a laminate structure. The first auxiliary electrode and the second auxiliary electrode may each have a coating film structure of metal particles or metal-coated particles. The electrochromic device of the present disclosure may further include an auxiliary electrode, in addition to the first auxiliary electrode and the second auxiliary electrode.

In the electrochromic device of the present disclosure, the first auxiliary electrode is preferably positioned at one side of the electrochromic layer, and the second auxiliary electrode is preferably positioned at another side of the electrochromic layer facing the one side. Owing to the configuration as described, a voltage pulse is applied more efficiently, and responsiveness and uniformity of coloring density can be improved even more when the electrochromic device is driven to color or decolor.

An average thickness of the first auxiliary electrode and an average thickness of the second auxiliary electrode are not particularly limited and may be appropriately selected depending on the intended purpose. The average thickness thereof is preferably 50 nm or greater but 5,000 nm or less.

Moreover, the first auxiliary electrode and the second auxiliary electrode are formed not to be in contact with the electrochromic layer and the solid electrolyte layer. Owing to the configuration as described, deterioration of the electrochromic layer caused by electrochemical reactions can be prevented even when the first auxiliary electrode and the second auxiliary electrode are each formed of a material that can be easily ionized, such as the above-described wiring materials.

<Electrochromic Layer>

The electrochromic layer is formed to be in contact with the first electrode, or the second electrode, or both, and is formed not to be in contact with the first auxiliary electrode and the second auxiliary electrode.

The electrochromic layer includes an electrochromic material, and may further include other components.

The electrochromic material is not particularly limited and may be appropriately selected depending on the intended purpose, as long as the electrochromic material is a material exhibiting electrochromism. Examples thereof include an inorganic electrochromic compound, an organic electrochromic compound, and a conductive polymer.

The inorganic electrochromic compound is not particularly limited and may be appropriately selected depending on the intended purpose. Examples of the inorganic electrochromic compound include tungsten oxide, molybdenum oxide, iridium oxide, and titanium oxide.

The organic electrochromic compound is not particularly limited and may be appropriately selected depending on the intended purpose. Examples of the organic electrochromic compound include viologen, rare earth phthalocyanine, and styryl.

Examples of the conductive polymer include polypyrrole, polythiophene, polyaniline, and derivatives of the foregoing polymers.

The electrochromic layer preferably has a structure where an organic electrochromic compound is born on conductive or semiconductive particles. Specifically, the structure is preferably a structure where particles having particle diameters of from about 5 nm through about 50 nm are bonded on a surface of the electrode, and an organic electrochromic compound having a polar group, such as a phosphonic acid, a carboxyl group, and a silanol group, is adsorbed on surfaces of the particles. Since electrons are efficiently injected to the organic electrochromic compound utilizing an effect of a large surface area of the particles, the structure described above can improve responsiveness compared to electrochromic devices in the art. Since a transparent film can be formed as a display layer using the particles, moreover, a high coloring density of the electrochromic compound can be obtained.

As the electrochromic layer, moreover, a plurality of the organic electrochromic compounds may be born on the conductive or semiconductive particles. Furthermore, conductivity of the conductive particles can also serve as an electrode layer.

Examples of the polymer-based or dye-based electrochromic compound include: low-molecular weight organic electrochromic compounds, such as azobenzene-based compounds, anthraquinone-based compounds, diarylethene-based compounds, dihydroprene-based compounds, dipyridine-based compounds, styryl-based compounds, styrylspiropyran-based compounds, spirooxazine-based compounds, spirothiopyran-based compounds, thioindigo-based compounds, tetrathiafulvalene-based compounds, terephthalic acid-based compounds, triphenylmethane-based compounds, triphenylamine-based compounds, naphthopyran-based compounds, viologen-based compounds, pyrazoline-based compounds, phenazine-based compounds, phenylenediamine-based compounds, phenoxazine-based compounds, phenothiazine-based compounds, phthalocyanine-based compounds, fluoran-based compounds, fulgide-based compounds, benzopyran-based compounds, and metallocene-based compounds; and conductive polymer compounds, such as polyaniline, and polythiophene. The above-listed examples may be used alone or in combination.

The electrochromic material is preferably a compound that can undergo a two-electron transfer reaction. In other words, the electrochromic layer preferably includes a compound that can undergo a two-electron transfer reaction. Since the electrochromic layer includes the compound that can undergo a two-electron transfer reaction, a two-electron transfer reaction also occurs in addition to a one-electron transfer reaction, when a high voltage pulse, such as the first voltage pulse A, the second voltage pulse A, and the initialization voltage pulse A, is applied. Since the electrochromic material for use can undergo two-electron transfer reactions, the electrochromic material is prevented from absorbing excess energy and being decomposed when a high voltage pulse is applied, and therefore durability of the electrochromic device can be improved.

Moreover, two-electron transfer reaction the electrochromic material causes can be observed and measured by means of a potentiostat. More specifically, a compound with which two or more amperage peaks (redox voltage) is determined as an electrochromic material that can undergo a two-electron transfer reaction, when voltage is swept as depicted in FIG. 1. In FIG. 1, the vertical axis represents an amperage (current density) and the horizontal axis represents potential against a reference electrode.

The electrochromic material that changes from a transparent state to a coloring state as oxidized preferably includes a triarylamine derivative including a radical polymerizable functional group represented by General Formula (1) below.

$$A_n-B_m \qquad \text{General Formula (1)}$$

When n is 2, m is 0. When n is 1, m is 0 or 1. A, B, or both include a radical polymerizable functional group. A has a structure represented by General Formula (2) below, and is bonded to B at any of sites $R_1$ to $R_{15}$. Note that, $R_3$ and $R_{13}$, $R_4$ and $R_6$, and $R_{10}$ and $R_{11}$ may form a ring structure with an alkyl chain. Moreover, B has a structure represented by General Formula (3) below, and is bonded to A at any of sites $R_{16}$ to $R_{21}$.

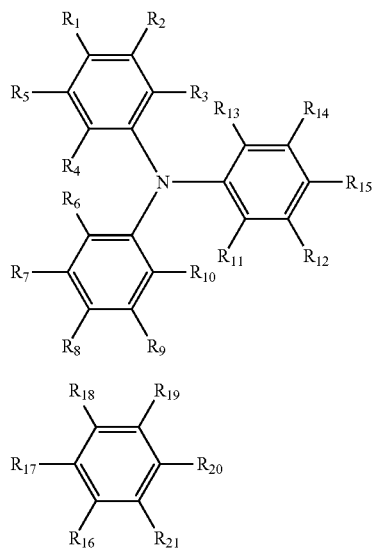

General Formula (2)

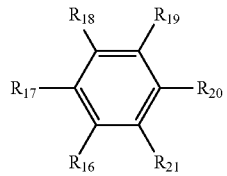

General Formula (3)

In General Formulae (2) and (3), $R_1$ to $R_{21}$ are all monovalent organic groups that may be identical or different. At least one of the monovalent organic groups is a radical polymerizable functional group.

Since the compound represented by General Formula (1) is a compound that can undergo a two-electron transfer reaction, the electrochromic material is prevented from absorbing excess energy and being decomposed, and durability of the electrochromic device can be improved, as described above.

Use of a polymer of the triarylamine derivative to form the electrochromic layer is advantageous because excellent repetitive driving (redox reaction) properties are obtained, and excellent light resistance can be obtained. Moreover, coloring properties that a decolored state is transparent, and coloring of high concentration is obtained through an oxidization reaction can be obtained.

Moreover, the electrochromic layer more preferably includes a crosslinked product obtained by crosslinking an electrochromic material including the triarylamine derivative, and another radical polymerizable compound different from the triarylamine derivative, because anti-solubility and resistance of the polymer is improved even more.

The triarylamine derivative including a radical polymerizable functional group, such as a compound represented by General Formula (2) or (3) above will be described.

<<Triarylamine Derivative Including Radical Polymerizable Functional Group>>

The monovalent organic groups in General Formulae (2) and (3) may be each independently a hydrogen atom, a halogen atom, a hydroxyl group, a nitro group, a cyano group, a carboxyl group, an alkoxycarbonyl group that may have a substituent, an aryloxycarbonyl group that may have a substituent, an alkylcarbonyl group that may have a substituent, an arylcarbonyl group that may have a substituent, an amide group, a monoalkylaminocarbonyl group that may have a substituent, a dialkylaminocarbonyl group that may have a substituent, a monoarylaminocarbonyl group that may have a substituent, a diarylaminocarbonyl group that may have a substituent, a sulfonic acid group, an alkoxysulfonyl group that may have a substituent, an aryloxysulfonyl group that may have a substituent, an alkylsulfonyl group that may have a substituent, an arylsulfonyl group that may have a substituent, a sulfoneamide group, a monoalkylaminosulfonyl group that may have a substituent, a dialkylaminosulfonyl group that may have a substituent, a monoarylaminosulfonyl group that may have a substituent, a diarylaminosulfonyl group that may have a substituent, an amino group, a monoalkylamino group that may have a substituent, a dialkylamino group that may have a substituent, an alkyl group that may have a substituent, an alkenyl group that may have a substituent, an alkynyl group that may have a substituent, an aryl group that may have a substituent, an alkoxy group that may have a substituent, an aryloxy group that may have a substituent, an alkylthio group that may have a substituent, an arylthio group that may have a substituent, and a heterocyclic group that may have a substituent.

Among the above-listed examples, an alkyl group, an alkoxy group, a hydrogen atom, an aryl group, an aryloxy group, a halogen group, an alkenyl group, and an alkynyl group are particularly preferable in view of stable operation and durability to light.

Examples of the halogen atom include a fluorine atom, a chlorine atom, a bromine atom, and iodine atom.

Examples of the alkyl group include a methyl group, an ethyl group, a propyl group, and a butyl group.

Examples of the aryl group include a phenyl group and a naphthyl group.

Examples of the aralkyl group include a benzyl group, a phenethyl group, and a naphthylmethyl group. Examples of the alkoxy group include a methoxy group, an ethoxy group, and a propoxy group.

Examples of the aryloxy group include a phenoxy group, a 1-naphthyloxy group, a 2-naphthyloxy group, a 4-methoxyphenoxy group, and a 4-methylphenoxy group.

Examples of the heterocyclic group include carbazole, dibenzofuran, dibenzothiophene, oxadiazole, and thiadiazole.

Examples of the substituent further substituted with a substituent include a halogen atom, a nitro group, a cyano group, an alkyl group (e.g., a methyl group and an ethyl group), an alkoxy group (e.g., a methoxy group and an ethoxy group), an aryloxy group (e.g., a phenoxy group), an aryl group (e.g., a phenyl group and a naphthyl group) and an aralkyl group (e.g., a benzyl group and a phenethyl group).

—Radical Polymerizable Functional Group—

The radical polymerizable functional group is not particularly limited and may be appropriately selected depending on the intended purpose, as long as the radical polymerizable functional group is a group capable of radical polymerization. Examples thereof include 1-substituted ethylene functional group represented by General Formula (i) below, and 1,1-substituted ethylene functional group represented by General Formula (ii) below. Among the above-listed examples, an acryloyloxy group and a methacryloyloxy group are preferable.

  General Formula (i)

In General Formula (i), $X_1$ is an arylene group that may have a substituent, an alkenylene group that may have a substituent, —CO— group, —COO— group, —CON(R100)- group [with the proviso that R100 is a hydrogen atom, an alkyl group, an aralkyl group, or an aryl group], or —S— group.

Examples of the arylene group in General Formula (i) include a phenylene group that may have a substituent, and a naphthylene group.

Examples of the alkenylene group include an ethenylene group, a propenylene group, and a butenylene group. Examples of the alkyl group include a methyl group, and an ethyl group. Examples of the aralkyl group include a benzyl group, a naphthylmethyl group, and a phenethyl group. Examples of the aryl group include a phenyl group, and a naphthyl group.

Moreover, specific examples of the 1-substituted ethylene functional group represented by General Formula (i) include a vinyl group, a styryl group, a 2-methyl-1,3-butadienyl group, a vinylcarbonyl group, an acryloyl group, an acryloyloxy group, an acryloylamide group, and a vinyl thio ether group.

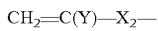  General Formula (ii)

In General Formula (ii), Y is an alkyl group that may have a substituent, an aralkyl group that may have a substituent, an aryl group that may have a substituent, a halogen atom, a cyano group, a nitro group, an alkoxy group, or —$COOR_{101}$ group [$R_{101}$ is a hydrogen atom, an alkyl group that may have a substituent, an aralkyl group that may have a substituent, an aryl group that may have a substituent, or $CONR_{102}R_{103}$ ($R_{102}$ and $R_{103}$ are each a hydrogen atom, a hydrogen atom, an alkyl group that may have a substituent, an aralkyl group that may have a substituent, or an aryl group that may have a substituent, and may be identical or different)].

Moreover, $X_2$ is a substituent identical to the substituent of $X_1$ of General Formula (i), a single bond, or an alkylene group. Note that, Y, or $X_2$, or both may be an oxycarbonyl group, a cyano group, an alkenylene group, or an aromatic ring.

Examples of the aryl group in General Formula (ii) include a phenyl group, and a naphthyl group.

Examples of the alkyl group include a methyl group, and an ethyl group. Examples of the alkoxy group include a methoxy group, and an ethoxy group.

Examples of the aralkyl group include a benzyl group, a nephthylmethyl group, and a phenethyl group.

Specific examples of the 1,1-substituted ethylene functional group represented by General Formula (ii) include an α-acryloyloxy chloride group, a methacryloyl group, a methacryloyloxy group, an α-cyanoethylene group, an α-cyanoacryloyloxy group, an α-cyanophenylene group, a methacryloylamino group.

Examples of the substituent of $X_1$, $X_2$, or Y that is further substituted with a substituent include a halogen atom, a nitro group, a cyano group, an alkyl group (e.g., a methyl group, and an ethyl group), an alkoxy group (e.g., a methoxy group, and an ethoxy group), an aryloxy group (e.g., a phenoxy group), an aryl group (e.g., a naphthyl group), and an aralkyl group (e.g., a benzyl group, and a phenethyl group).

Moreover, the triarylamine derivative including a radical polymerizable functional group is preferably any of compounds represented by General Formulae (1-1) to (1-3) below.

In General Formulae (1-1) to (1-3), $R_{27}$ to $R_{88}$ are each a monovalent organic group, and may be identical or different from one another, where at least one of $R_{27}$ to $R_{88}$ is a radical polymerizable functional group. Moreover, $R_{39}$ and $R_{41}$ may form a cyclic structure, and $R_{40}$ and $R_{42}$ may form a cyclic structure. Examples of the monovalent organic group and the radical polymerizable functional group are the monovalent organic group and the radical polymerizable functional group identical to those in General Formula (1).

[General Formula 1-1]

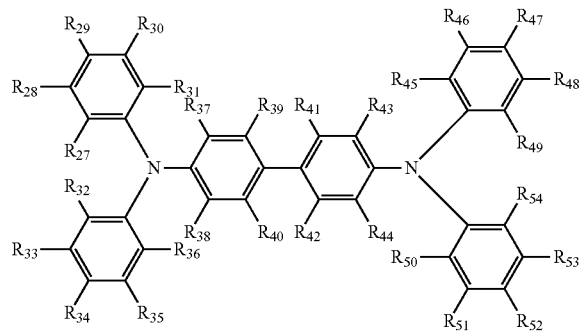

[General Formula 1-2]

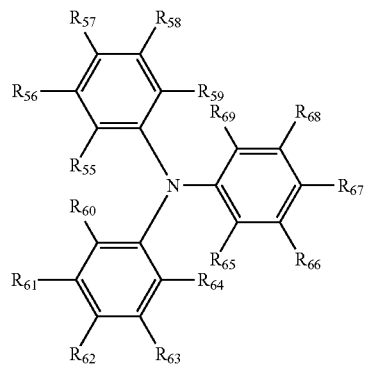

[General Formula 1-3]

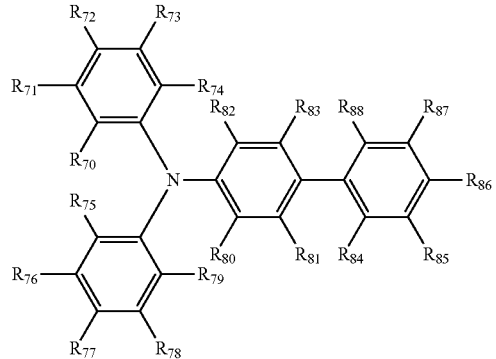

Specific examples of the compound represented by General Formula (1), and General Formulae (1-1) to (1-3) are presented below, but the compound represented by General Formula (1), and General Formulae (1-1) to (1-3) are not limited to the examples presented below.

<<<Exemplary Compound 1>>>
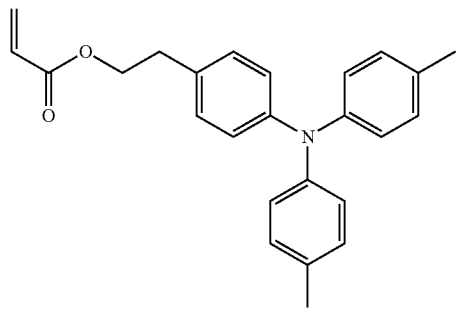
<<<Exemplary Compound 2>>>
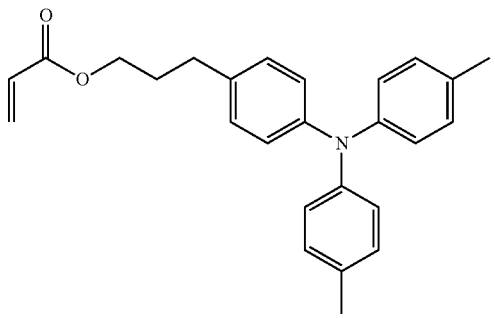
<<<Exemplary Compound 3>>>
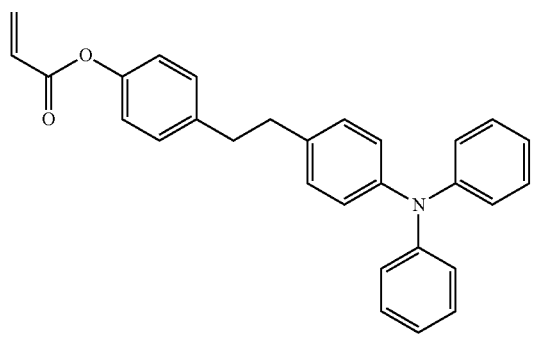
<<<Exemplary Compound 4>>>
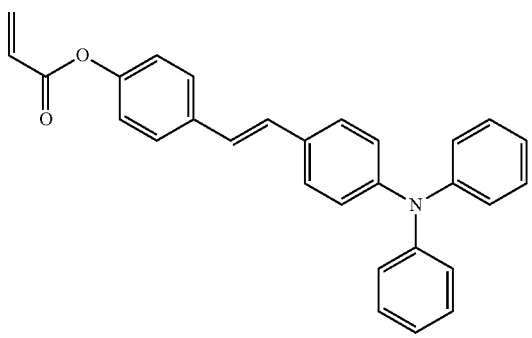
<<<Exemplary Compound 5>>>
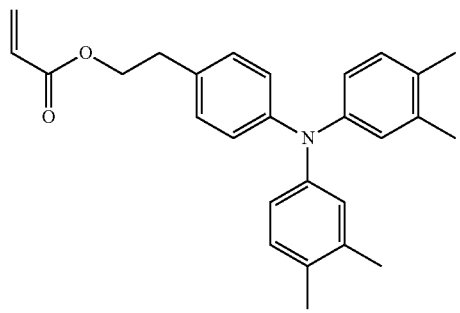
<<<Exemplary Compound 6>>>
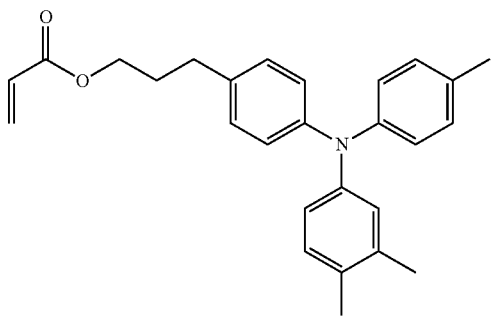
<<<Exemplary Compound 7>>>
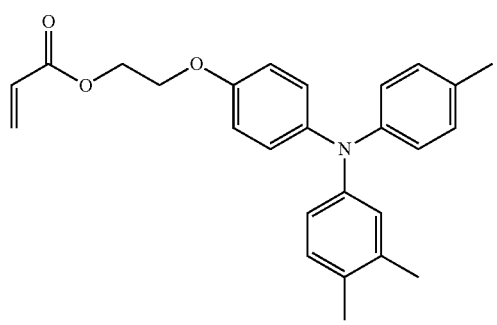
<<<Exemplary Compound 8>>>
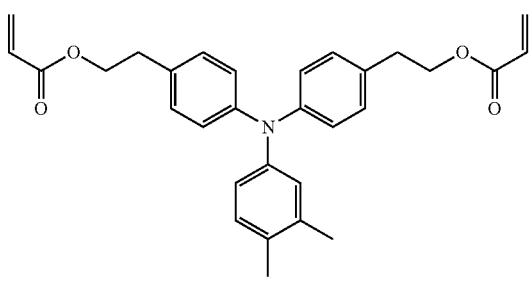

-continued
<<<Exemplary Compound 9>>>
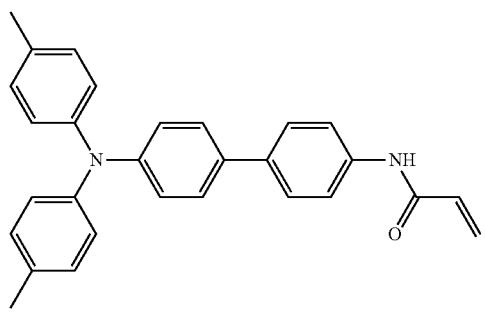
<<<Exemplary Compound 10>>>
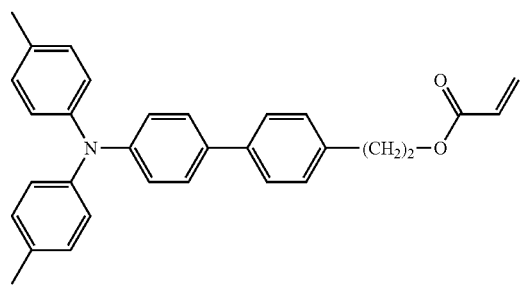
<<<Exemplary Compound 11>>>
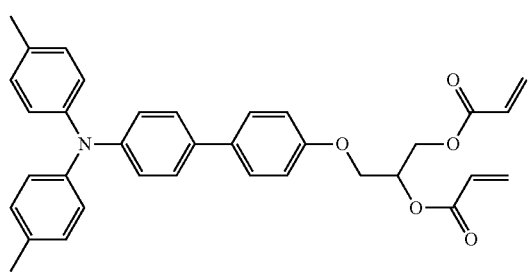
<<<Exemplary Compound 12>>>
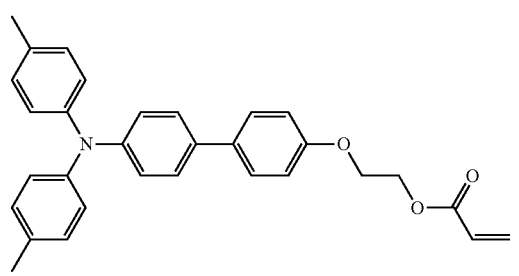
<<<Exemplary Compound 13>>>
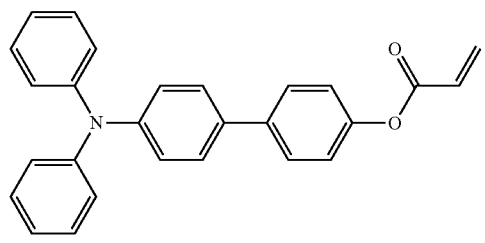
<<<Exemplary Compound 14>>>
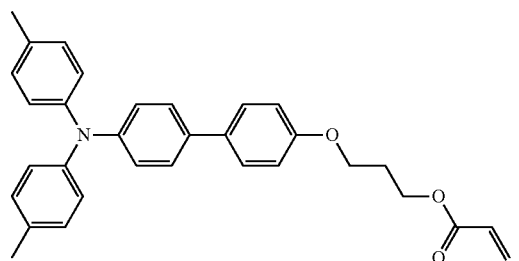
<<<Exemplary Compound 15>>>
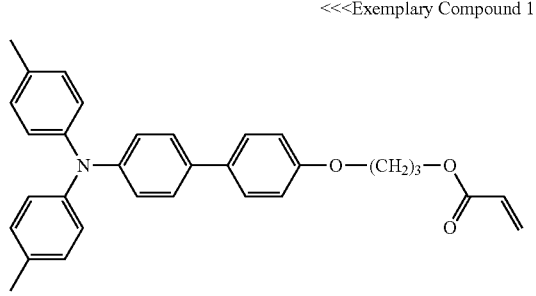
<<<Exemplary Compound 16>>>
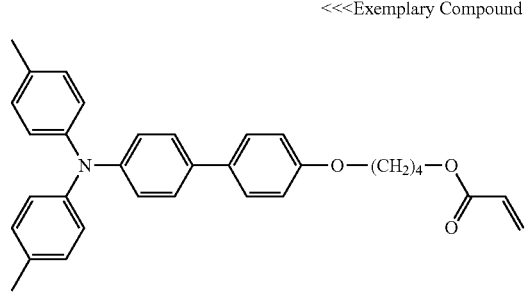
<<<Exemplary Compound 17>>>
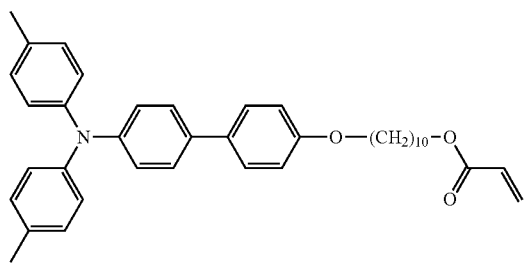
<<<Exemplary Compound 18>>>
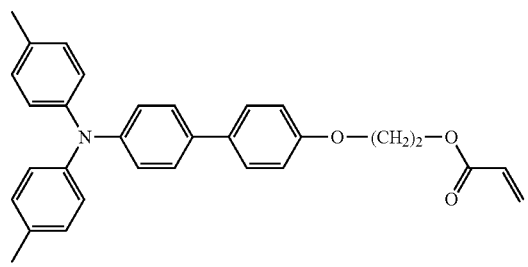

-continued
<<<Exemplary Compound 19>>>
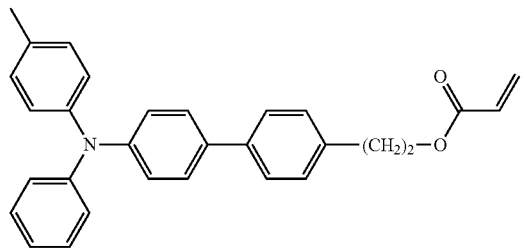
<<<Exemplary Compound 20>>>
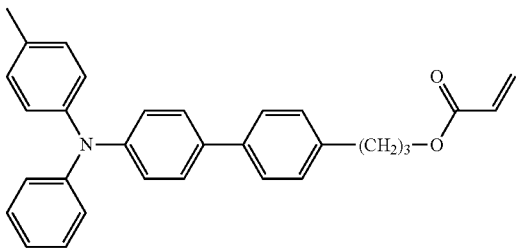
<<<Exemplary Compound 21>>>
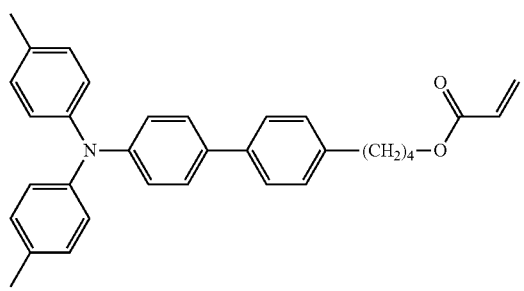
<<<Exemplary Compound 22>>>
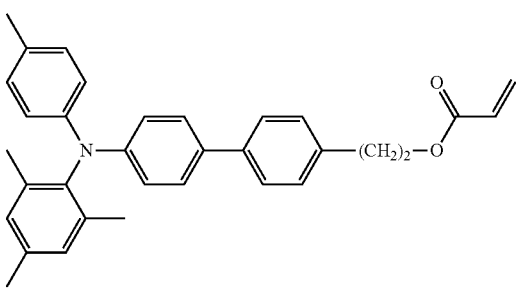
<<<Exemplary Compound 23>>>
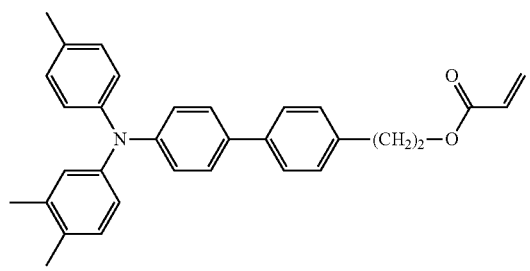
<<<Exemplary Compound 24>>>
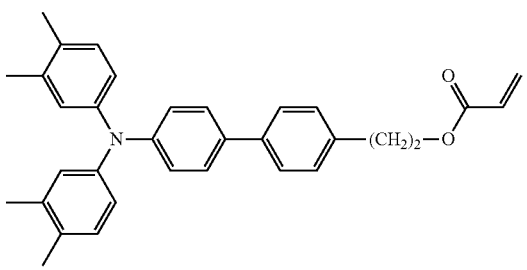
<<<Exemplary Compound 25>>>
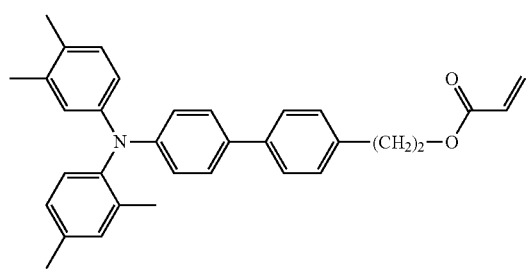
<<<Exemplary Compound 26>>>
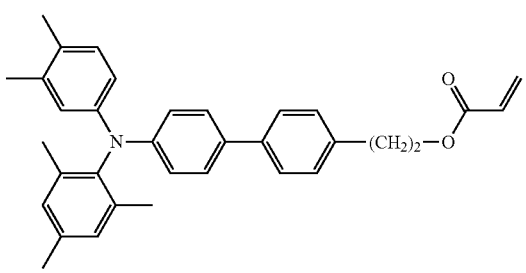
<<<Exemplary Compound 27>>>
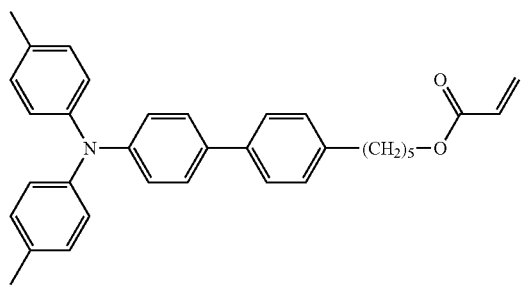
<<<Exemplary Compound 28>>>
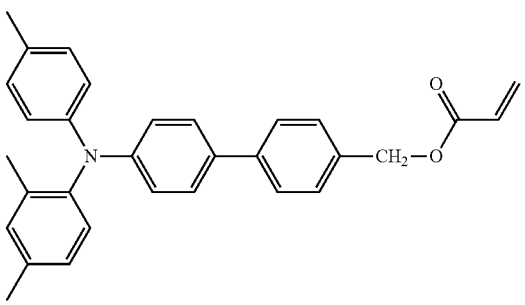

-continued
<<<Exemplary Compound 29>>>
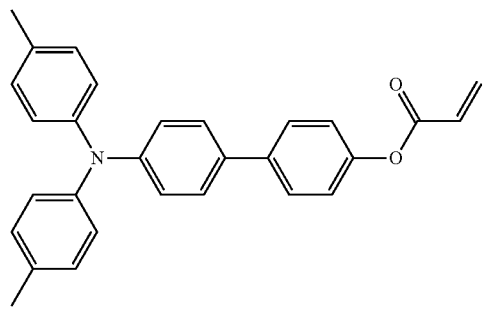
<<<Exemplary Compound 30>>>
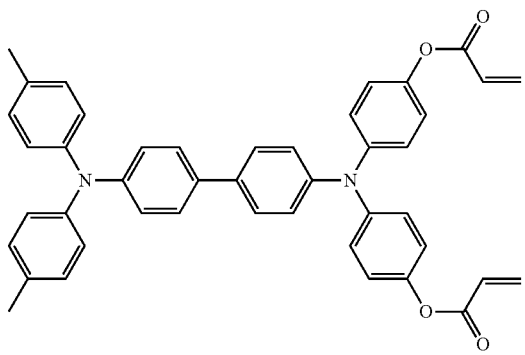
<<<Exemplary Compound 31>>>
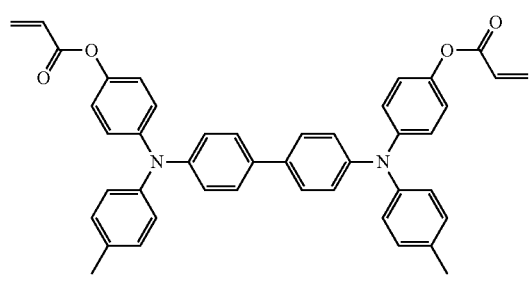
<<<Exemplary Compound 32>>>
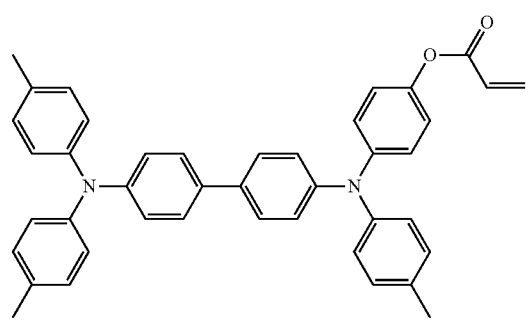
<<<Exemplary Compound 33>>>
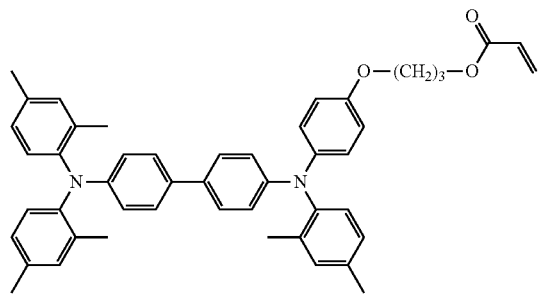
<<<Exemplary Compound 34>>>
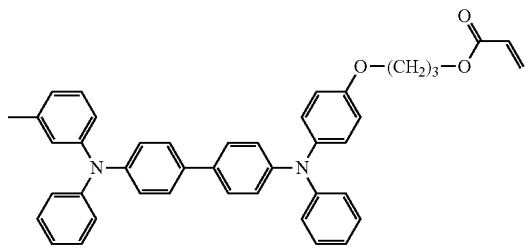
<<<Exemplary Compound 35>>>
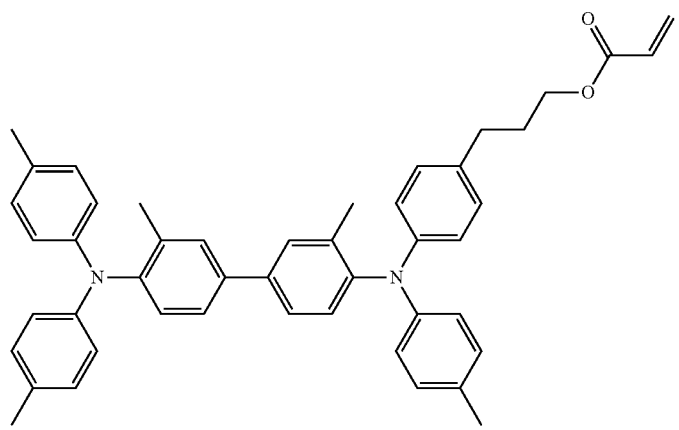

<<<Exemplary Compound 36>>>
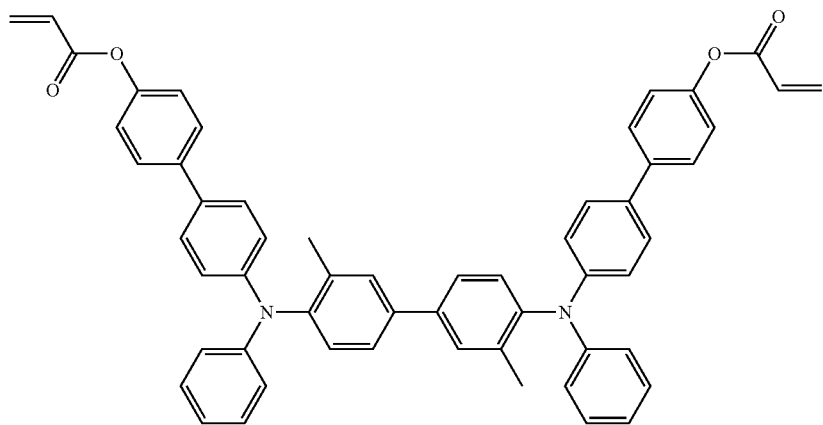
<<<Exemplary Compound 37>>>
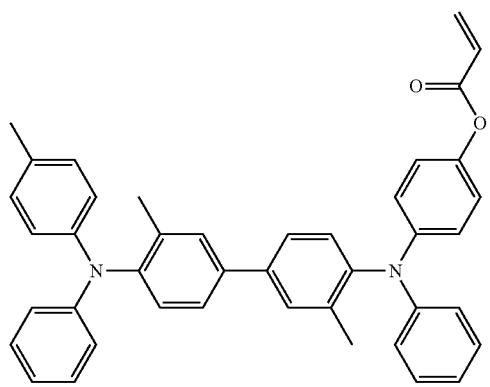
<<<Exemplary Compound 38>>>
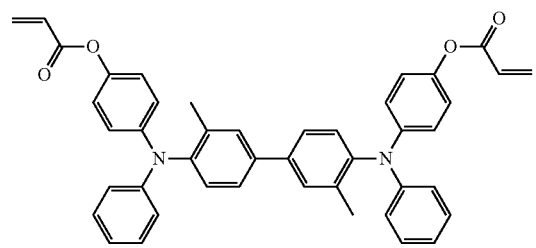
<<<Exemplary Compound 39>>>
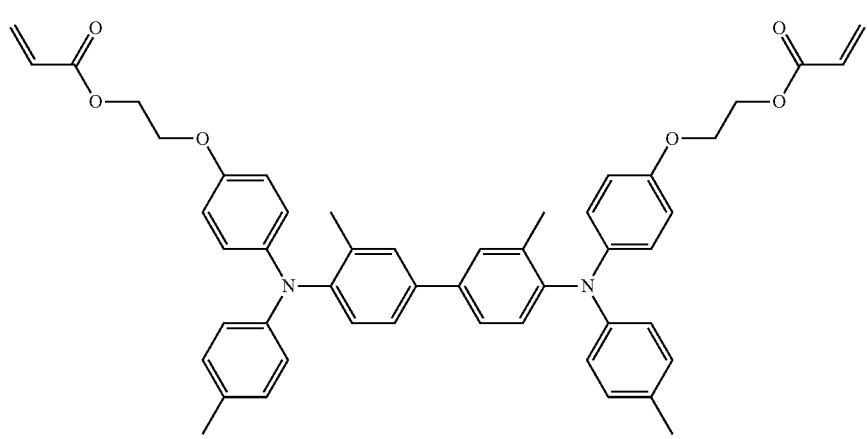

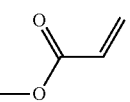
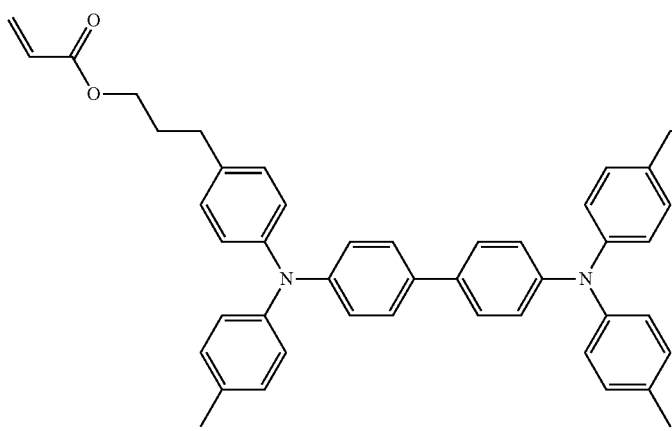

—Another Radical Polymerizable Compound—

Another radical polymerizable compound is a compound including at least one radical polymerizable functional group but is different from the above-described triarylamine derivative including a radical polymerizable functional group.

Examples of another radical polymerizable compound include a monofunctional, bifunctional, or trifunctional or higher radical polymerizable compound, a functional monomer, and a radical polymerizable oligomer. Among the above-listed examples, bifunctional or higher radical polymerizable compound is particularly preferable.

A radical polymerizable functional group in another radical polymerizable compound may be identical to a radical polymerizable functional group in the above-described triarylamine derivative including a radical polymerizable functional group, but the radical polymerizable functional group in another radical polymerizable compound is particularly preferably an acryloyloxy group, or a methacryloyloxy group.

Examples of the monofunctional radical polymerizable compound include 2-(2-ethoxyethoxy)ethylacrylate, methoxy polyethylene glycol monoacrylate, methoxy polyethylene glycol monomethacrylate, phenoxy polyethylene glycolacrylate, 2-acryloyloxyethylsuccinate, 2-ethylhexylacrylate, 2-hydroxyethylacrylate, 2-hydroxypropylacrylate, tetrahydrofurfuryl acrylate, 2-ethylhexylcarbitolacrylate, 3-methoxybutylacrylate, benzyl acrylate, cyclohexyl acrylate, isoamyl acrylate, isobutyl acrylate, methoxytriethylene glycol acrylate, phenoxytetraethylene glycol acrylate, cetyl acrylate, isostearyl acrylate, stearyl acrylate, and a styrene monomer. The above-listed examples may be used alone or in combination.

Examples of the bifunctional radical polymerizable compound include 1,3-butanedioldiacrylate, 1,4-butanedioldiacrylate, 1,4-butanedioldimethacrylate, 1,6-hexanedioldiacrylate, 1,6-hexanedioldimethacrylate, diethylene glycol diacrylate, polyethylene glycol diacrylate, neopentyl glycol diacrylate, EO-modified bisphenol A diacrylate, EQ-modified bisphenol F diacrylate, and neopentyl glycol diacrylate. The above-listed examples may be used alone or in combination.

Examples of the trifunctional or higher radical polymerizable compound include trimethylolpropane triacrylate (TMPTA), trimethylolpropane trimethacrylate, EO-modified trimethylolpropane triacrylate, PO-modified trimethylolpropane triacrylate, caprolactone-modified trimethylolpropane triacrylate, HPA-modified trimethylolpropane trimethacrylate, pentaerythritol triacrylate, pentaerythritol tetraacrylate (PETTA), glycerol triacrylate, ECH-modified glycerol triacrylate, EO-modified glycerol triacrylate, PO-modified glycerol triacrylate, tris(acryloxyethyl) isocyanurate, dipentaerythritol hexaacrylate (DPHA), caprolactone-modified dipentaerythritol hexaacrylate, dipentaerythritol hydroxypentaacrylate, alkyl-modified dipentaerythritol pentaacrylate, alkyl-modified dipentaerythritol tetraacrylate, alkyl-modified dipentaerythritol triacrylate, dimethylol propane tetraacrylate (DTMPTA), pentaerythritol ethoxy tetraacrylate, EO-modified phosphoric acid triacrylate, and 2,2,5,5-tetrahydroxymethylcyclopentantetraacrylate. The above-listed examples may be used alone or in combination.

EO-modified means ethylene oxy-modified, PO-modified means propylene oxy-modified, and ECH-modified means epichlorohydrin-modified.

Examples of the functional monomer include: monomers substituted with a fluorine atom, such as octafluoropentyl acrylate, 2-perfluorooctylethylacrylate, 2-perfluorooctylethylmethacrylate, and 2-perluoroisononylethylacrylate; vinyl monomers including a polysiloxane group having from 20 through 70 repeating units of siloxane, such as acryloyl polydimethylsiloxane ethyl, methacryloyl polydimethylsiloxane ethyl, acryloyl polydimethylsiloxane propyl, acryloyl polydimethylsiloxane butyl, and diacryloyl polydimethylsiloxane diethyl, disclosed in Japanese Examined Application Publication nos. 05-60503 and 06-45770; acrylates; and methacrylate. The above-listed examples may be used alone or in combination.

Examples of the radical polymerizable oligomer include epoxy acrylate-based oligomers, urethane acrylate-based oligomers, and polyester acrylate-based oligomers.

In view of formation of crosslinks, the above-described triarylamine derivative including a radical polymerizable functional group, or another radical polymerizable compound, or both preferably include two or more radical polymerizable functional groups.

An amount of the triarylamine derivative including a radical polymerizable functional group is not particularly limited and may be appropriately selected depending on the intended purpose. The amount thereof is preferably 10% by mass or greater but 100% by mass or less, and more preferably 30% by mass or greater but 90% by mass or less, relative to a total amount of the electrochromic composition. When the amount thereof is 10% by mass or greater, an electrochromic function of the electrochromic layer is sufficiently exhibited, and durability and coloring sensitivity are excellent even when the electrochromic device is repetitively used with application of voltage. An electrochromic function is exhibited even when the amount thereof is 100% by mass. In this case, coloring sensitivity against a thickness can be increased even more. Although it cannot be generalized because electrical properties required vary depending on a process for use, the amount thereof is more preferably 30% by mass or greater but 90% by mass or less in view of balance between coloring sensitivity and durability against repetitive use.

Moreover, the electrochromic material that turns into a colored state from a transparent state as a result of reduction is not particularly limited and may be appropriately selected depending on the intended purpose. The electrochromic material is preferably a viologen-based compound, and a dipyridine-based compound, in view of low coloring and decoloring potential, and an excellent color value. For example, the electrochromic material is more preferably a dipyridine-based compound represented by General Formula (4) below.

General Formula (4)

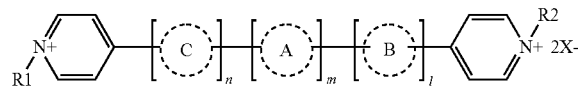

In General Formula (4) above, R1 and R2 are each independently an alkyl group that may have a substituent and having from 1 through 8 carbon atoms, or an aryl group. In the case where used is a structure where an electrochromic compound is born on conductive particles or semiconductor particles or both described below, moreover, R1, or R2, or both may have a substituent selected from the group consisting of COOH, PO(OH)$_2$, and Si(OC$_k$H$_{2k+1}$)$_3$ (with the proviso that k is from 1 through 20). COOH, PO(OH)$_2$, or Si(OC$_k$H$_{2k+1}$)$_3$ introduced in R1, or R2, or both can contribute to an adsorption reaction.

In General Formula (4) above, moreover, A, B, and C are each independently an alkyl group that may have a substituent and has from 1 through 20 carbon atoms, an aryl group, or a heterocyclic group.

In General Formula (4) above, furthermore, X is a monovalent anion. The monovalent anion is not particularly limited and may be appropriately selected depending on the intended purpose, as long as the monovalent anion can form a stable pair with a cation site. Examples thereof include Br ion (Br$^-$), Cl ion (Cl$^-$), ClO$_4$ ion (ClO$_4^-$), PF$_6$ ion (PF$_6^-$), and BF$_4$ ion (BF$_4^-$).

In General Formula (4) above, n, m, and l are each independently 0, 1, or 2.

Moreover, the electrochromic device preferably includes two electrochromic layers, where one electrochromic layer is a first electrochromic layer including an electrochromic material capable of coloring in an oxidized state, and the other electrochromic layer is a second electrochromic layer including an electrochromic material capable of coloring in a reduced state. Details of the embodiment thereof will be described later.

As the metal complex-based electrochromic compound or metal oxide-based electrochromic compound, for example, usable is an inorganic electrochromic compound, such as titanium oxide, vanadium oxide, tungsten oxide, indium oxide, iridium oxide, nickel oxide, and Prussian blue The metal complex-based electrochromic compound or metal oxide-based electrochromic compound can be formed by a vacuum film formation method. As the vacuum film formation method, vacuum vapor deposition, sputtering, or ion plating can be used. Moreover, the metal complex-based electrochromic compound or metal oxide-based electrochromic compound may be formed as a precursor solution or a particle layer. In this case, examples of a coating method used include spin coating, casting, microgravure coating, gravure coating, bar coating, roll coating, wire bar coating, dip coating, slit coating, capillary coating, spray coating, nozzle coating, and various printing methods, such as gravure printing, screen printing, flexographic printing, offset printing, reverse printing, and inkjet printing.

<<Other Components in Electrochromic Layer>>

Other components that can be included in the electrochromic layer are not particularly limited and may be appropriately selected depending on the intended purpose. Examples thereof include a polymerization initiator, conductive particles, and semiconductive particles.

<<<Polymerization Initiator>>>

The electrochromic layer preferably includes a polymerization initiator, according to the necessity, in order to efficiently carry out a cross-linking reaction between the triarylamine derivative including a radical polymerizable functional group and another radical polymerizable compound.

Examples of the polymerization initiator include a thermal polymerization initiator, and a photopolymerization initiator. Among the above-listed examples, a photopolymerization initiator is preferable in view of polymerization efficiency.

The thermal polymerization initiator is not particularly limited and may be appropriately selected depending on the intended purpose. Examples thereof include; peroxide-based initiators, such as 2,5-dimethylhexane-2,5-dihydroperoxide, dicumyl peroxide, benzoyl peroxide, t-butylcumyl peroxide, 2,5-dimethyl-2,5-di(peroxybenzoyl)hexyne-3, di-t-butylperoxide, t-butyl hydroperoxide, cumene hydroperoxide, and lauroyl peroxide; and azo-based initiators, such as azobisisobutyl nitrile, azobiscyclohexane carbonitrile, methyl azobisisobutyrate, azobisisobutylamidine hydrochloride, and 4,4'-azobis-4-cyanovaleric acid. The above-listed examples may be used alone or in combination.

The photopolymerization initiator is not particularly limited and may be appropriately selected depending on the intended purpose. Examples thereof include: acetophenone-based or ketal-based photopolymerization initiators, such as diethoxyacetophenone, 2,2-dimethoxy-1,2-diphenylethan-1-one, 1-hydroxycyclohexylphenylketone, 4-(2-hydroxyethoxy)phenyl-(2-hydroxy-2-propyl)ketone, 2-benzyl-2-dimethylamino-1(4-morpholinophenylkutanone-1, 2-hydroxy-2-methyl-1-phenylpropan-1-one, 2-methyl-2-morpholino(4-methylthiophenyl)propan-1-one, and 1-phenyl-1,2-propanedione-2-(o-ethoxycarbonyl)oxime; benzoin ether-based photopolymerization initiators, such as benzoin, benzoinmethyl ether, benzoinethyl ether, benzoin isobutyl ether, and benzoin isopropyl ether; benzophenone-based photopolymerization initiators, such as benzophenone, 4-hydroxybenzophenone, methyl o-benzoyl benzoate, 2-benzoylnaphthalene, 4-benzoylbiphenyl, 4-benzoyl phenyl ether, acrylated benzophenone, and 1,4-benzoylbenzene; and thioxanthone-based photopolymerization initiators, such as 2-isopropylthioxanthone, 2-chlorothioxanthone, 2,4-dimethylthioxanthone, 2,4-diethylthioxanthone, and 2,4-dichlorothioxanthone. The above-listed examples may be used alone or in combination.

Examples of other photopolymerization initiators include ethyl anthraquinone, 2,4,6-trimethylbenzoyldiphenylphosphine oxide, 2,4,6-trimethylbenzoylphenylethoxyphosphine oxide, bis(2,4,6-trimethylbenzoyl)phenylphosphine oxide, bis(2,4-dimethoxybenzoyl)-2,4,4-trimethylpentylphosphine oxide, methylphenylglyoxylic acid ester, 9,10-phenanthrene, acridine-based compounds, triazine-based compounds, and imidazole-based compounds. The above-listed examples may be used alone or in combination.

Note that, a compound having an effect of accelerating photopolymerization may be used alone or in combination with the photopolymerization initiator. Examples of such a compound include triethanolamine, methyl diethanol amine, ethyl 4-dimethylaminobenzoate, isoamyl 4-dimethylaminobenzoate, (2-dimethylamino)ethyl benzoate, and 4,4'-dimethylaminobenzophenone.

<<<Conductive Particles or Semiconductor Particles>>>

The electrochromic material, such as a viologen-based compound and a dipyridine-based compound, is preferably born on conductive particles or semiconductor particles in the electrochromic layer.

The conductive particles or semiconductor particles bearing the electrochromic material thereon are not particularly limited and may be appropriately selected depending on the intended purpose. Metal oxide is preferably used as the conductive particles or semiconductor particles.

Examples of a material of the metal oxide include metal oxides including, as a main component, titanium oxide, zinc oxide, tin oxide, zirconium oxide, cerium oxide, yttrium oxide, boron oxide, magnesium oxide, strontium titanate, potassium titanate, barium titanate, calcium titanate, calcium oxide, ferrite, hafnium oxide, tungsten oxide, iron oxide, copper oxide, nickel oxide, cobalt oxide, barium oxide, strontium oxide, vanadium oxide, aluminosilicate, calcium phosphate, or aluminosilicate. The above-listed examples may be used alone or in combination.

Among the above-listed examples, at least one selected from the group consisting of titanium oxide, zinc oxide, tin oxide, zirconium oxide, iron oxide, magnesium oxide, indium oxide, and tungsten oxide is preferably in view of electrical properties (e.g., electroconductivity) and physical properties (e.g., optical characteristics), and titanium oxide or tin oxide is particularly preferable because color display having an excellent response speed of coloring and decoloring can be realized.

Moreover, shapes of the conductive particles or semiconductor particles are not particularly limited and may be appropriately selected depending on the intended purpose. In order to bear the electrochromic compound efficiently, shapes thereof having a large surface area per unit volume (may be referred to as a specific surface area) are used. When each of the particles is an aggregate of nano-particles, for example, the particle has a large specific surface area. Therefore, the particles bear an electrochromic compound more efficiently, and an excellent display contrast ratio of coloring and decoloring can be obtained.

The conductive particle or semiconductor particle layer may be formed by a vacuum film formation method, but is preferably formed by applying a particle dispersion paste through coating in view of productivity. Examples of the coating method include spin coating, casting, microgravure coating, gravure coating, bar coating, roll coating, wire bar coating, dip coating, slit coating, capillary coating, spray coating, nozzle coating, and various printing methods, such as gravure printing, screen printing, flexographic printing, offset printing, reverse printing, and inkjet printing.

In case of a structure where the electrochromic compound (material) represented by General Formula (4) is born on the conductive particles, or the semiconductor particles, or both, the electrochromic compound represented by General Formula (4), which includes a group contributing to an adsorption reaction, is dissolved in a solvent to prepare a solution, and the solution is brought into contact with the conductive particles or the semiconductor particles. In this manner, the electrochromic compound is easily adsorbed on the conductive particles or the semiconductor particles.

The adsorption treatment may be performed before forming the conductive particles or the semiconductor particles into a film. However, the adsorption treatment is preferably performed after forming the conductive particle layer or the semiconductor particle layer through any of various printing methods. This is because film forming properties of the conductive particles or semiconductor particles on which the electrochromic compound tend to be degraded. Examples of the method for allowing the solution obtained by dissolving the electrochromic compound represented by General Formula (4) above in a solvent to contact with the conductive particles or semiconductor particles include spin coating, casting, microgravure coating, gravure coating, bar coating, roll coating, wire bar coating, clip coating, slit coating, capillary coating, spray coating, nozzle coating, and various printing methods, such as gravure printing, screen printing, flexographic printing, offset printing, reverse printing, and inkjet printing.

An average thickness of the electrochromic layer is not particularly limited and may be appropriately selected depending on the intended purpose. The average thickness of the electrochromic layer is preferably 0.2 μm or greater but 5.0 μm or less. When the average thickness of the electrochromic layer is 0.2 μm or greater, coloring density can be improved. When the average thickness thereof is 5.0 μm or less, production cost can be kept low, and visibility can be improved because transparency is high in a decolored state.

The electrochromic layer is preferably formed by applying a solution prepared by dissolving the electrochromic material in a solvent to form a film, followed by applying light or heat to perform polymerization. Examples of the coating method include spin coating, casting, microgravure coating, gravure coating, bar coating, roll coating, wire bar coating, clip coating, slit coating, capillary coating, spray coating, nozzle coating, and various printing methods, such as gravure printing, screen printing, flexographic printing, offset printing, reverse printing, and inkjet printing.

<Solid Electrolyte Layer>

The solid electrolyte layer is formed to be in contact with at least one selected from the group consisting of the first electrode, the second electrode, and the electrochromic layer, and is formed not to be in contact with the first auxiliary electrode and the second auxiliary electrode.

The solid electrolyte layer is preferably formed as a film holding an electrolyte in a photocurable or heat-curable resin. Moreover, the solid electrolyte layer preferably includes inorganic particles mixed therein where the inorganic particles are for controlling a film thickness of the electrolyte layer.

The solid electrolyte layer is preferably a film formed by applying a solution prepared by mixing inorganic particles, a curable resin, and an electrolyte onto the electrochromic layer, followed by curing the solution with light or heat. The solid electrolyte layer may be also a film prepared by forming a porous inorganic particle layer in advance, applying a solution prepared by mixing a curable resin and an electrolyte to permeate the inorganic particle layer, and then curing the solution with light or heat.

In the case where the electrochromic layer is a layer where the electrochromic compound is born on conductive or semiconductor particles, moreover, the solid electrolyte layer may be a layer formed by applying a solution prepared by mixing a curable resin and an electrolyte to permeate the electrochromic layer, followed by curing the solution with light or heat.

As the electrolyte in the solid electrolyte layer, a liquid electrolyte, such as ionic liquid, or a solution obtained by dissolving a solid electrolyte in a solvent may be used.

As a material of the electrolyte, for example, usable are an inorganic ion salt, such as an alkali metal salt and an alkaline earth metal salt, a quaternary ammonium salt, or a supporting electrolyte, such as an acid supporting electrolyte and an alkaline supporting electrolyte, can be used. Specific examples thereof include $LiClO_4$, $LiBF_4$, $LiAsF_6$, $LiPF_6$, $LiCF_3SO_3$, $LiCF_3COO$, $KCl$, $NaClO_3$, $NaCl$, $NaBF_4$, $NaSCN$, $KBF_4$, $Mg(ClO_4)_2$, and $Mg(BF_4)_2$.

The ionic liquid is not particularly limited and may be appropriately selected depending on the intended purpose.

An organic ionic liquid has a molecular structure, which is present as a liquid in a wide temperature range including room temperature. In this case, the molecular structure preferably includes a cationic component and an anionic component.

Examples of the cationic component include: imidazole derivatives, such as N,N-dimethylimidazole salt, N,N-methylethylimidazole salt, and N,N-methylpropylimidazole salt; aromatic salts such as pyridinium derivatives (e.g., N,N-dimethylpyridinium salt and N,N-methylpropylpyridinium salt); and aliphatic quaternary ammonium-based compounds, such as trimethylpropyl ammonium salt, trimethylhexyl ammonium salt, and triethylhexyl ammonium salt.

The anionic component is preferably a compound including fluorine in view of stability in the atmosphere. Examples of the anionic component include Br ion ($Br^-$), Cl ion ($Cl^-$), $ClO_4$ ion ($ClO_4^-$), $PF_6$ ion ($PF_6^-$), $BF_4$ ion ($BF_4^-$), TCB ion (tetracyanoborate), FSI ion (bis(fluorosulfonyl)imide), and TFSI ion (bis(trifluoromethylsulfonyl)imide). An ionic liquid, in which a combination of any of the above-listed cationic components and any of the above-listed anionic components is formulated, can be used.

Examples of the solvent for the solid electrolyte layer include propylene carbonate, acetnitrile, γ-butyrolactone, ethylene carbonate, sulfolane, dioxolane, tetrahydrofuran, 2-methyltetrahydrofuran, dimethyl sulfoxide, 1,2-dimethoxyethane, 1,2-ethoxymethoxyethane, polyethylene glycol, alcohols, and mixed solvents thereof.

Examples of the curable resin include photocurable resins, such as acrylic resins, urethane resins, epoxy resins, vinyl chloride resins, ethylene resins, melamine resins, and phenol resins, and heat-curable resins. The curable resin is preferably a material having high compatibility to an electrolyte. As the material having high compatibility of an electrolyte, for example, an ethylene glycol derivative, such as polyethylene glycol, and polypropylene glycol, is preferable.

Moreover, the curable resin is preferably a resin that can be cured by light. Use of such a resin can realize production of an element at a low temperature for a short period of time compared to a method for forming a thin film through thermal polymerization or evaporation of a solvent.

Examples of a preferable combination of materials for the solid electrolyte layer include a solid electrolyte layer formed of a solid solution including a matrix polymer including an oxyethylene chain or oxypropylene chain, and an ionic liquid. Specifically, the solid electrolyte layer preferably includes a solid solution including a matrix polymer and an ionic liquid. Owing to the composition thereof, movements of ions in the direction along the surface of the electrolyte layer (horizontal direction) are suppressed to reduce in-plane density unevenness, and therefore both hardness and high ion conductivity are obtained. Moreover, the matrix structure is adjusted (controlled) by the above-described composition to obtain desired ion conductivity of the solid electrolyte layer.

Note that, ion conductivity of the solid electrolyte layer is preferably 0.1 mS/cm or greater but 50 mS/cm or less.

The inorganic particles of the solid electrolyte layer are is not particularly limited and may be appropriately selected depending on the intended purpose, as long as the inorganic particles can form a porous layer to hold an electrolyte and a curable resin. The inorganic particles are preferably a material having high insulation, transparency, and durability in view of stability of an electrochromic reaction, and visibility.

Examples of the inorganic particles include oxides or sulfide of silicon, aluminium, titanium, zinc, and tin, and mixtures thereof.

The size (average particle diameter) of the inorganic particles is not particularly limited and may be appropriately selected depending on the intended purpose. The size thereof is preferably 10 nm or greater but 10 μm or less, and more preferably 10 nm or greater but 100 nm or less.

An average thickness of the solid electrolyte layer is not particularly limited and may be appropriately selected depending on the intended purpose. The average thickness of the solid electrolyte layer is preferably 5 μm or greater but 500 μm or less, and more preferably 10 μm or greater but 100 μm or less. When the average thickness of the solid electrolyte layer is within the above-mentioned preferable range, short-circuit of current can be prevented and production cost can be kept low.

<Controlling Unit and Controlling Step>

The controlling unit is a unit configured to control to apply voltage to the electrochromic layer with the first electrode and the second electrode according to a driving pattern that is at least one selected from the group consisting of a first driving pattern, a second driving pattern, and an initialization driving pattern.

The controlling step is a step including controlling to apply voltage to the electrochromic layer of the electrochromic device with the first electrode and the second electrode according to a driving pattern that is at least one selected from the group consisting of a first driving pattern, a second driving pattern, and an initialization driving pattern.

The controlling unit is not particularly limited and may be appropriately selected depending on the intended purpose. For example, known integrated circuits, such as a central processing unit (CPU), and a field programmable gate array (FPGA), can be used. For example, the controlling unit is disposed in a pulse generator (voltage applying device), and the controlling unit is configured to apply voltage to the electrochromic layer via the pulse generator.

<<First Driving Pattern>>

The first driving pattern is a driving pattern for turning the electrochromic layer into a first coloring state.

According to the first driving pattern, a first voltage pulse A for increasing response of the electrochromic layer is applied, a first voltage pulse B that is for forming the first coloring state and is lower than the first voltage pulse A is applied, and then a state where voltage is not applied is maintained. When the electrochromic device of the present disclosure is driven according to the first driving pattern, responsiveness at the time when driving for increasing coloring density is performed can be improved, excellent durability can be obtained when the electrochromic device is continuously driven for a long period of time, and moreover electricity consumption can be kept low.

The first voltage pulse A is a pulse for increasing a response speed of the electrochromic layer. According to the first voltage pulse A, the charge amount used for a redox reaction of the electrochromic layer can be injected into the electrochromic layer within a short period. Therefore, is the response speed can be increased. The energy applied to the electrochromic layer by the first voltage pulse A is preferably larger than the energy used to color the electrochromic layer.

The responsiveness at the time when driving for increasing coloring density is performed can be improved by applying the first voltage pulse A.

The first voltage pulse B is a pulse for forming the first coloring state.

The first coloring state is a state where coloring density is higher than a second coloring state described later. The state where the coloring density is high is, in other words, a state where light transmittance is low (electrochromic layer is deeply colored and does not pass light through very much).

For example, the coloring density of the electrochromic device can be determined by measuring a transmittance spectrum of a substantially center of the colored region thereof using a panel module evaluator LCD5200 (available from Otsuka Electronic Co., Ltd.).

The first voltage pulse B is a pulse lower than the first voltage pulse A.

The pulse being low means that the energy applied (supplied) by the pulse is low. The energy applied by the pulse can be adjusted by controlling the average voltage, the amperage, the application duration etc., as described above. The average voltage, the amperage, and the application duration may be collectively referred to as "pulse properties" hereinafter.

The first voltage pulse B can be made smaller than the first voltage pulse A by controlling the amperage. The amperage can be controlled, for example, by adjusting the average voltage of the first voltage pulse B to be smaller than the average voltage of the first voltage pulse A, or adjusting the application duration of the voltage of the first voltage pulse B to be shorter than the application duration of the voltage of the first voltage pulse A.

The largeness of the average voltage of each pulse means largeness (an absolute value) of the average voltage of the same sign. For example, 2 V is determined as being larger than 1 V, and −2 V is determined as being larger than −1 V. Note that the first voltage pulse A and the first voltage pulse B have the same sign (same polarity).

Moreover, the first coloring state, which can be formed by applying the first voltage pulse B, has the higher coloring density than coloring density of a second coloring state described later. In the electrochromic device is already in the second coloring state, for example, the coloring density can be therefore made high (large) by driving the electrochromic device according to the first driving pattern.

According to the first driving pattern, the first voltage pulse B is applied, and then a state where voltage is not applied is maintained. In other words, the circuit of the electrochromic device is turned into an open-circuit after applying the first voltage pulse B in the first driving pattern.

Since the electrochromic device of the present disclosure has a solid electrolyte layer, a memory effect is exhibited, namely, a colored state or a decolored state is maintained for a certain period without applying voltage. Therefore, the coloring density can be maintained even when the circuit is in an open-circuit state.

Moreover, the first driving pattern preferably includes repeating cycles of application of the first voltage pulse B, and maintenance of a state where voltage is not applied after the application of the first voltage pulse B. As a result, even in the case where the electrochromic device is continuously used over a long period, electricity consumption can be kept low, deterioration of the electrochromic layer due to continuous application of voltage can be prevented, and durability can be improved.

Figure 2:
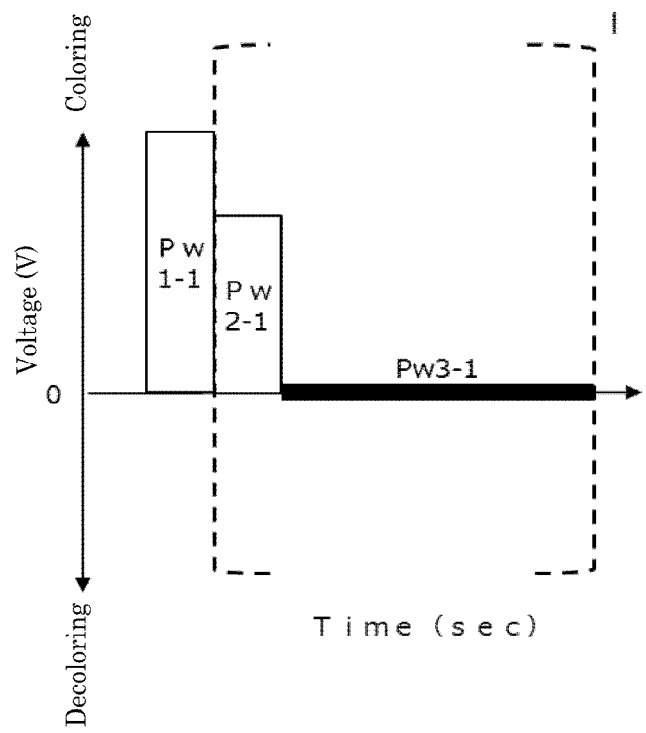
FIG. 2 is a diagram depicting one example of a driving pattern of a first driving pattern.

FIG. 2 is a diagram depicting one example of a driving pattern of the first driving pattern.

In the example depicted in FIG. 2, Pw1-1 corresponds to the first voltage pulse A, Pw2-1 corresponds to the first voltage pulse B, and Pw3-1 corresponds to the state where voltage is not applied. Moreover, the section marked with the dashed lines in FIG. 2 is a section where a cycle of the application of the first voltage pulse B, and maintenance of the state where voltage is not applied after the application of the first voltage pulse B is repeated, and the letter 1 depicted at the top right area of the section marked with the dashed lines is the number of repeated cycles according to the driving duration.

Figure 15:
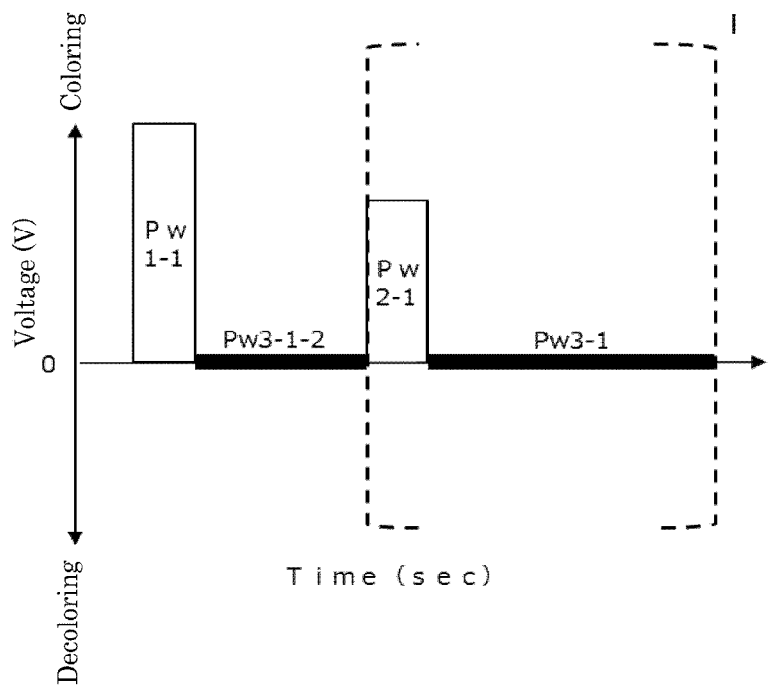
FIG. 15 is a diagram illustrating another example of a driving pattern of a first driving pattern.

FIG. 15 is a diagram depicting another example of a driving pattern of the first driving pattern.

In the example depicted in FIG. 15, different from the example depicted in FIG. 2, the state where voltage is not applied (Pw3-1-2) is maintained between Pw1-1 corresponding to the first voltage pulse A and Pw2-1 corresponding to the first voltage pulse B.

The duration for maintaining the state where voltage is not applied (Pw3-1-2) is not particularly limited and may be appropriately selected depending on the intended purpose, as long as the duration is a duration by which an effect for increasing a response speed obtained by the application of the first voltage pulse A is not lost.

As described above, in the first driving pattern, the state where voltage is not applied may be maintained between the first voltage pulse A and the first voltage pulse B.

<<Second Driving Pattern>>

The second driving pattern is a driving pattern for turning the electrochromic layer from the first coloring state into a second coloring state that has coloring density lower than the coloring density of the first coloring state.

According to the second driving pattern, a second voltage pulse A for increasing a response speed of the electrochromic layer is applied, a second voltage pulse B that is for forming a second coloring state and is higher than the second voltage pulse A or has reverse polarity to the polarity of the second voltage pulse A is applied, and then a state where voltage is not applied is maintained. Since the electrochromic device of the present disclosure is driven according to the second driving pattern, responsiveness is improved when driving for reducing coloring density is performed, excellent durability is obtained when the electrochromic device is continuously driven over a long period, and electricity consumption can be kept low.

Since the second voltage pulse A is a pulse for increasing a response speed of the electrochromic layer, the second voltage pulse A is a pulse lower than a second voltage pulse B described below, or a pulse having reverse polarity to the polarity of the second voltage pulse B.

As the second voltage pulse A is applied, an amount of charge used for redox reactions of the electrochromic layer can be injected into the electrochromic layer within a short period of time. Therefore, responsiveness when driving for reducing coloring density can be improved.

The second voltage pulse B is a pulse for forming a second coloring state that has coloring density lower than the coloring density of the first coloring state. In the case where the electrochromic device is already in the first coloring state, for example, the coloring density can be therefore made low (light) by driving the electrochromic device according to the second driving pattern.

The first voltage pulse B can be made smaller than the first voltage pulse A by controlling the amperage. Contrary to the control by the first driving pattern, the amperage can be controlled, for example, by making the average voltage of the second voltage pulse B larger than the average voltage of the second voltage pulse A, or making the application duration of the voltage of the second voltage pulse B longer than the application duration of the voltage of the second voltage pulse A. Typically, the second voltage pulse A and the second voltage pulse B have the same sign, and the first voltage pulse A and the first voltage pulse B have the same sign. However, a possible combination for use is that the second voltage pulse A has a different sign to that of the second voltage pulse A as the polarity of the second voltage pulse A is reversed. Specifically, the second voltage pulse B may have reverse polarity (different sign) to that of the second voltage pulse A. In this case, the second voltage pulse A may have a pulse larger or smaller than the second voltage pulse B.

According to the second driving pattern, similarly to the first is driving pattern, the second voltage pulse B is applied, and then a state where voltage is not applied is maintained. In other words, the circuit of the electrochromic device is turned into an open-circuit after applying the second voltage pulse B in the second driving pattern. Since the electrochromic device of the present disclosure has a solid electrolyte layer, a memory effect is exhibited, namely, a colored state or a decolored state is maintained for a certain period without applying voltage. Therefore, the coloring density can be maintained even when the circuit is in an open-circuit state.

Similarly to the first driving patter, moreover, the second driving pattern preferably includes repeating cycles of application of the second voltage pulse B and maintenance of a state where voltage is not applied after the application of the second voltage pulse B. As a result, even in the case where the electrochromic device is continuously used over a long period, electricity consumption can be kept low, deterioration of the electrochromic layer due to continuous application of voltage can be prevented, and durability can be improved.

Figure 3:
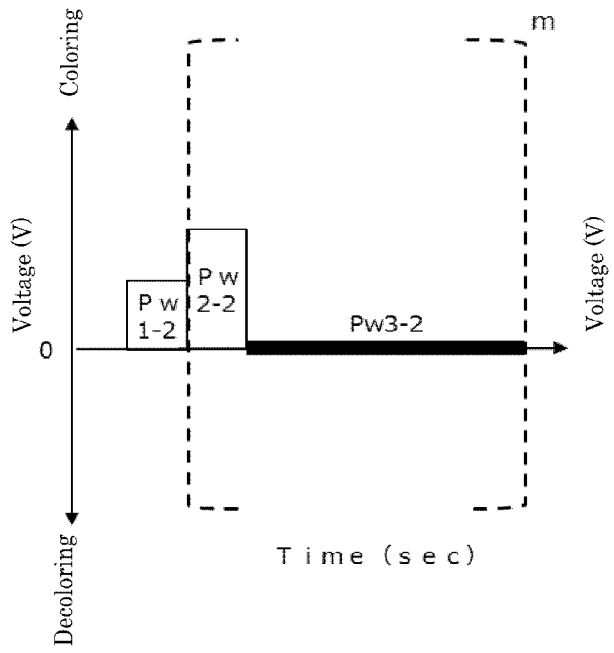
FIG. 3 is a diagram depicting one example of a driving pattern of a second driving pattern.

FIG. 3 is a diagram depicting one example of a driving pattern of the second driving pattern.

In the example depicted in FIG. 3, Pw1-2 corresponds to the second voltage pulse A, Pw2-2 corresponds to the second voltage pulse B, and Pw3-2 corresponds to the state where voltage is not applied. Moreover, the section marked with the dashed lines in FIG. 3 is a section where a cycle of the application of the second voltage pulse B, and maintenance of the state where voltage is not applied after the application of the second voltage pulse B is repeated, and the letter m depicted at the top right area of the section marked with the dashed lines is the number of repeated cycles according to the driving duration.

Figure 16:
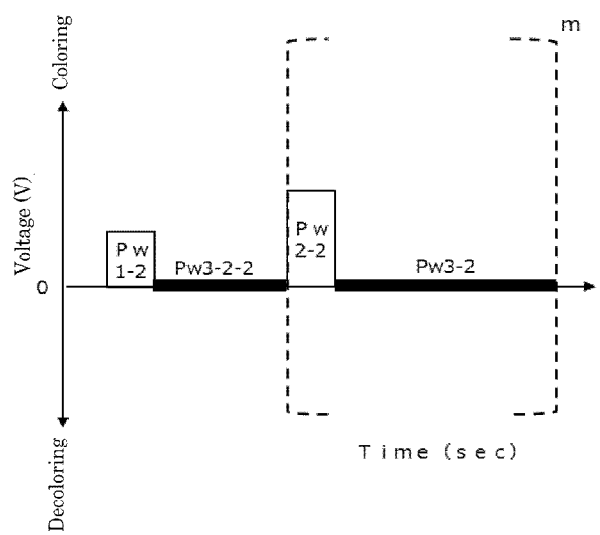
FIG. 16 is a diagram illustrating another example of a driving pattern of a second driving pattern.

FIG. 16 is a diagram depicting another example of a driving pattern of the second driving pattern.

In the example depicted in FIG. 16, different from the example depicted in FIG. 3, the state where voltage is not applied (Pw3-2-2) is maintained between Pw1-2 corresponding to the second voltage pulse A and Pw2-2 corresponding to the second voltage pulse B.

The duration for maintaining the state where voltage is not applied (Pw3-2-2) is not particularly limited and may be appropriately selected depending on the intended purpose, as long as the duration is a duration by which an effect for increasing a response speed obtained by the application of the second voltage pulse A is not lost.

As described above, in the second driving pattern, the state where voltage is not applied may be maintained between the second voltage pulse A and the second voltage pulse B.

<<Initialization Driving Pattern>>

The initialization driving pattern is a driving pattern for forming an initial decolored state.

According to the initialization driving pattern, an initialization voltage pulse A that has reverse polarity to the polarity of the first voltage pulse A and is for increasing a response speed of the electrochromic layer is applied, and then an initialization voltage pulse B for making potential of the electrochromic layer substantially 0 V is applied or a short-circuit is caused in order to form the initial decolored state.

The initialization voltage pulse A has the reverse polarity to the polarity of the first voltage pulse A and the second voltage pulse A. The reverse polarity means to have an opposite sign. For example, the average voltage of the initialization voltage pulse is a minus value of voltage when the average voltage of the first voltage pulse is a plus value of voltage.

The responsiveness at the time when driving for increasing coloring density is performed can be improved by applying the initialization voltage pulse A.

The initialization voltage pulse B is a pulse for making the potential of the electrochromic layer substantially 0 V for forming the initial decolored state. To make the potential substantially 0 V means to adjust the potential to near 0 V in order to return the electrochromic layer to the initial decolored state (e.g., a transparent state).

For example, the application of the initialization voltage pulse B can be performed by applying a pulse of voltage of substantially 0 V.

According to the initialization driving pattern, moreover, the controlling unit may cause a short-circuit between the first electrode and the second electrode in order to make the potential of the electrochromic layer substantially 0 V. The short-circuit according to the initialization driving pattern may be performed, for example, by connecting the first electrode to the second electrode using the controlling unit.

Figure 4:
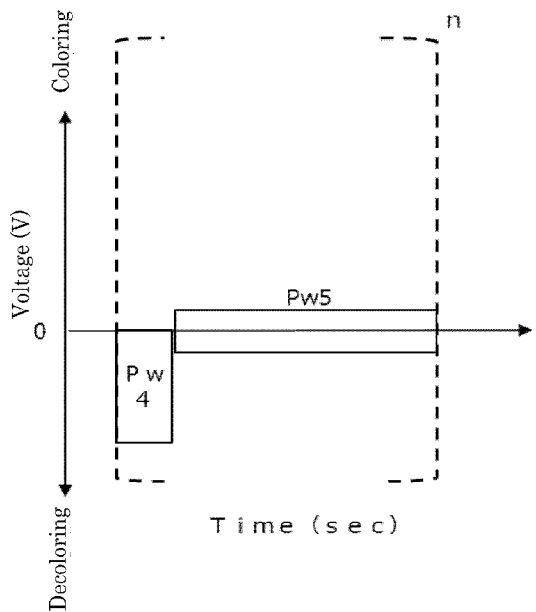
FIG. 4 is a diagram depicting one example of a driving pattern of an initialization driving pattern.

FIG. 4 is a diagram depicting one example of a driving pattern of the initialization driving pattern.

In the example depicted in FIG. 4, Pw4 corresponds to the initialization voltage pulse A, and Pw5 corresponds to the initialization voltage pulse B. Moreover, the section marked with the dashed lines in FIG. 4 is a section where a cycle of the application of the initialization voltage pulse A and the application of the initialization voltage pulse B is repeated, and the letter n depicted at the top right area of the section marked with the dashed lines is the number of repeated cycles according to the driving duration.

Figure 17:
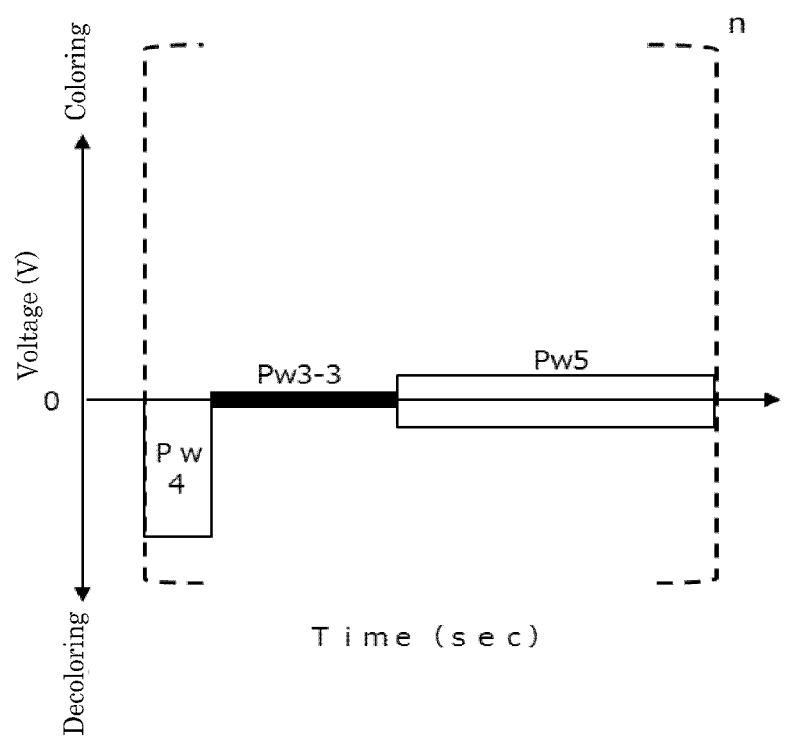
FIG. 17 is a diagram illustrating another example of a driving pattern of an initialization driving pattern.

FIG. 17 is a diagram depicting another example of a driving pattern of the initialization driving pattern.

In the example depicted in FIG. 17, different from the example depicted in FIG. 4, the state where voltage is not applied (Pw3-3) may be maintained between Pw4 corresponding to the initialization voltage pulse A and Pw 5 corresponding to the initialization voltage pulse B.

The duration for maintaining the state where voltage is not applied (Pw3-3) is not particularly limited and may be appropriately selected depending on the intended purpose, as long as the duration is a duration by which an effect for increasing a response speed obtained by the application of the initialization voltage pulse A.

As described above, in the initialization driving pattern, the state where voltage is not applied may be maintained between the initialization voltage pulse A and the initialization voltage pulse B.

Similarly, in the initialization driving pattern, the state where voltage is not applied may be maintained between the application of the initialization voltage pulse A and the short-circuit.

In the present disclosure, specifically, the state where voltage is not applied may be maintained between the first voltage pulse A and the first voltage pulse B, or between the second voltage pulse A and the second voltage pulse B, or the initialization voltage pulse A and the initialization voltage pulse B, or between the application of the initialization voltage pulse A and the short-circuit, or any combination thereof. As a result, the electrochromic layer can be turned into a stable state from a redox state where the electrochromic layer is excessively reacted through two-electron transfer reactions etc., and therefore durability can be improved.

In the first driving pattern and the second driving pattern, moreover, the first voltage pulse B and the second voltage pulse B are preferably 1.23 V or less. The driving deterioration caused by the contained moisture present in the electrochromic layer and the solid electrolyte layer can be prevented by making the average voltage of the first voltage pulse B and the second voltage pulse B, which may be repeatedly applied as described above, 1.23 V or less that is equal to or less than the decomposition voltage of water.

<Measuring Unit and Measuring Step>

The electrochromic device preferably includes a measuring unit configured to measure open-circuit voltage between the first electrode and the second electrode. Note that, the measuring step is suitably performed by the measuring unit.

In the case where the electrochromic device includes the measuring unit, the controlling unit preferably caries the pulse properties of the first voltage pulse B and the second voltage pulse B according to the measured open-circuit voltage, when the state where voltage is not applied is maintained in the first driving pattern and the second driving pattern. As a result, the controlling unit enables to control to open-circuit voltage that can color the electrochromic layer with desired density at any time, for example, when a cycle of the application of the first voltage pulse B or the second voltage pulse B and maintenance of the state where voltage is not applied after the application of the pulse is repeated. Therefore, controllability of coloring density can be improved.

As described above, the pulse properties are parameter capable of controlling properties (shape) of a pulse, such as the average voltage, the amperage, the application duration, etc., in the first voltage pulse B and the second voltage pulse B.

<Support>

The electrochromic device of the present disclosure preferably includes a support.

The support is configured to support the first electrode, the electrochromic layer, the solid electrolyte layer, the second electrode, the first auxiliary electrode, the second auxiliary electrode, and the controlling unit.

The support is not particularly limited and may be appropriately selected depending on the intended purpose. For example, a known light-transmittance material (organic material or inorganic material) can be used as the support.

Examples of the light-transmittance material include glass substrates of non-alkali glass, borosilicate glass, float glass, soda-lime glass, etc. Moreover, for example, a resin substrate of a polycarbonate resin, an acrylic resin, polyethylene, polyvinyl chloride, polyester, an epoxy resin, a melamine resin, a phenol resin, a polyurethane resin, a polyimide resin, etc. may be used as the light-transmittance material.

In order to enhance vapor barrier properties, gas barrier properties, and visibility, moreover, a surface of the support 1 may be coated with a transparent insulation layer, an anti-reflection layer, etc. In the case where the electrochromic device is a reflective display device that is viewed from one side thereof, transparency of a support disposed at the side that is not viewed is not important.

An average thickness of the support is not particularly limited and may be appropriately selected depending on the intended purpose. The average thickness thereof is preferably 0.1 mm or greater but 2.0 mm or less. When the average thickness of the support is 0.1 mm or greater, deformation of the support and the electrochromic device can be prevented and handling thereof can be improved. When the average thickness of the support is 2.0 mm or less, a weight and production cost thereof can be kept low.

<Protective Layer>

The electrochromic device of the present disclosure preferably includes a protective layer.

The protective layer is a layer formed to physically and chemically protect, for example, sides of the electrochromic device.

For example, the protective layer is formed by applying a UV curable or heat curable insulation resin etc. to cover side surfaces and/or a top surface of the electrochromic device, and curing the resin.

Moreover, the protective layer is preferably a protective layer in which a curable resin and an inorganic material are laminated. Since the protective layer has a laminate structure with the inorganic material, barrier properties of the electrochromic device against oxygen or water can be improved.

The inorganic material is preferably a material having high insulation properties, transparency, and durability. Specific examples thereof include oxides or sulfates of silicon, aluminium, titanium zinc, or tin, and mixtures thereof. The protective layer including any of the above-listed materials can be easily formed by a vacuum film formation process, such as sputtering and vapor deposition.

An average thickness of the protective layer is not particularly limited and may be appropriately selected depending on the intended purpose. The average thickness is preferably 0.5 μm or greater but 10 μm or less. When a support is shaped, moreover, the protective layer may be formed after the forming.

<Antidegradation Layer>

The electrochromic device of the present disclosure preferably includes an antidegradation layer.

The antidegradation layer is configured to perform a reverse chemical reaction to a reaction of the electrochromic layer to balance the charge and to prevent corrosion or deterioration of the second electrode layer, which may be caused by an irreversible redox reaction. Since the electrochromic device includes the antidegradation layer, stability of the electrochromic device over repetitive use is improved. Note that, the reverse reaction includes to function as a capacitor, as well as oxidation and reduction of the antidegradation layer.

A material of the antidegradation layer is not particularly limited and may be appropriately selected, as long as the material is configured to prevent corrosion of the first electrode and second electrode, which may be caused by an irreversible redox reaction.

As the material of the antidegradation layer, for example, usable are antimony-doped tin oxide, nickel oxide, titanium oxide, zinc oxide, tin oxide, or conductive or semiconductive metal oxide containing a plurality of the foregoing materials. In the case where a tint of the antidegradation layer is not a problem, moreover, the material identical to any of the above-listed electrochromic materials can be used.

In the case where the electrochromic device is produced as an optical element transparency of which is important, such as lens, among the above-listed examples, a material having high transparency is preferably used as the antidegradation layer.

As the material having high transparency, n-type semiconductor oxide particles (n-type semiconductor metal oxide) are preferably used. As the n-type semiconductor metal oxide, usable are particles having a primary particle diameter of 100 nm or less and formed of titanium oxide, tin oxide, zinc oxide, or a compound including any combination of the foregoing metal oxides, or a mixture thereof. In the case where the n-type semiconductor oxide particles are formed into the antidegradation layer, the electrochromic layer preferably includes a material that changes a color thereof through oxidation reactions. As a result, the n-type semiconductor metal oxide is easily reduced (injected with electrons) at the same time when the electrochromic layer undergoes an oxidization reaction, and therefore driving voltage can be decreased. In such a preferable embodiment, examples of the particularly preferable electrochromic material include a triarylamine derivative including a radical polymerizable functional group represented by General Formula (1).

Meanwhile, examples of a material of a p-type semiconductor layer having high transparency serving as the antidegradation layer include an organic material including a nitroxy radical (NO radical). Specific examples thereof include derivatives of 2,2,6,6-tetramethylpiperidine-N-oxyl (TEMPO) and polymer materials of the derivatives.

In the case where the p-type semiconductor layer is used as the antidegradation layer, the electrochromic layer preferably includes a material that changes a color thereof through reduction reactions. As a result, the p-type semiconductor metal oxide is easily oxidized at the same time when the electrochromic layer undergoes a reduction reaction, and therefore driving voltage can be decreased. In such an embodiment, the particularly preferable electrochromic material is the dipyridine-based compound represented by General Formula (4).

In the electrochromic device of the present disclosure, moreover, it is preferable that an electrochromic layer having an absorption band in a visible range in an oxidized state be formed a surface of the first electrode or second electrode, and an electrochromic layer that also functions as the antidegration layer and has an absorption band in a visible range in a reduced state be formed a surface of the other electrode. By driving the oxidization-coloring electrochromic layer and the reduction-coloring electrochromic layer at the same time, high coloring density can be obtained, and driving voltage can be reduced.

Specifically, it is preferable that the electrochromic device of the present disclosure include two electrochromic layers, where one of the electrochromic layers is a first electrochromic layer including an electrochromic material that can color in an oxidized state, and the other electrochromic layer is a second electrochromic layer including an electrochromic material that can color in a reduced state. Owing to the configuration as described above, the oxidization-coloring electrochromic layer and the reduction-coloring electrochromic layer can be driven at the same time, and therefore high coloring density can be obtained, and driving voltage can be reduced.

The electrochromic compound having an absorption band in a visible range in an oxidized state and used in the oxidization-coloring electrochromic layer preferably includes the radical polymerizable compound including triarylamine represented by General Formula (1). Moreover, the electrochromic compound having an absorption band in a visible range in a reduced state and used in the reduction-coloring electrochromic layer preferably includes the dipyridine compound represented by General Formula (4). The above-mentioned materials have low redox reaction potential and give stable redox reaction states, and light absorption (i.e., color) thereof can be easily changed by changing molecular structures thereof. Particularly, a black display exhibiting broad light absorption can be realized by adjusting light absorption of the two materials.

Note that, as the antidegradation layer, a deterioration prevention function can be imparted to the solid electrolyte layer by mixing a material for the antidegradation layer into the solid electrolyte layer.

A formation method of the antidegradation layer is not particularly limited and may be appropriately selected depending on the intended purpose. Examples thereof include vacuum vapor deposition, sputtering, and ion plating.

When a material of the antidegradation layer is a material that can be formed into a film through coating, moreover, usable as the formation method thereof are spin coating, casting, microgravure coating, gravure coating, bar coating, roll coating, wire bar coating, dip coating, slit coating, capillary coating, spray coating, nozzle coating, and various printing methods, such as gravure printing, screen printing, flexographic printing, offset printing, reverse printing, and inkjet printing.

[Use of Electrochromic Device]

Use of the electrochromic device of the present disclosure is not particularly limited and may be appropriately selected depending on the intended purpose. For example, the electrochromic device can be suitably used as a dimming device.

Examples of the dimming device (electrochromic dimming device) using the electrochromic device of the present disclosure include dimming spectacles, anti-glare mirrors, and dimming glass. Among the above-listed examples, a pair of dimming spectacles, which is a wearable device, is particularly preferable.

Since it is important for a battery used in a pair of the dimming spectacles (dimming sun glasses), which is a wearable device, to be light and small in view of safety, a dimming unit (electrochromic layer) is preferably driven with low electricity. Since the wearable device is worn at the time of use, moreover, high safety thereof is important compared with other use of the electrochromic device.

The wearable device using the electrochromic device of the present disclosure has high strength and safety against externally applied impacts, has excellent durability when the wearable device is continuously driven over a long period, can keep electricity consumption low, and has significantly excellent characteristics as a wearable device. Since responsiveness and uniformity of coloring density are high when the wearable device of the present disclosure is driven to color or decolor, moreover, the wearable device is particularly preferably used as a pair of dimming spectacles.

(Production Method of Electrochromic Device)

Examples of a method for producing the electrochromic device of the present disclosure include methods described below. However, examples of the production method thereof are not limited to the methods described below.

For example, the method for producing the electrochromic device of the present disclosure preferably includes: a step including forming a first electrode and a first auxiliary electrode on or above a first support to produce a first member in which an electrochromic layer is formed on or above the first electrode; a step including forming a second electrode and a second auxiliary electrode on or above a second support to produce a second member in which the second electrode and the second auxiliary electrode are formed on or above the second support; a step including bonding the first member and the second member with sandwiching a solid electrolyte layer between the first member and the second member to produce an electrochromic element; and a step including connecting a controlling unit (driving circuit) to the produced electrochromic element.

Moreover, another example of the method for producing the electrochromic device of the present disclosure preferably includes: a step forming a first electrode and a first auxiliary electrode on or above a surface support; a step including forming an electrochromic layer on or above the first electrode; a step including forming a solid electrolyte layer one or above the electrochromic layer; a step including forming a second electrode and a second auxiliary electrode on or above the solid electrolyte layer; a step including forming a protective layer on or above the second electrode to produce an electrochromic element; and a step including connecting a controlling unit (driving circuit) to the produced electrochromic element. According to the method as described, productivity can be improved because the method does not include a bonding step.

Embodiments of the present disclosure will be described below, but the present disclosure is not limited to the embodiments below in any way.

Note that, the number, position, shape, etc. of the constitutional members below are not limited to those in the embodiments below, and may be appropriately adjusted to the number, position, shape, etc. of the constitutional members preferable for carrying out the present disclosure.

First Embodiment

Figure 5A:
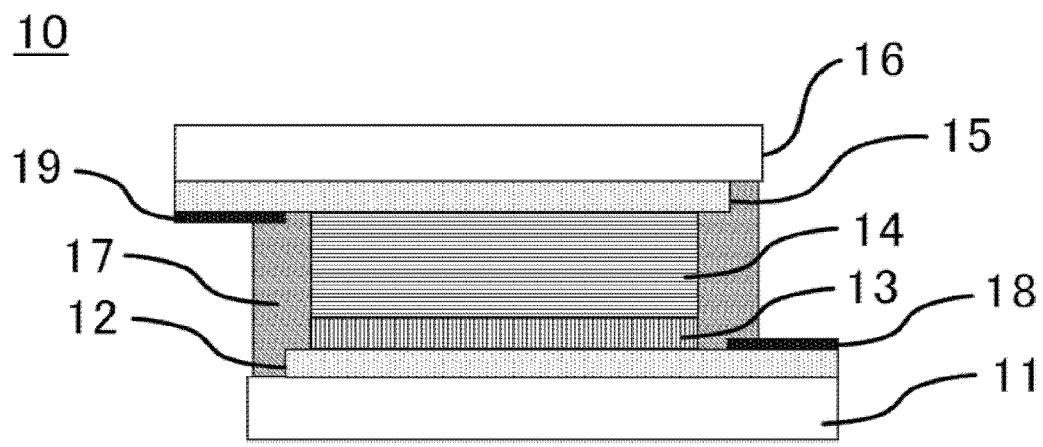
FIG. 5A is a schematic side view illustrating one example of an electrochromic device according to a first embodiment.
Figure 5B:
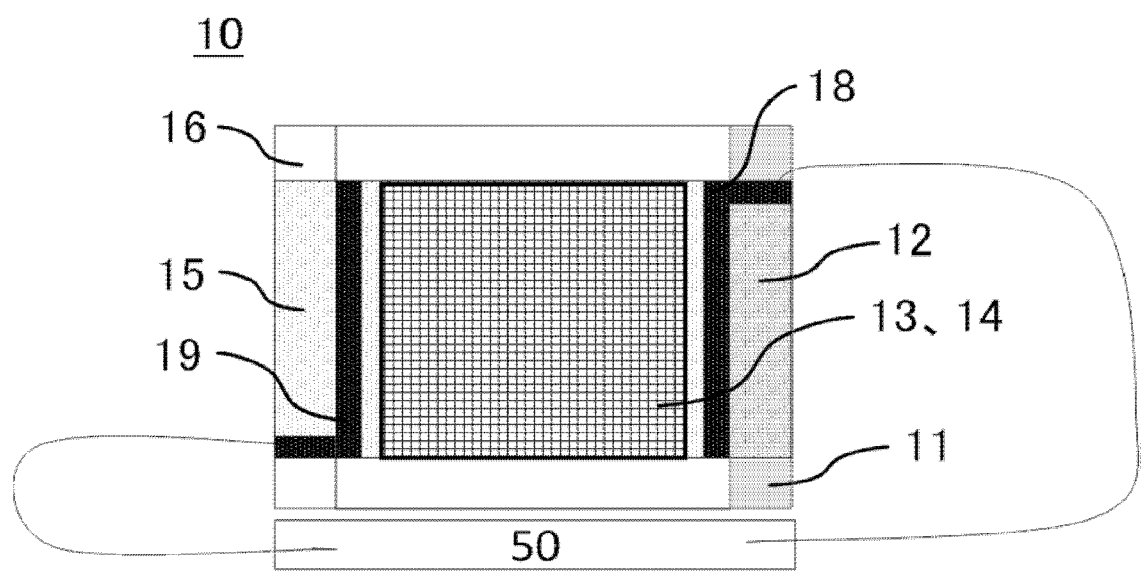
FIG. 5B is a schematic top view illustrating one example of the electrochromic device according to the first embodiment.

FIG. 5A is a schematic side view illustrating one example of the electrochromic device according to the first embodiment. FIG. 5B is a schematic top view illustrating one example of the electrochromic device according to the first embodiment.

As illustrated in FIGS. 5A and 5B, the electrochromic device 10 includes a first transparent support 11, a first transparent electrode 12 serving as a first electrode, an electrochromic layer 13, a solid electrolyte layer 14, a second transparent electrode 15 serving as a second electrode, and a second transparent support 16 in this order. Moreover, the electrochromic device 10 includes a first auxiliary electrode 18 on the first transparent 12, a second auxiliary electrode 19 on the second transparent electrode 15, and a protective layer 17 for sealing the electrochromic layer 13 and the solid electrolyte layer 15. In addition, the electrochromic device 10 includes a driving circuit 20 serving as a controlling unit where the driving circuit 20 is connected to the first auxiliary electrode 18 and the second auxiliary electrode 19.

Inside the electrochromic device 10, moreover, the first transparent electrode 12 and the second transparent electrode 15 are each arranged to be overlapped with part of the protective layer 17. Owing to the structure as mentioned, an effect of preventing oxygen and moisture permeating redox layers (e.g., an electrochromic layer, an antidegradation layer, and an electrolyte layer) is obtained by the inorganic material transparent electrode. Therefore, reliability (e.g., driving stability and mechanical strength) of the electrochromic device 10 particularly using a resin substrate as the support can be improved. This characteristic is the same in the second embodiment, third embodiment, fourth embodiment and fifth embodiment described below.

In the electrochromic device 10, moreover, the average distance between the first auxiliary electrode 18 and the second auxiliary electrode 19 is 100 mm or less. Furthermore, the first auxiliary electrode 18 and the second auxiliary electrode 19 are disposed not to be in contact with (to have no-contact with) the electrochromic layer 13 and the solid electrolyte layer 14 in the electrochromic device 10.

The electrochromic device 10 can be colored or decolored through redox reactions caused as the electrochromic layer 13 receives or releases charge when the driving circuit 50 applies voltage between the first auxiliary electrode 18 and the second auxiliary electrode 19 according to a driving pattern selected from the group consisting of the first driving pattern, the second driving pattern, and the initialization driving pattern.

<<Production Method of Electrochromic Device of First Embodiment>>

A production method of the electrochromic device 10 of the first embodiment includes: a step including forming a first transparent electrode 12 on a first transparent support 11; a step including forming a first auxiliary electrode 18 on one edge of the first transparent electrode 12; a step including laminating an electrochromic layer 13 to be in contact with a surface of the first transparent electrode 12; a step including forming a second transparent electrode 15 on a second transparent support 16; a step including forming a second auxiliary electrode 19 on one edge of the second transparent electrode 15; a step including forming and curing a solid electrolyte layer 14 between the first transparent support 11 and the second transparent support 16, and sealing the periphery with a protective layer 17; and a step including connecting a driving circuit 20 to the first auxiliary electrode 18 and the second auxiliary electrode 19.

Moreover, another example of the production method of the electrochromic device 10 of the first embodiment includes: a step including forming a first transparent electrode 12 on a first transparent support 11; a step including forming a first auxiliary electrode 18 on one edge of the first transparent electrode 12; a step including laminating an electrochromic layer 13 to be in contact with a surface of the first transparent electrode 12; a step including forming and curing a solid electrolyte layer 14 on the electrochromic layer 13 and laminating a second transparent electrode 15 thereon; a step including forming a second auxiliary electrode 19 on one edge of the second transparent electrode 15; a step including forming a second transparent support formed of a curable resin on the second transparent electrode 15; a step including sealing the periphery with a protective layer 17; and a step connecting a driving circuit 20 to the first auxiliary electrode 18 and the second auxiliary electrode 19.

Second Embodiment

Figure 6A:
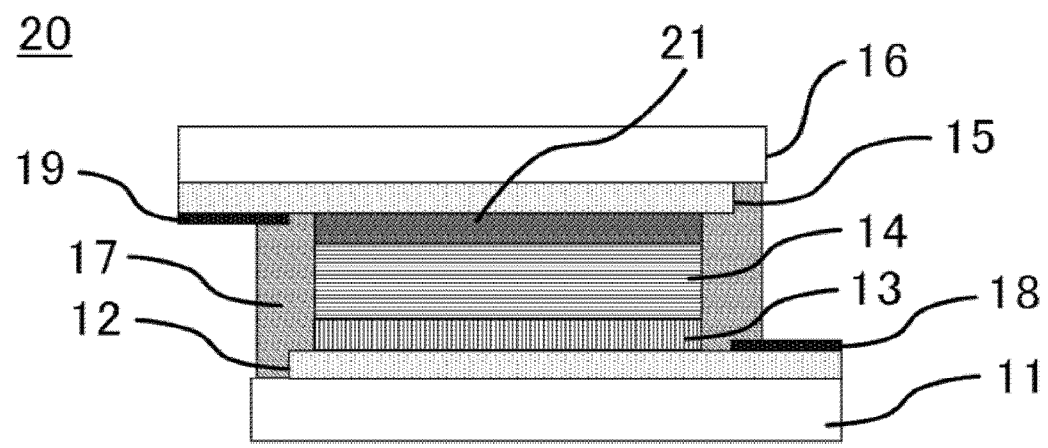
FIG. 6A is a schematic side view illustrating one example of an electrochromic device according to a second embodiment.

FIG. 6A is a schematic side view illustrating one example of the electrochromic device according to the second embodiment. FIG. GB is a schematic top view illustrating one example of the electrochromic device according to the second embodiment.

Figure 6B:
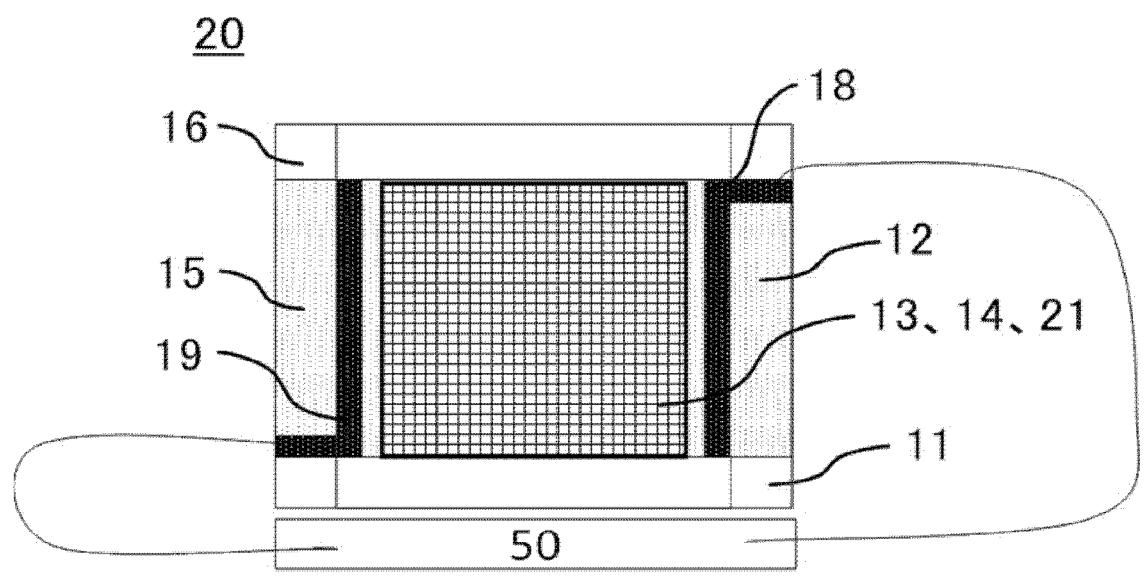
FIG. 6B is a schematic top view illustrating one example of the electrochromic device according to the second embodiment.

As illustrated in FIGS. 6A and 6B, the electrochromic device 20 of the second embodiment is different from the electrochromic device 10 of the first embodiment in that an antidegradation layer 21 is formed to be in contact with the solid electrolyte layer 14 and the second transparent electrode 15.

In the second embodiment, the antidegradation layer 21 is formed for preventing deterioration of the second transparent electrode 15 caused by electrochemical reactions. Therefore, the electrochromic device 20 according to the second embodiment has improved properties against repetitive use, compared with the electrochromic device 10 of the first embodiment.

Third Embodiment

Figure 7:
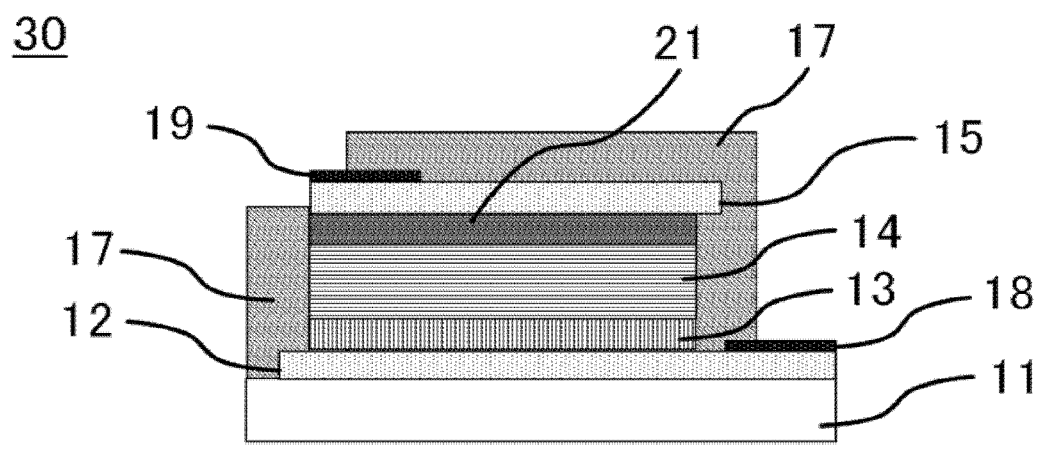
FIG. 7 is a schematic side view illustrating one example of an electrochromic device according to a third embodiment.

FIG. 7 is a schematic side view illustrating one example of the electrochromic device according to the third embodiment.

As illustrated in FIG. 7, the electrochromic device 30 of the third embodiment is different from the electrochromic device 20 of the second embodiment in that the second transparent support 16 is omitted, and the protective layer 17 is formed on the second transparent electrode 15.

The protective layer 17 formed on the second transparent electrode 15 may be formed of the material identical to or different from the material of the protective layer 17 formed at the sides of the electrochromic device 10. Since the electrochromic device 30 of the third embodiment is formed with one support (the first transparent support 11), the electrochromic device can be made thin, and low cost production thereof can be realized.

Fourth Embodiment

Figure 8:
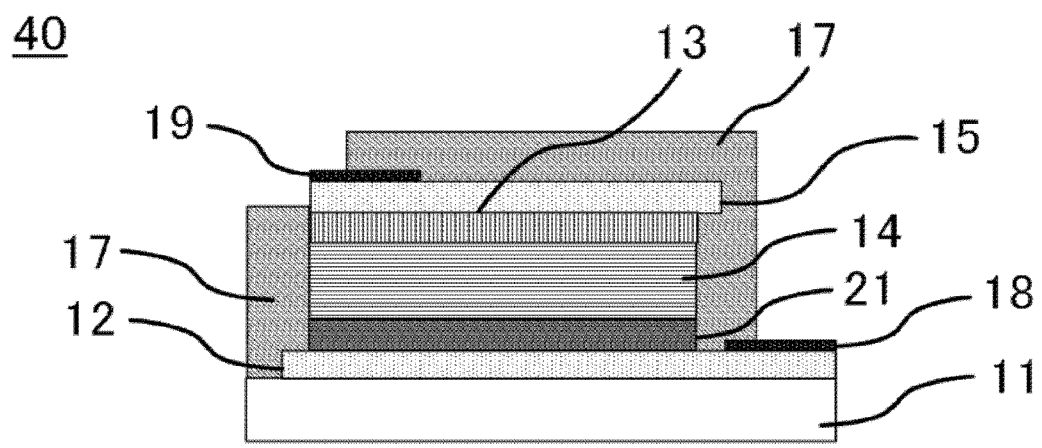
FIG. 8 is a schematic side view illustrating one example of an electrochromic device according to a fourth embodiment.

FIG. 8 is a schematic side view illustrating one example of the electrochromic device according to the fourth embodiment.

As illustrated in FIG. 8, the electrochromic device 40 of the fourth embodiment is different from the electrochromic device 30 of the third embodiment in that the positioning relationship between the electrochromic layer 13 and the antidegradation layer 21 is reversed.

In the electrochromic device 40 of the fourth embodiment, the positioning of each layer is different from other embodiments. However, the electrochromic device 40 can be colored or decolored through redox reactions caused as the electrochromic layer 13 receives or releases charge when voltage is applied between the first transparent electrode 12 and the second transparent electrode 15, similarly to other embodiments.

Fifth Embodiment

Figure 9A:
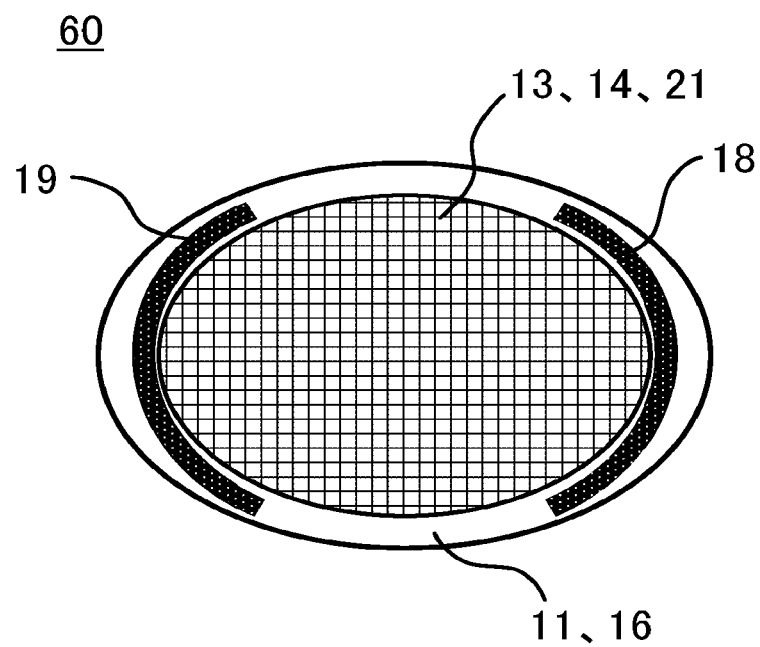
FIG. 9A is a schematic top view illustrating one example of the electrochromic device according to a fifth embodiment.

FIG. 9A is a schematic top view illustrating one example of the electrochromic device according to a fifth embodiment.

The electrochromic device 60 of the fifth embodiment is different from the electrochromic device 20 of the second embodiment in the shape of the electrochromic device. More specifically, the electrochromic device 60 of the fifth embodiment is an example where the plane shape of the electrochromic device 20 of the second embodiment is changed to an oval shape. For example, the electrochromic device 60 of the fifth embodiment can be suitably used as a lens of dimming spectacles.

In the example illustrated in FIG. 9A, the first auxiliary electrode 18 and the second auxiliary electrode 19 are shaped to face each other to match the circumferential shape of the electrochromic reaction region (the electrochromic layer 13, the solid electrolyte layer 14, and the antidegradation layer 21) in the electrochromic device 60. As illustrated, the first auxiliary electrode and the second auxiliary electrode may have curved line shapes in the electrochromic device of the present disclosure.

Figure 9B:
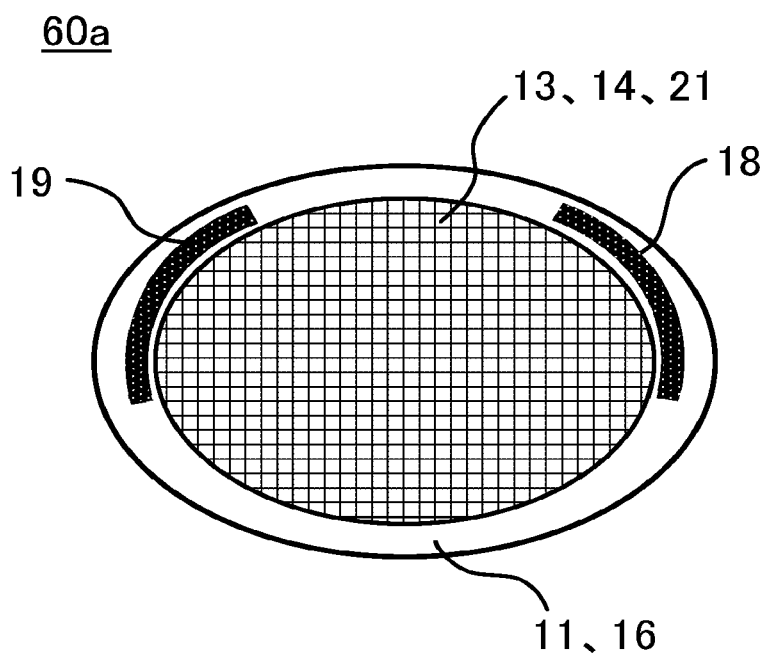
FIG. 9B is a schematic top view illustrating another example of the electrochromic device according to the fifth embodiment.

FIG. 9B is a schematic top view illustrating another example of the electrochromic device according to the fifth embodiment.

The electrochromic device 60a illustrated in FIG. 9B is an example where the length and arrangement of each of the first auxiliary electrode 18 and the second auxiliary electrode 19 are changed. As illustrated in FIG. 9B, the first auxiliary electrode 18 and the second auxiliary electrode 19 may be arranged parts of the circumferential area of the electrochromic reaction region (the electrochromic layer 13, the solid electrolyte layer 14, and the antidegradation layer 21) in the fifth embodiment.

Figure 9C:
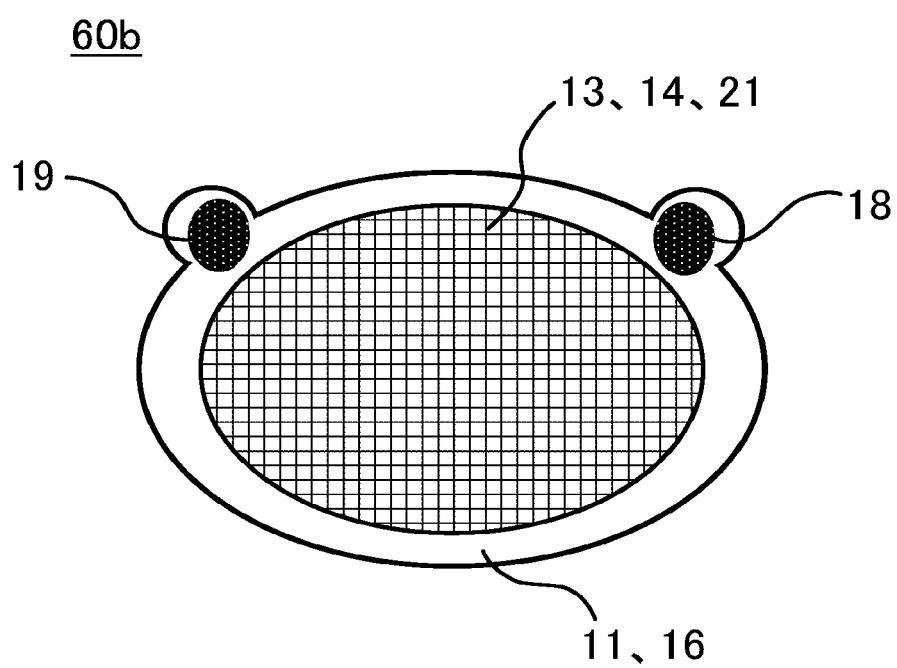
FIG. 9C is a schematic top view illustrating another example of the electrochromic device according to the fifth embodiment.

FIG. 9C is a schematic top view illustrating another example of the electrochromic device according to the fifth embodiment.

The electrochromic device 60b illustrated in FIG. 9C is an example where the shapes of the first auxiliary electrode 18 and the second auxiliary electrode 19 of the electrochromic device 60 illustrated in FIG. 9A are changed from the curved line shapes to dot shapes 9 oval shapes). As illustrated in FIG. 9C, the first auxiliary electrode and the second auxiliary electrode may have dot shapes in the electrochromic device of the present disclosure as long as the shapes thereof are in the size and arrangement with which functions as the auxiliary electrodes can be obtained.

Since the electrochromic device 60b includes the first auxiliary electrode 18 and the second auxiliary electrode 19 both of which are small in the size, for example, the electrochromic device 60b is suitably used as a lens of frame-less (no rom) dimming spectacles.

According to the present disclosure, it is possible to provide an electrochromic device having high responsiveness and uniformity of coloring density when coloring and decoloring driving is performed, has high strength and safety against externally applied impacts, has excellent durability when the electrochromic device is continuously driven over a long period of time, and can keep electricity consumption thereof low.

EXAMPLES

The present disclosure will be described below by way of Examples. The present disclosure should not be construed as being limited to these Examples.

Production Example 1

<Production of Electrochromic Device A>

In Production Example 1, an example of production of an electrochromic device 20 illustrated in FIGS. 6A and 6B will be described. Note that, Electrochromic Device A produced in Production Example 1 can be also used as a dimming device.

<<Formation of First Electrode and Electrochromic Layer>>

As a first transparent support 11, a square glass substrate each side of 50 mm and an average thickness of 0.7 mm was prepared.

Note that, as reaction potential of Structural Formula A determined by Ag/Ag+ reference electrode measurement (0.55 vs SHE), the average value of the peak of a one-electron transfer reaction is +0.33 V, the average value of the peak of a two-electron transfer reaction is +0.53 V, and the compound represented by Structural Formula A is a compound that can undergo a two-electron transfer reaction. As reaction potential of Structural Formula B determined by Ag/Ag+ reference electrode measurement (0.55 vs SHE), moreover, the average value of the peak of a one-electron transfer reaction is +0.36 V, the average value of the peak of the two-electron transfer reaction is +0.95 V, and the compound represented by Structural Formula B is a compound that can undergo a two-electron transfer reaction.

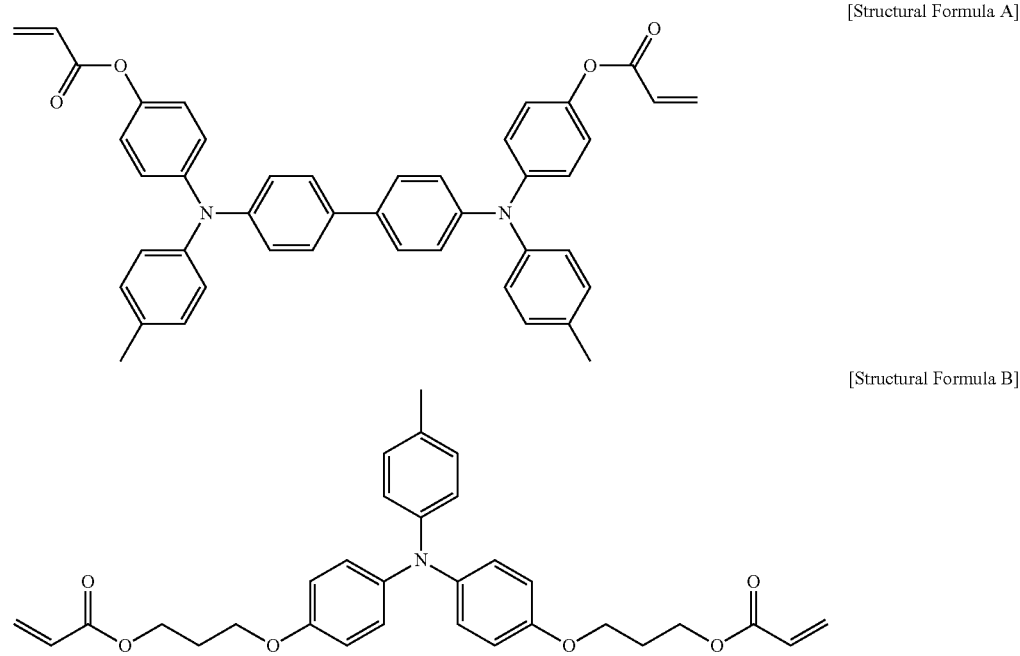

[Structural Formula A]

[Structural Formula B]

An ITO film having an average thickness of about 100 nm was formed on the region (50 mm×40 mm) of the first transparent substrate 11 by sputtering to form a first transparent electrode 12. The sheet resistance of the first transparent electrode 12 was 40 Ω/□.

Moreover, an AgPdCu alloy film (available from FURUYA METAL Co., Ltd.) having an average thickness of about 100 nm was formed on the region (40 mm×2 mm) of the edge of the first transparent electrode 12 and the region (5 mm×2 mm) of the first transparent electrode 12 by sputtering, to thereby form a first auxiliary electrode 18.

Next, polyethylene diacrylate (PEG400DA, available from Nippon Kayaku Co., Ltd.), a photopolymerization initiator (IRG184, available from BASF), the compound represented by Structural Formula A below, the compound represented by Structural Formula B below, and 2-butanone were blended at a mass ratio of (20:1:14:6:400) to thereby prepare a solution. The prepared solution was applied, and cured by UV irradiation in a nitrogen atmosphere to form an oxidation reactive electrochromic layer 13 in an electrochromic reaction region (40 mm×40 mm) on a surface of the ITO film. The average thickness of the electrochromic layer 13 was 1.3 μm.

<<Formation of Second Electrode and Antidegradation Layer>>

A second transparent support 16 having the same shape as the first transparent support 11 was prepared. In the same manner as the formation of the first transparent electrode 12 and the first auxiliary electrode 18, a second transparent electrode 15 and a second auxiliary electrode 19 were formed.

Next, a thickener was added to a tin oxide particle dispersion liquid (methanol dispersion, solid mass: 50%, average particle diameter: 18 nm), the resultant was applied by screen printing, and then annealing was performed for 15 minutes at 120° C., to thereby form a nano structure semiconductor material formed of a tin oxide particle film having an average thickness of about 3.5 μm on an electrochromic reaction region (40 mm×40 mm) on a surface of the ITO film.

Subsequently, a 2,2,3,3-tetrafluoropropanol solution including 2.0% by mass of the electrochromic compound represented by Structural Formula C below was applied, followed by performing annealing for 10 minutes at 120° C. to allow the tin oxide particle film bear (adsorb) the electrochromic compound, to thereby form a reduction reactive electrochromic layer that also functioned as an antidegradation layer 21.

[Structural Formula C]

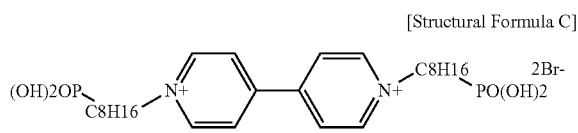

Subsequently, a dispersion liquid of SiO$_2$ particles having the average primary particle diameter of 20 nm (silica solid content: 24.8% by mass, polyvinyl alcohol: 1.2% by mass, and water: 74% by mass) was applied on the electrochromic layer 13 by spin coating, to thereby form an insulation inorganic particle layer having an average thickness of 2 μm.

<<Formation and Bonding of Solid Electrolyte Layer>>

Polyethylene dimethacrylate (molecular weight: 600), a photopolymerization initiator (IRG184, available from BASF), and an electrolyte (1-ethyl-3-methylimidazolium (bis(fluorosulfonyl)imide) were blended at a mass ratio of (50:5:45), to thereby prepare an electrolyte solution. Next, the prepared electrolyte solution was applied to the electrochromic reaction region (40 mm×40 mm) on the surface of the insulation inorganic particle layer on the second transparent support 16. Then, a UV curable resin (TB3035B, available from ThreeBond Holdings Co., Ltd.) was applied to the circumferential area of the applied electrolyte solution. Under the reduced pressure, the resultant was bonded to the surface of the electrochromic layer 13 on the first transparent support 11, and the UV curable resin was cured by ultraviolet ray (UV) irradiation, to thereby form a solid electrolyte layer 14 and a protective layer 17. The film thickness of the solid electrolyte layer 14 and the film thickness of the protective layer 17 were adjusted to have the average thickness of 50 μm by controlling the bonding gap, to thereby produce Electrochromic Electrode A. Note that, the average distance between the first auxiliary electrode 18 and the second auxiliary electrode 19 in Electrochromic Element A was 40 mm.

<<Connection of Driving Circuit>>

A driving circuit 20 was connected to the first auxiliary electrode 18 and second auxiliary electrode 19 of Electrochromic Element A, to thereby produce Electrochromic Device A as illustrated in FIGS. 6A and 6B. Note that, the driving circuit 20 was connected in a manner that the first auxiliary electrode 18 of the first transparent support 11 was to have positive polarity, and the second auxiliary electrode 19 of the second transparent support 16 was to have negative polarity. As the driving circuit 20, moreover, modulab Xm solartron analytical (available from TOYO Corporation) was used.

<Coloring Test>

Subsequently, a coloring test for confirming coloring properties of Electrochromic Device A produced was performed.

First, a transmission spectrum of Electrochromic Device A in a stable state where voltage of −1.2 V was continuously applied was measured in order to determine a coloring peak wavelength of the oxidation reactive electrochromic layer, and a coloring peak wavelength of the reduction reactive electrochromic layer in Electrochromic Device A. For the measurement of the transmittance spectrum, a pulse module evaluation device LCD5200 (available from Otsuka Electronic Co., Ltd.) was used.

Figure 10:
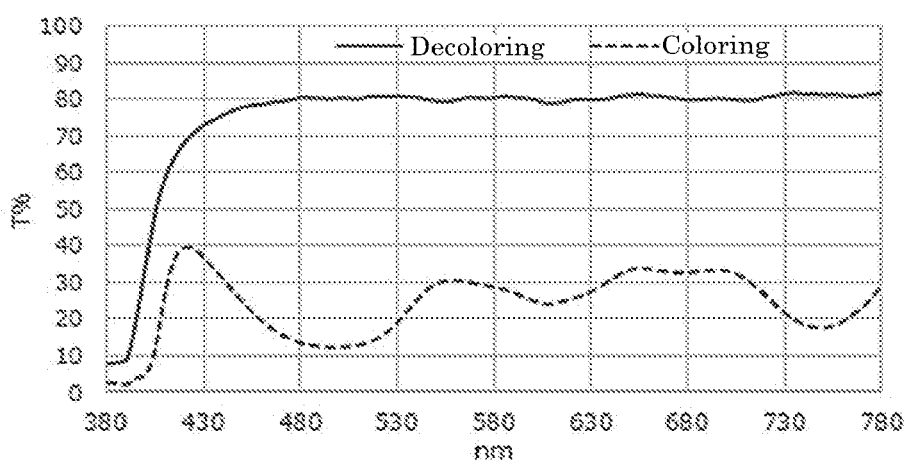
FIG. 10 is a graph depicting a result of measurement of a transmission spectrum of Electrochromic Device A.

FIG. 10 depicts the result of the measurement of the transmission spectra of Electrochromic Device A. As depicted in FIG. 10, the coloring peak wavelength of the oxidization reactive electrochromic layer of Electrochromic Device A was around 495 nm. Moreover, the coloring peak wavelength of the reduction reactive electrochromic layer was around 610 nm. In FIG. 10, the vertical axis represents a transmittance spectrum, and the horizontal axis represents a wavelength.

<<Operation According to First Driving Pattern>>

Next, a transmittance spectrum of the center area of the electrochromic reaction region (center area of the electrochromic layer) was measured while coloring Electrochromic Device A under the driving conditions for increasing the coloring density presented in Table 1 below (first driving pattern) using Electrochromic Device A which had been returned to a decolored state, to thereby measure the time required to stabilize a colored state of the oxidation reactive or reduction reactive electrochromic layer as an index for responsiveness. The results are presented in Table 1 as well as FIGS. 11A and 11B. As the colored state of Electrochromic Device A, the state where voltage of −1.2 V was applied was determined as a stable state.

TABLE 1

| | | Pw1-1 First voltage pulse A | | Pw2-1 First voltage pulse B | | Pw3-1 Open-circuit | Response (495 nm) | Response (610 nm) | In-plane color |
|---|---|---|---|---|---|---|---|---|---|
| | | V | sec | V | sec | sec | Sec | sec | unevenness |
| Ex. | P01 | −2.0 | 6 | −1.2 | 19 | 120 | 25 | 25 | None |
| | P02 | −1.8 | 8 | −1.2 | 19 | 120 | 27 | 27 | None |
| | P03 | −1.6 | 11 | −1.2 | 19 | 120 | 30 | 30 | None |
| | P04 | −1.5 | 15 | −1.2 | 19 | 120 | 34 | 34 | None |
| Comp. Ex. | R01 | — | — | −1.2 | 180 | — | 180 | 180 | None |

As presented in Table 1, according to the driving patterns P01 to P04, which corresponded to Examples of the present disclosure, a lapse of time until coloring response was 35 seconds or shorter both with the oxidation-reactive electrochromic layer and the reduction-reactive electrochromic layer. According to the driving pattern R01, which corresponded to Comparative Example of the present disclosure, on the other hand, the first voltage pulse A (Pw1-1) was not applied, and a lapse to of time until coloring response was 180 seconds or longer. Therefore, it was found that responsiveness could be improved by driving the electrochromic device according to the first driving pattern described in the present disclosure.

In the evaluations presented in Table 1, in case of the oxidation-reactive electrochromic layer, the time from the application of the driving voltage to the point when the transmittance at the coloring peak wavelength (495 nm) was to be about 13% or less, at which the transmittance was stabilized, was evaluated. In the evaluations presented in Table 1, in case of the reduction-reactive electrochromic layer, similarly, the time from the application of the first driving voltage B to the point when the transmittance at the coloring peak wavelength (610 nm) was to be about 23% or less, at which the transmittance was stabilized, was evaluated.

Moreover, it was confirmed that, according to the driving patterns P01 to P04, there was no unevenness in the colored state under the visual observation, and the coloring density was maintained even in the open-circuit state, even though the driving patterns P01 to P04 included a pattern where voltage was not applied, and the open-circuit state was maintained.

Figure 11A:
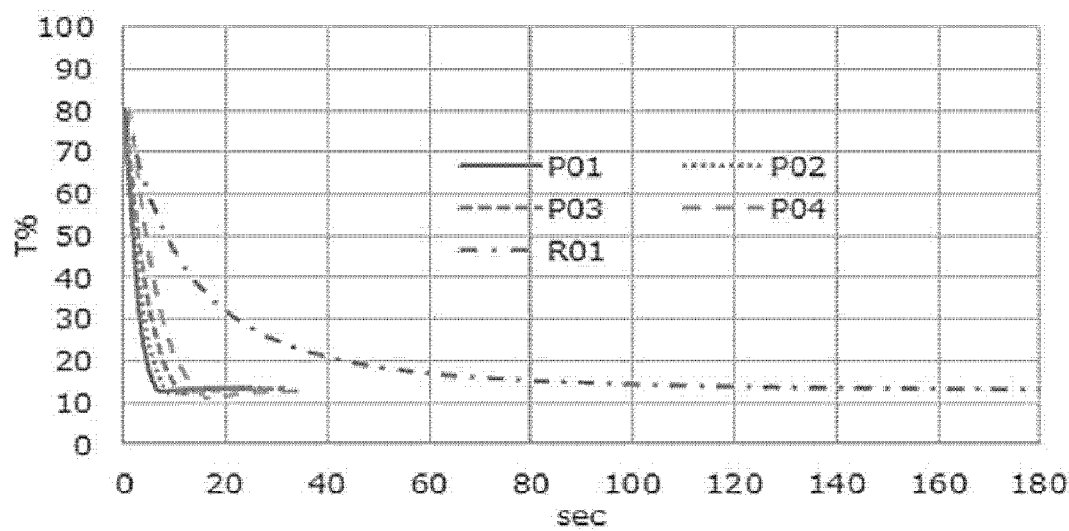
FIG. 11A is a graph depicting transmittance spectra of an oxidization-reactive electrochromic layer with light at a coloring peak wavelength when the electrochromic device of Production Example 1 is driven to increase coloring density.
Figure 11B:
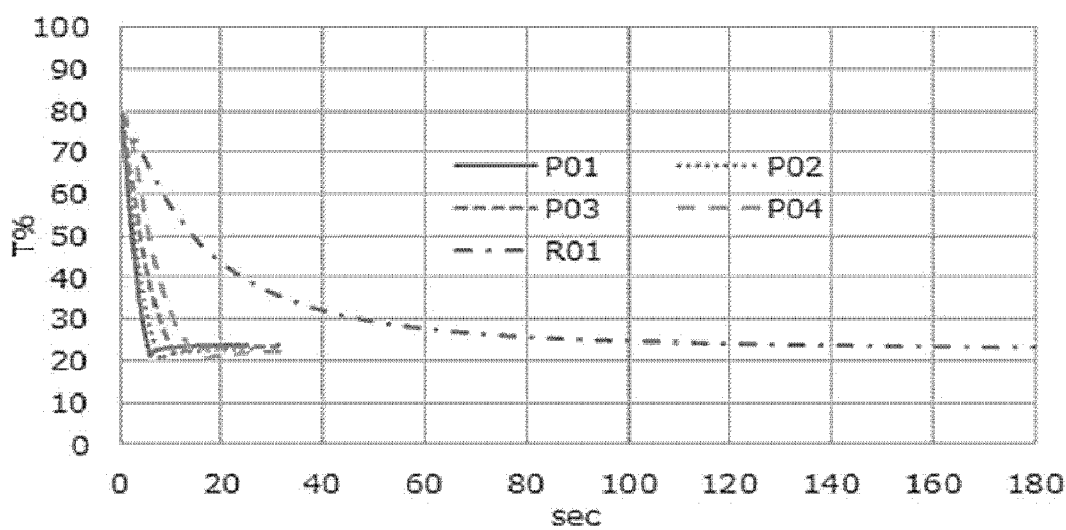
FIG. 11B is a graph depicting transmittance spectra of a reduction-reactive electrochromic layer with light at a coloring peak wavelength when the electrochromic device of Production Example 1 is driven to increase coloring density.

FIG. 11A is a graph depicting a change in light transmittance over time with a coloring peak wavelength of the oxidization-reactive electrochromic layer when the electrochromic device A of Production Example 1 is driven to give high coloring density. FIG. 11B is a graph depicting a change in light transmittance over time with a coloring peak wavelength of the reduction-reactive electrochromic layer when the electrochromic device A of Production Example 1 is driven to give high coloring density. In FIGS. 11A and 11B, the vertical axis represents a transmittance spectrum, and the horizontal axis represents the time from the application of the driving voltage is started.

As depicted in FIGS. 11A and 11B, it was found that responsiveness of the electrochromic layer could be improved according to the driving patterns P01 to P04.

<<Operation According to Second Driving Pattern>>

Subsequently, a transmittance spectrum of the center area of the electrochromic reaction region was measured while coloring Electrochromic Device A under the driving conditions for reducing the coloring density presented in Table 2 below (second driving pattern), to thereby measure the time required to stabilize a colored state of the oxidation reactive or reduction reactive electrochromic layer as an index for responsiveness. The results are presented in Table 2 and FIGS. 12A and 12B. As the colored state of Electrochromic Device A, the state where voltage of −1.0 V was applied was determined as a stable state (state where the coloring density was reduced to the certain density according to the second driving pattern). Moreover, the initial colored state (the initial colored state before the electrochromic device was driven according to the second driving pattern, and the state where the coloring density was high) was the state where voltage of −1.6 V was applied for 20 sec.

As presented in Table 2, according to the driving patterns P05 and P06, which corresponded to Examples of the present disclosure, a lapse of time until coloring response was 50 seconds with both the oxidization-reactive electrochromic layer and the reduction-reactive electrochromic layer. According to the driving pattern R02, which corresponded to Comparative Example of the present disclosure, on the other hand, the second voltage pulse A (Pw1-2) was not applied, and a lapse of time until coloring response was 120 seconds or longer. Therefore, it was found that responsiveness could be improved by driving the electrochromic device according to the second driving pattern described in the present disclosure.

In the evaluations presented in Table 2, in case of the oxidation-reactive electrochromic layer, the time from the application of the driving voltage to the point when the transmittance at the coloring peak wavelength (495 nm) was to be about 55% or greater, at which the transmittance was stabilized, was evaluated. In the evaluations presented in Table 2, in case of the reduction-reactive electrochromic layer, similarly, the time from the application of the driving voltage to the point when the transmittance at the coloring peak wavelength (610 nm) was to be about 63% or greater, at which the transmittance was stabilized, was evaluated.

Moreover, it was confirmed that, according to the driving patterns P05 and P06, there was no unevenness in the colored state under the visual observation, and the coloring density was maintained even in the open-circuit state, even though the driving patterns P05 and P06 included a pattern where voltage was not applied, and the open-circuit state was maintained.

Figure 12A:
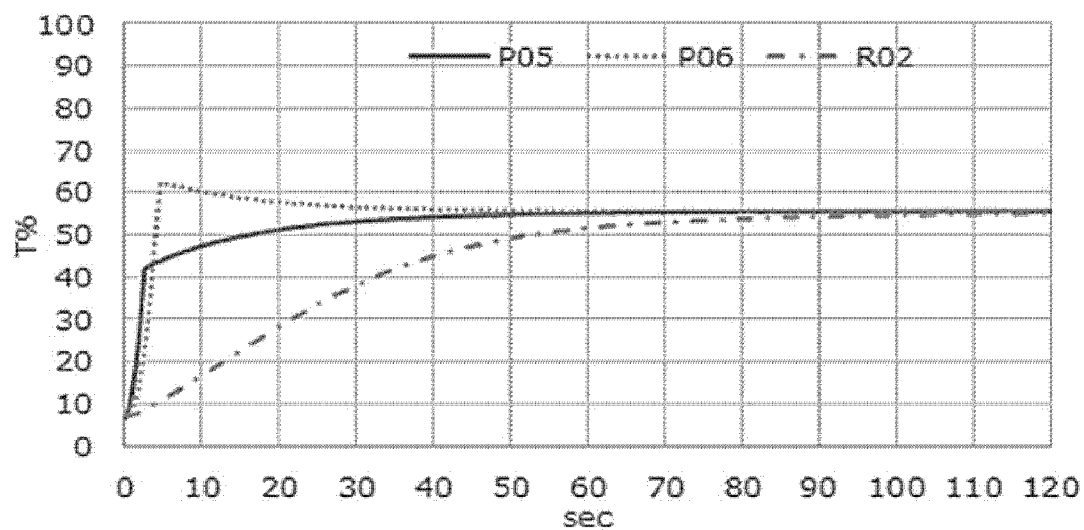
FIG. 12A is a graph depicting transmittance spectra of an oxidization-reactive electrochromic layer with light at a coloring peak wavelength when the electrochromic device of Production Example 1 is driven to reduce coloring density.
Figure 12B:
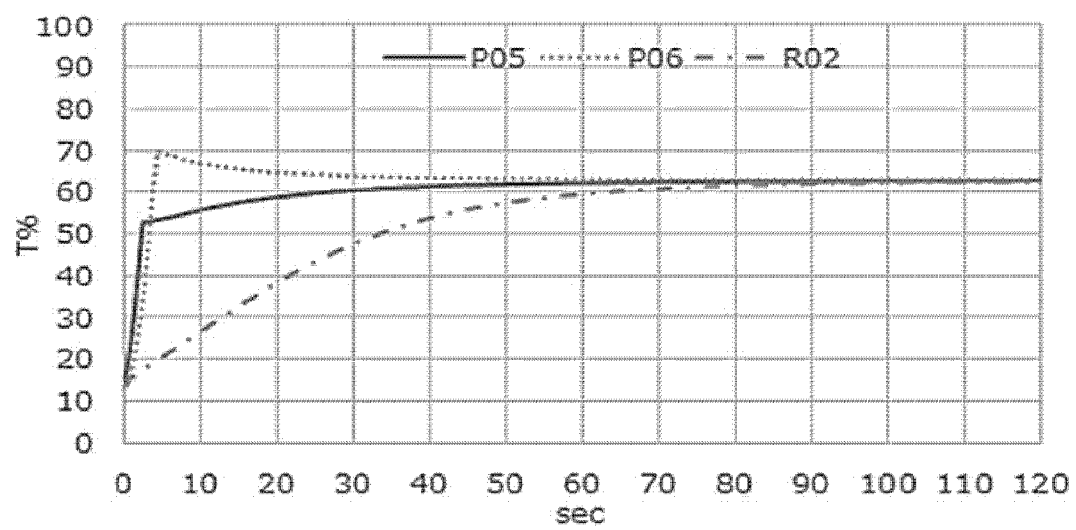
FIG. 12B is a graph depicting transmittance spectra of a reduction-reactive electrochromic layer with light at a coloring peak wavelength when the electrochromic device of Production Example 1 is driven to reduce coloring density.

FIG. 12A is a graph depicting a change in light transmittance over time with a coloring peak wavelength of the oxidation-reactive electrochromic layer when the electrochromic device A of Production Example 1 was driven to reduce the coloring density. FIG. 12B is a graph depicting a change in light transmittance over time with a coloring peak wavelength of the reduction-reactive electrochromic layer when the electrochromic device A of Production Example 1 was driven to reduce the coloring density. In FIGS. 12A and 12B, the vertical axis represents a transmittance spectrum, and the horizontal axis represents the time from the application of the driving voltage is started.

As depicted in FIGS. 12A and 12B, it was found that responsiveness of the electrochromic layer could be improved according to the driving patterns P05 and P06.

<<Operation According to Initialization Driving Pattern>>

Next, a transmittance spectrum of the center area of the electrochromic reaction region was measured while driving Electrochromic Device A under the driving conditions for initializing the coloring density of the electrochromic device presented in Table 3 below (initialization driving pattern), to thereby measure the time required to initialize the coloring state of the oxidation-reactive or reduction-reactive electrochromic layer. The results are presented in Table 3, and FIGS. 13A and 13B. Moreover, the initial colored state (the colored state before the electrochromic device was driven according to the initialization driving pattern, and the state where the electrochromic device was colored) was the state where voltage of −1.6 V was applied for 20 sec.

TABLE 2

|  |  | Pw1-2 Second voltage pulse A | | Pw2-2 Second voltage pulse B | | Pw3-2 Open-circuit | Response (495 nm) | Response (610 nm) | In-plane color unevenness |
| --- | --- | --- | --- | --- | --- | --- | --- | --- | --- |
|  |  | V | sec | V | sec | sec | sec | sec |  |
| Ex. | P05 | 0.6 | 2.5 | −1.0 | 46 | 120 | 50 | 50 | None |
|  | P06 | 0.3 | 4 | −1.0 | 46 | 120 | 50 | 50 | None |
| Comp. Ex. | R02 | — | — | −1.0 | 120 | — | 120 | 120 | None |

TABLE 3

|  |  | Pw4 Initialization voltage pulse A | | Pw5 Initialization voltage pulse B | | Response (495 nm) | Response (610 nm) | In plane color |
|---|---|---|---|---|---|---|---|---|
|  |  | V | sec | V | sec | sec | sec | unevenness |
| Ex. | P07 | 0.6 | 4 | 0 | 3 | 4 | 4 | None |
|  | P08 | 0.3 | 4 | 0 | 4 | 5.5 | 5 | None |
| Comp. Ex. | R03 | — | — | 0 | 10 | 6.5 | 6.5 | None |

As presented in Table 3, according to the driving patterns P07 and P08, which corresponded to Examples of the present disclosure, a lapse of time until initialization response was 6 seconds or shorter with both the oxidization-reactive electrochromic layer and the reduction-reactive electrochromic layer. According to the driving pattern R03, which corresponded to Comparative Example of the present disclosure, on the other hand, the initialization voltage pulse A (Pw4) was not applied, and a lapse of time until initialization response was 6 seconds or longer. Therefore, it was found that responsiveness could be improved by driving the electrochromic device according to the initialization driving pattern described in the present disclosure.

In the evaluations presented in Table 3, in case of the oxidation-reactive electrochromic layer, the time from the application of the initialization driving voltage to the point when the transmittance at the coloring peak wavelength (495 nm) was to be about 80% or greater, at which the transmittance was stabilized, was evaluated. In the evaluations presented in Table 3, in case of the reduction-reactive electrochromic layer, similarly, the time from the application of the initialization driving voltage to the point when the transmittance at the coloring peak wavelength (610 nm) was to be about 80% or greater, at which the transmittance was stabilized, was evaluated.

Figure 13A:
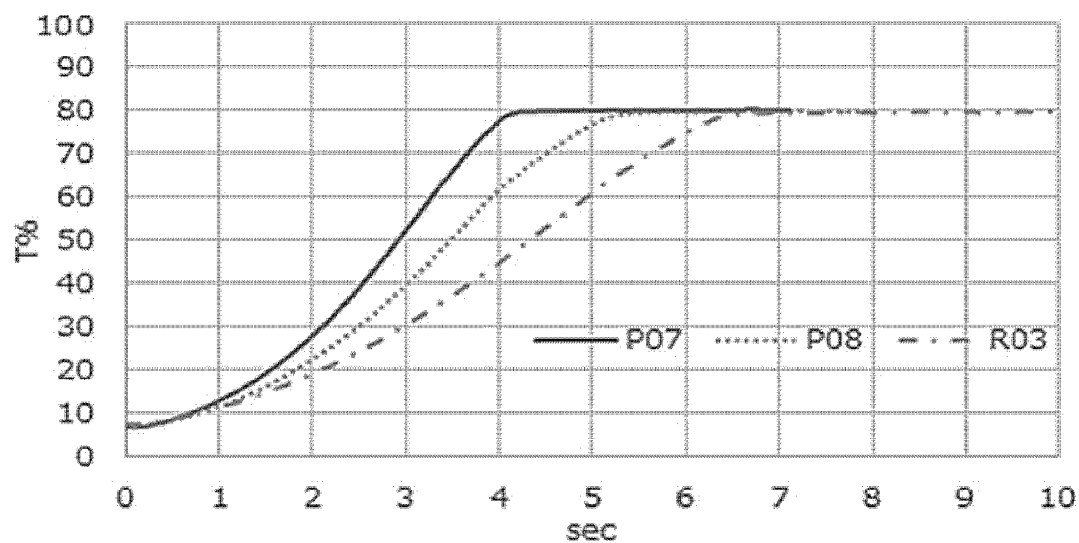
FIG. 13A is a graph depicting transmittance spectra of an oxidization-reactive electrochromic layer with light at a coloring peak wavelength when the electrochromic device of Production Example 1 is driven to perform initialization.
Figure 13B:
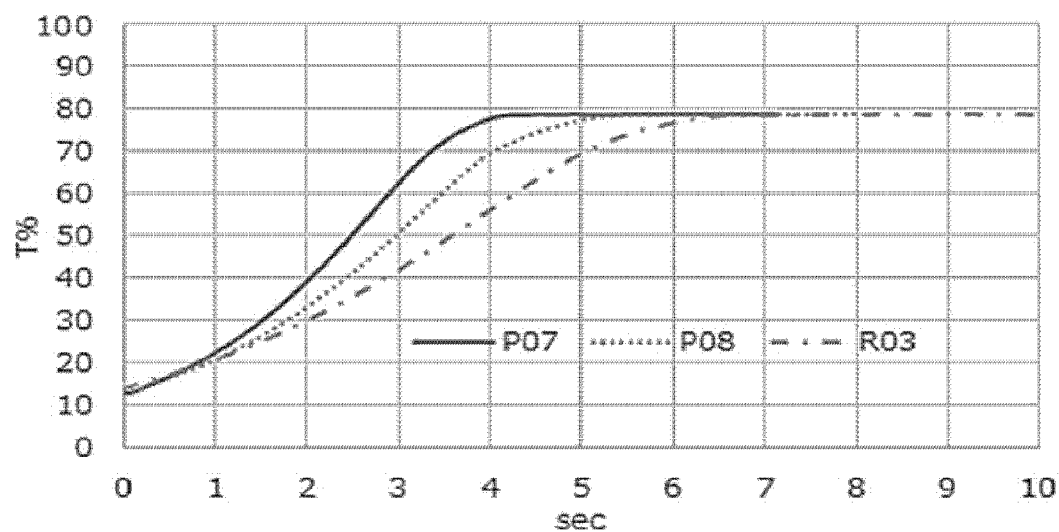
FIG. 13B is a graph depicting transmittance spectra of a reduction-reactive electrochromic layer with light at a coloring peak wavelength when the electrochromic device of Production Example 1 is driven to perform initialization.

FIG. 13A is a graph depicting a change in light transmittance over time with a coloring peak wavelength of the oxidation-reactive electrochromic layer when the electrochromic device A of Production Example 1 was driven to perform the initialization. FIG. 13B is a graph depicting a change in light transmittance over time with a coloring peak wavelength of the reduction-reactive electrochromic layer when the electrochromic device A of Production Example 1 was driven to perform the initialization. In FIGS. 13A and 13B, the vertical axis represents a transmittance spectrum, and the horizontal axis represents the time from the application of the driving voltage is started.

As depicted in FIGS. 13A and 13B, it was found that responsiveness of the electrochromic layer could be improved according to the driving patterns P07 and P08.

<Durability Evaluation>

Next, under the light exposure state achieved using a light exposure device Q-SUN (Xe-1, available from Q-LAB Corporation) (under the environment of 38,000 Lux and 30° C.), Electrochromic Device A was continuously driven to color for 50 hours in total according to the driving conditions presented in Table 4 below (corresponding to the first driving pattern and the initialization driving pattern). Thereafter, Electrochromic Device 4 was driven to decolor. Under the above-described conditions, a change in the transmittance in the decolored state was measured to evaluate durability. When the electrochromic device was exposed to light, the light was applied from the side of the first transparent support 11. In each of the driving patterns P09 and P10, each of Pw2-1 and Pw3-1 was repeated 450 times (400 seconds in total) to continuously drive the electrochromic device for 50 hours. The measurement results are presented in Table 4.

TABLE 4

|  |  | Pw1-1 First voltage pulse A | | Pw2-1 First voltage pulse B | Pw3-1 Open-circuit | Pw4 Initialization voltage pulse A | | Pw5 Initialization voltage pulse B | | Initial T % 430 nm | T % after 50 h 430 nm |
|---|---|---|---|---|---|---|---|---|---|---|---|
|  |  | V | sec | V | sec | V | sec | V | sec | % | % |
| Ex. | P09 | −1.6 | 11 | −1.2 | 20 sec | 380 | 0.6 | 4 | 0 | 20 | 80 | 75 |
|  | P10 | −1.2 | 16 | −1.2 | 20 sec | 380 | 0.6 | 4 | 0 | 20 | 80 | 76 |
| Comp. Ex. | R04 | — | — | −1.2 | 50 h | — | — | — | 0 | 120 | 80 | 68 |

As presented in Table 4, according to the driving patterns P09 and P10, which corresponded to Examples of the present disclosure, the reduction in the transmittance of the decolored state was small after the continuous operation, and it was found that the electrochromic layer did not tend to deteriorate the coloring state thereof. Accordingly, it was found that durability at the time when the electrochromic device was continuously driven over a long period of time could be improved by driving the electrochromic device according to the initialization driving pattern described in the present disclosure. Moreover, according to the driving patterns P09 and P10, which corresponded to Examples of the present disclosure, electricity consumption at the time when the electrochromic device was continuously driven over a long period of time could be kept low because the driving patterns P09 and P10 were each the driving pattern where voltage was not applied and the electrochromic device was turned into the open-circuit state.

Production Example 2

<Production of Electrochromic Device B>

In Production Example 2, Electrochromic Device B having an electrochromic reaction range (100 mm×100 mm) was produced in the same manner as in Production Example 1, except the size of the support, the size of the film, and resistance of the electrode.

<<Formation of First Electrode and Electrochromic Layer>>

As a first transparent support 11, a square glass substrate having a side of 110 mm and an average thickness of 0.7 mm was prepared.

An ITO film having an average thickness of about 200 nm was formed on the region (110 mm×100 mm) of the first transparent substrate 11 by sputtering to form a first transparent electrode 12. The sheet resistance of the first transparent electrode 12 was 15 Ω/□.

Moreover, an AgPdCu alloy film (available from FURUYA METAL Co., Ltd.) having an average thickness of about 100 nm was formed on the region (100 mm×2 mm) of the edge of the first transparent electrode 12 and the region (5 mm×2 mm) of the first transparent electrode 12 by sputtering, to thereby form a first auxiliary electrode 18.

Next, an oxidation reactive electrochromic layer 13 having the same composition to that in Production Example 1 was formed on the electrochromic region (100 mm×100 mm) on a surface of the ITO film of the oxidation reactive electrochromic layer 13.

<<Formation of Second Electrode and Antidegradation Layer>>

A second transparent support 16 having the same shape as the first transparent support 11 was prepared. In the same manner as the formation of the first transparent electrode 12 and the first auxiliary electrode 18, a second transparent electrode 15 and a second auxiliary electrode 19 were formed.

Next, a tin oxide particle film was formed on an electrochromic reaction region (100 mm×100 mm) on a surface of the ITO film, and a reduction reactive electrochromic compound having the same composition to that in Production Example 1 was born or (adsorbed) on the tin oxide particle film, to thereby form a reduction reactive electrochromic layer that also functioned as an antidegradation layer 21.

<<Formation and Bonding of Solid Electrolyte Layer>>

An electrolyte solution produced in the same manner as in Production Example 1 was applied to the electrochromic reaction region (100 mm×100 mm) on the surface of the insulation inorganic particle layer of the second transparent support 16. Then, a UV curable resin (TB3035B, available from ThreeBond Holdings Co., Ltd.) was applied to the circumferential area of the applied electrolyte solution. Under the reduced pressure, the resultant was bonded to the surface of the electrochromic layer 13 on the first transparent support 11, and the UV curable resin was cured by ultraviolet ray (UV) irradiation, to thereby form a solid electrolyte layer 14 and a protective layer 17. The film thickness of the solid electrolyte layer 14 and the film thickness of the protective layer 17 were adjusted to have the average thickness of 50 μm by controlling the bonding gap, to thereby produce Electrochromic Electrode B. Note that, the average distance between the first auxiliary electrode 18 and the second auxiliary electrode 19 in Electrochromic Element A was 100 mm.

<<Connection of Driving Circuit>>

A driving circuit 20 was connected to the first auxiliary electrode 18 and second auxiliary electrode 19 of Electrochromic Element B, to thereby produce Electrochromic Device B as illustrated in FIGS. 6A and 6B. Note that, the driving circuit 20 was connected in a manner that the first auxiliary electrode 18 of the first transparent support 11 was to have positive polarity, and the second auxiliary electrode 19 of the second transparent support 16 was to have negative polarity.

<<Operation According to First Driving Pattern>>

Next, a transmittance spectrum was measured at 2 points, i.e., the center area of the electrochromic reaction region and the position 5 mm from the edge (the position 5 mm from the auxiliary electrode of the substrate onto which the electrochromic layer had been formed, and the center area of the electrochromic layer in the minor axial direction where the auxiliary electrode was not formed), while coloring Electrochromic Device B, which had been turned into the decolored state, under the driving conditions for increasing the coloring density presented in Table 5 below (first driving pattern). The time required to stabilize a colored state of the oxidation reactive or reduction reactive electrochromic layer was measured as an index for responsiveness. The results are presented in Table 5 and FIGS. 14A and 14B. As the colored state of Electrochromic Device B, the state where voltage of −1.2 V was applied was determined as the stable state.

TABLE 5

| | | Measuring position | Pw1-1 V | Pw1-1 sec | Pw2-1 V | Pw2-1 sec | Pw3-1 sec | Response (495 nm) sec | Response (610 nm) Sec | In-plane color unevenness |
|---|---|---|---|---|---|---|---|---|---|---|
| Ex. | P11 | Center | −1.6 | 11 | −1.2 | 49 | 120 | 60 | 60 | None |
| | P12 | 5 mm from auxiliary electrode | −1.6 | 11 | −1.2 | 49 | 120 | 60 | 60 | None |
| Comp. Ex. | R05 | Center | — | — | −1.2 | 19 | 120 | 180 | 180 | None |
| | R06 | 5 mm from auxiliary electrode | — | — | −1.2 | 19 | 120 | 180 | 180 | None |

As presented in Table 5, according to the driving patterns P11 and P12, which corresponded to Examples of the present disclosure, a lapse of time until coloring response was 60 seconds with both the oxidation-reactive electrochromic layer and the reduction-reactive electrochromic layer. According to the driving patterns R05 and R06, which corresponded to Comparative Examples of the present disclosure, on the other hand, the first voltage pulse A (Pw1-1) was not applied, and a lapse of time until color response was 180 seconds or longer. Therefore, it was found that responsiveness could be improved by driving the electrochromic device according to the first driving pattern described in the present disclosure.

In the evaluations presented in Table 5, in case of the oxidation-reactive electrochromic layer, the time from the application of the driving voltage to the point when the variations of the transmittance at the coloring peak wavelength of 495 nm within 10 seconds was stabilized to 1% or less was evaluated. In the evaluations presented in Table 5, in case of the reduction-reactive electrochromic layer, similarly, the time from the application of the driving voltage to the point when the variations of the transmittance at the coloring peak wavelength of 610 nm within 10 seconds was stabilized to 1% or less was evaluated.

Moreover, it was confirmed that, according to the driving patterns P11 and P12, there was no unevenness in the colored state under the visual observation, and the coloring density was maintained even in the open-circuit state, even though the driving patterns P11 and P12 included a pattern where voltage was not applied, and the open-circuit state was maintained.

Moreover, a problem that the density of the center area became lower than the density of the edge due to the reduction in voltage did not occur in both the center area and edge of the electrochromic reaction region, and high uniformity of the coloring density was obtained.

Figure 14A:
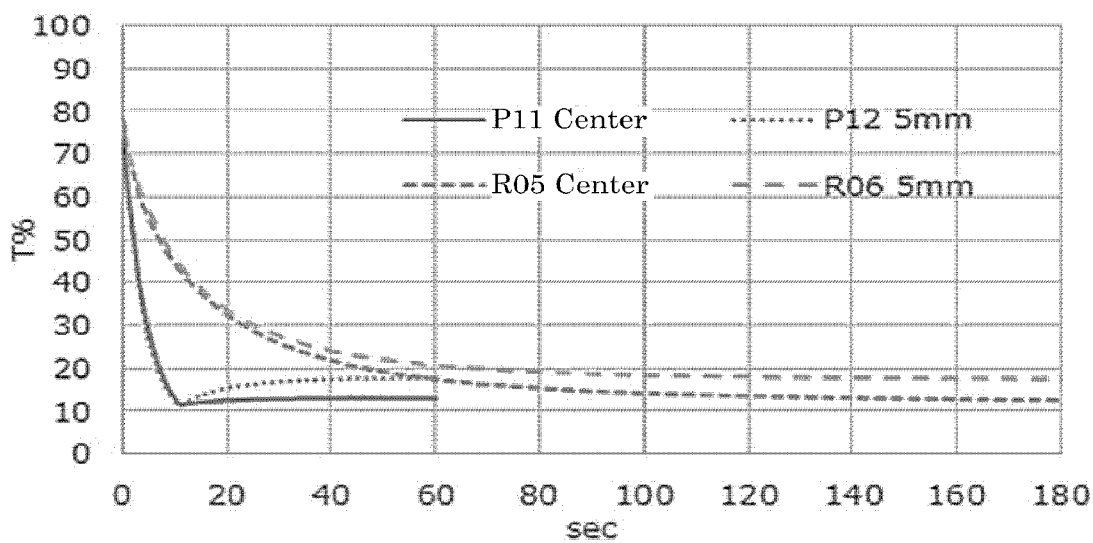
FIG. 14A is a graph depicting transmittance spectra of an oxidization-reactive electrochromic layer with light at a coloring peak wavelength when the electrochromic device of Production Example 2 is driven to increase coloring density.
Figure 14B:
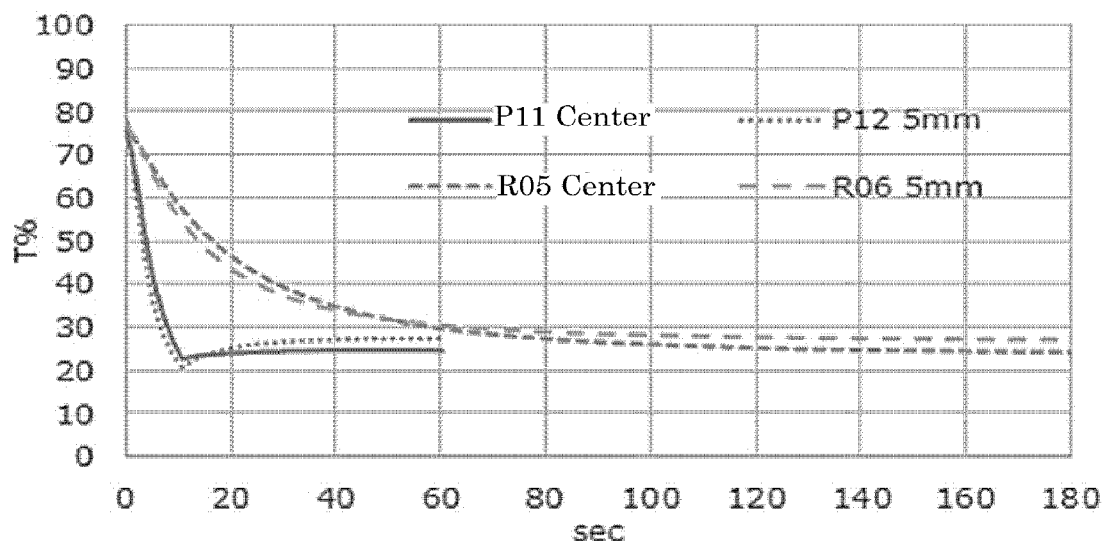
FIG. 14B is a graph depicting transmittance spectra of a reduction-reactive electrochromic layer with light at a coloring peak wavelength when the electrochromic device of Production Example 2 is driven to increase coloring density.

FIG. 14A is a graph depicting a change in light transmittance over time with a coloring peak wavelength of the oxidization-reactive electrochromic layer when the electrochromic device B of Production Example 2 is driven to increase the coloring density. FIG. 14B is a graph depicting a change in light transmittance over time with a coloring peak wavelength of the reduction-reactive electrochromic layer when the electrochromic device B of Production Example 2 is driven to increase the coloring density. In FIGS. 14A and 14B, the vertical axis represents a transmittance spectrum, and the horizontal axis represents the time from the application of the driving voltage is started.

As depicted in FIG. 14A and FIG. 14B, it was found that responsiveness of the electrochromic layer could be improved, and differences in responsiveness between the center area and edge of the electrochromic reaction region was small according to the driving patterns P11 and P12.

Production Example 3

<Production of Electrochromic Device C>
In Production Example 3, Electrochromic Device C having an electrochromic reaction region (150 mm×150 mm) was produced in the same manner as in Production Example 1, except the following points. Electrochromic Device C is an equivalent to Comparative Example of the present disclosure.

As a first transparent support 11, a square glass substrate having a side of 160 mm and an average thickness of 0.7 mm was prepared. An ITO film having an average thickness of about 100 nm was formed on the region (160 mm×150 mm) of the first transparent substrate 11 by sputtering to form a first transparent electrode 12. The sheet resistance of the first transparent electrode 12 was 15 Ω/□.

Moreover, an AgPdCu alloy film (available from FURUYA METAL Co., Ltd.) having an average thickness of about 100 nm was formed on the region (150 mm×2 mm) of the edge of the first transparent electrode 12 and the region (5 mm×2 mm) of the first transparent electrode 12 by sputtering, to thereby form a first auxiliary electrode 18.

A second transparent support 16, to which a second transparent electrode 15 and a second auxiliary electrode 19 had been formed, was produced in the same manner as described above, and the second transparent support 16 was provided. The electrode side of the second transparent support was arranged to the electrode side of the first transparent support, and a UV curable resin (TB3035B, available from ThreeBond Holdings Co., Ltd.) with a thickness of 120 μm as a gap was formed at the periphery of the electrochromic reaction region (150 mm×150 mm) as a protective layer. A hole was formed in part of the protective layer as an injection hole for an electrochromic solution. After vacuum injecting the following electrochromic solution, the hole was filled with the UV curable resin.
<Electrochromic Solution>
After dissolving the following 3 components in propylene carbonate, filtering (pore size: 0.2 μm) was performed.
1,1'-Diheptyl-4,4'-bipyridinium Dibromide (available from Tokyo Chemical Industry Co., Ltd.): 40 mM
5,10-Dihydro-5,10-dimethylphenazine (available from Tokyo Chemical Industry Co., Ltd.): 40 mM
Tetrabutylammonium tetrafluoroborate (available from Tokyo Chemical Industry Co., Ltd.): 0.1 M A driving circuit 20 was connected to the first auxiliary electrode 18 and second auxiliary electrode 19 of Electrochromic Element C produced by bonding the support to each other, to thereby produce Electrochromic Device C that was an equivalent to Comparative Example of the present disclosure. Note that, the driving circuit 20 was connected in a manner that the first auxiliary electrode 18 of the first transparent support 11 was to have positive polarity, and the second auxiliary electrode 19 of the second transparent support 16 was to have negative polarity. The average distance between the first auxiliary electrode 18 and the second auxiliary electrode 19 in Electrochromic Element C was 150 mm.

Coloring properties of Electrochromic Device C obtained were confirmed.

Specifically, a transmittance spectrum was measured at 2 points, i.e., a center area of the electrochromic reaction region, and 5 mm from the edge (the position that was 5 mm from the auxiliary electrode of the substrate to which the electrochromic layer had been formed, and a center in the minor axial direction of the area where the auxiliary electrode had not been formed), while coloring Electrochromic Device C under the driving conditions of the driving patterns P11 and R05 presented in Table 5. The coloring peak wavelength of Electrochromic Device C was 605 nm.

As a result of the measurement above, according to the driving pattern R05, the center area of the electrochromic reaction region did not color (coloring density did not increase), although the transmittance (605 nm) of the position that was 5 mm from the edge of the electrochromic layer was 30%.

Moreover, it was confirmed that the color on the position that was 5 mm from the edge of the electrochromic layer was decolored by PW3-1 (open-circuit) of the driving pattern P11. It was therefore found that Electrochromic Device C, which corresponded to Comparative Example of the present disclosure, could not exhibit a memory effect and coloring density could not be maintained, as Electrochromic Device C was attempted to be driven with the driving pattern including an open-circuit state in order to drive with low electricity consumption. The memory effect is an effect where a colored state or decolored state is maintained for a certain period without applying voltage.

As described above, the electrochromic device of the present disclosure includes a first electrode, a first auxiliary electrode formed to be in contact with the first electrode, a second electrode, a second auxiliary electrode formed to be in contact with the second electrode and to have an average distance of 100 mm or less with the first auxiliary electrode, an electrochromic layer formed to be in contact with the first electrode, or the second electrode, or both, but not to be in contact with the first auxiliary electrode and the second auxiliary electrode, a solid electrolyte layer formed to be in contact with at least one selected from the group consisting of the first electrode, the second electrode, and the electrochromic layer, but not to be in contact with the first auxiliary electrode and the second auxiliary electrode, and a controlling unit configured to control to apply voltage to the electrochromic layer with the first electrode and the second electrode according to a driving pattern that is at least one selected from the group consisting of a first driving pattern, a second driving pattern, and an initialization driving pattern.

In the electrochromic device of the present disclosure, moreover, the first driving pattern is a driving pattern configured to turn the electrochromic layer into a first coloring state, and the first driving pattern is a driving pattern configured to apply a first voltage pulse A for increasing a response speed of the electrochromic layer, to apply a first voltage pulse B for forming the first coloring state where the first voltage pulse B is lower than the first voltage pulse A, and then to maintain a state where voltage is not applied.

In the electrochromic device of the present disclosure, moreover, the second driving pattern is a driving pattern configured to turn the first coloring state into a second coloring state that has coloring density lower than coloring density of the first coloring state, and the second driving pattern is a driving pattern configured to apply a second voltage pulse A for increasing a response speed of the electrochromic layer, and then to maintain a state where voltage is not applied.

In the electrochromic device of the present disclosure, furthermore, the initialization driving pattern is a driving pattern configured to form an initial decolored state, and a driving pattern configured to apply initialization voltage pulse A that has reverse polarity to the polarity of the first voltage pulse A and is for increasing a response speed of the electrochromic layer, and then to apply initialization voltage pulse B that is for forming an initial decolored state and makes potential of the electrochromic layer substantially 0 V, or to cause a short-circuit. Therefore, the electrochromic device of the present disclosure has high responsiveness and uniformity of coloring density when coloring and decoloring driving is performed, has high strength and safety against externally applied impacts, has excellent durability when the electrochromic device is continuously driven over a long period of time, and can keep electricity consumption thereof low.

For example, embodiments of the present disclosure are as follows.

<1> An electrochromic device including:
a first electrode;
a first auxiliary electrode formed to be in contact with the first electrode;
a second electrode;
a second auxiliary electrode formed to be in contact with the second electrode and to have an average distance of 100 mm or less with the first auxiliary electrode;
an electrochromic layer formed to be in contact with the first electrode, or the second electrode, or both, but not to be in contact with the first auxiliary electrode and the second auxiliary electrode;
a solid electrolyte layer formed to be in contact with at least one selected from the group consisting of the first electrode, the second electrode, and the electrochromic layer, but not to be in contact with the first auxiliary electrode and the second auxiliary electrode; and
a controlling unit configured to control to apply voltage to the electrochromic layer with the first electrode and the second electrode according to a driving pattern that is at least one selected from the group consisting of a first driving pattern, a second driving pattern, and an initialization driving pattern,
wherein the first driving pattern is a driving pattern configured to turn the electrochromic layer into a first coloring state, and the first driving pattern is a driving pattern configured to apply a first voltage pulse A for increasing a response speed of the electrochromic layer, to apply a first voltage pulse B for forming the first coloring state where the first voltage pulse B is lower than the first voltage pulse A, and then to maintain a state where voltage is not applied,
wherein the second driving pattern is a driving pattern configured to turn the first coloring state into a second coloring state that has coloring density lower than coloring density of the first coloring state, and the second driving pattern is a driving pattern configured to apply a second voltage pulse A for increasing a response speed of the electrochromic layer, to apply a second voltage pulse B for forming the second coloring state where the second voltage pulse B is higher than the second voltage pulse A or has reverse polarity to the polarity of the second voltage pulse A, and then to maintain a state where voltage is not applied, and
wherein the initialization driving pattern is a driving pattern configured to form an initial decolored state, and the initialization driving pattern is a driving pattern configured to apply initialization voltage pulse A that has reverse polarity to the polarity of the first voltage pulse A and is for increasing a response speed of the electrochromic layer, and then to apply initialization voltage pulse B that is for forming an initial decolored state and makes potential of the electrochromic layer substantially 0 V, or to cause a short-circuit.

<2> The electrochromic device according to <1>,
wherein the controlling unit is configured to repeat either: applying the first voltage pulse B, and maintaining the state where voltage is not applied after applying the first voltage pulse B; or applying the second voltage pulse B, and maintaining the state where voltage is not applied after applying the second voltage pulse B, in the first driving pattern, or the second driving pattern, or both.

<3> The electrochromic device according to <1> or <2>,
wherein each of the first auxiliary electrode and the second auxiliary electrode includes a metal material.

<4> The electrochromic device according to any one of <1> to <3>,
wherein the first auxiliary electrode is positioned at one side of the electrochromic layer and the second auxiliary electrode is positioned at another side of the electrochromic layer facing the one side.

<5> The electrochromic device according to any one of <1> to <4>,
wherein an average voltage of the first voltage pulse B and the second voltage pulse B is 1.23 V or less.

<6> The electrochromic device according to any one of <1> to <5>, further including:
a measuring unit configured to measure open-circuit voltage between the first electrode and the second electrode,
wherein the measuring unit is configured to vary pulse properties of the first voltage pulse B and the second voltage pulse B according to the open-circuit voltage measured by the measuring unit when the controlling unit maintains the state where voltage is not applied in the first driving pattern and the second driving pattern.
<7> The electrochromic device according to any one of <1> to <6>,
wherein the solid electrolyte layer includes a solid solution including a matrix polymer and an ionic liquid.
<8> The electrochromic device according to any one of <1> to <7>,
wherein the electrochromic layer includes a compound that can undergo a two-electron transfer reaction.
<9> The electrochromic device according to any one of <1> to <8>,
wherein the electrochromic device includes two electrochromic layers each of which is the electrochromic layer,
wherein one of the electrochromic layers is a first electrochromic layer including an electrochromic material capable of coloring in an oxidized state, and
wherein the other electrochromic layer is a second electrochromic layer including an electrochromic material capable of coloring in a reduced state.
<10> The electrochromic device according to any one of <1> to <9>,
wherein the state where voltage is not applied is maintained between application of the first voltage pulse A and application of the first voltage pulse B, between application of the second voltage pulse A and application of the second voltage pulse B, between application of the initialization voltage pulse A and application of the initialization voltage pulse B, or between application of the initialization voltage pulse A and the short-circuit, or any combination of the above-listed timings.
<11> A wearable device including:
the electrochromic device according to any one of <1> to <10>.
<12> The wearable device according to <11>,
wherein the wearable device is in the shape of a pair of spectacles.
<13> A method for driving an electrochromic device, the method including:
controlling to apply voltage to an electrochromic layer with a first electrode and a second electrode according to a driving pattern that is at least one selected from the group consisting of a first driving pattern, a second driving pattern, and an initialization driving pattern,
wherein the electrochromic device includes:
the first electrode;
a first auxiliary electrode formed to be in contact with the first electrode;
the second electrode;
a second auxiliary electrode formed to be in contact with the second electrode and to have an average distance of 100 mm or less with the first auxiliary electrode;
the electrochromic layer formed to be in contact with the first electrode, or the second electrode, or both, but not to be in contact with the first auxiliary electrode and the second auxiliary electrode; and a solid electrolyte layer formed to be in contact with at least one selected from the group consisting of the first electrode, the second electrode, and the electrochromic layer, but not to be in contact with the first auxiliary electrode and the second auxiliary electrode,
wherein the first driving pattern is a driving pattern configured to turn the electrochromic layer into a first coloring state, and the first driving pattern is a driving pattern configured to apply a first voltage pulse A for increasing a response speed of the electrochromic layer, to apply a first voltage pulse B for forming the first coloring state where the first voltage pulse B is lower than the first voltage pulse A, and then to maintain a state where voltage is not applied,
wherein the second driving pattern is a driving pattern configured to turn the first coloring state into a second coloring state that has coloring density lower than coloring density of the first coloring state, and the second driving pattern is a driving pattern configured to apply a second voltage pulse A for increasing a response speed of the electrochromic layer, and then to maintain a state where voltage is not applied, and wherein the initialization driving pattern is a driving pattern configured to form an initial decolored state, and the initialization driving pattern is a driving pattern configured to apply initialization voltage pulse A that has reverse polarity to the polarity of the first voltage pulse A and is for increasing a response speed of the electrochromic layer, and then to apply initialization voltage pulse B that is for forming an initial decolored state and makes potential of the electrochromic layer substantially 0 V, or to cause a short-circuit.

The electrochromic device according to any one of <1> to <10>, the wearable device according to <11> or <12>, and the method for driving an electrochromic device according to <13> can solve the above-described various problems existing in the art and can achieve the object of the present disclosure.

What is claimed is:
1. An electrochromic device comprising:
a first electrode;
a first auxiliary electrode in direct contact with and on the first electrode;
a second electrode;
a second auxiliary electrode in contact with the second electrode and to have an average distance of 100 mm or less with the first auxiliary electrode, and the first auxiliary electrode and the second auxiliary electrode do not overlap with each other on a plan view;
an electrochromic layer in contact with the first electrode, or the second electrode, or both, but not to be in direct contact with the first auxiliary electrode and the second auxiliary electrode;
a solid electrolyte layer in contact with at least one selected from the group consisting of the first electrode, the second electrode, and the electrochromic layer, but not to be in direct contact with the first auxiliary electrode and the second auxiliary electrode; and
a controller configured to control to apply voltage to the electrochromic layer with the first electrode and the second electrode according to a driving pattern that is at least one selected from the group consisting of a first driving pattern, a second driving pattern, and an initialization driving pattern,
wherein the first driving pattern is a driving pattern configured to turn the electrochromic layer into a first coloring state, and the first driving pattern is a driving pattern configured to apply a first voltage pulse A for increasing a response speed of the electrochromic layer, to apply a first voltage pulse B for forming the first coloring state where the first voltage pulse B is lower than the first voltage pulse A, and then to maintain a state where voltage is not applied, wherein the second driving pattern is a driving pattern configured to turn the first coloring state into a second coloring state that has coloring density lower than coloring density of the first coloring state, and the second driving pattern is a driving pattern configured to apply a second voltage pulse A for increasing a response speed of the electrochromic layer, to apply a second voltage pulse B for forming the second coloring state where the second voltage pulse B is higher than the second voltage pulse A or has reverse polarity to the polarity of the second voltage pulse A, and then to maintain a state where voltage is not applied, and wherein the initialization driving pattern is a driving pattern configured to form an initial decolored state, and the initialization driving pattern is a driving pattern configured to apply initialization voltage pulse A that has reverse polarity to the polarity of the first voltage pulse A and is for increasing a response speed of the electrochromic layer, and then to apply initialization voltage pulse B that is for forming an initial decolored state and makes potential of the electrochromic layer substantially 0 V, or to cause a short-circuit.

2. The electrochromic device according to claim 1, wherein the controller is configured to repeat either:

applying the first voltage pulse B, and maintaining the state where voltage is not applied after applying the first voltage pulse B; or applying the second voltage pulse B, and maintaining the state where voltage is not applied after applying the second voltage pulse B, in the first driving pattern, or the second driving pattern, or both.

3. The electrochromic device according to claim 1, wherein each of the first auxiliary electrode and the second auxiliary electrode includes a metal material.

4. The electrochromic device according to claim 1, wherein the first auxiliary electrode is positioned at one side of the electrochromic layer and the second auxiliary electrode is positioned at another side of the electrochromic layer facing the one side.

5. The electrochromic device according to claim 1, wherein an average voltage of the first voltage pulse B and the second voltage pulse B is 1.23 V or less.

6. The electrochromic device according to claim 1, further comprising:

a measurer to measure open-circuit voltage between the first electrode and the second electrode, wherein the measurer varies pulse properties of the first voltage pulse B and the second voltage pulse B according to the open-circuit voltage measured by the measurer when the controller maintains the state where voltage is not applied in the first driving pattern and the second driving pattern.

7. The electrochromic device according to claim 1, wherein the solid electrolyte layer includes a solid solution including a matrix polymer and an ionic liquid.

8. The electrochromic device according to claim 1, wherein the electrochromic layer includes a compound that can undergo a two-electron transfer reaction.

9. The electrochromic device according to claim 1, wherein the electrochromic device includes two electrochromic layers each of which is the electrochromic layer, wherein one of the electrochromic layers is a first electrochromic layer including an electrochromic material capable of coloring in an oxidized state, and wherein the other electrochromic layer is a second electrochromic layer including an electrochromic material capable of coloring in a reduced state.

10. The electrochromic device according to claim 1, wherein the state where voltage is not applied is maintained between application of the first voltage pulse A and application of the first voltage pulse B, between application of the second voltage pulse A and application of the second voltage pulse B, between application of the initialization voltage pulse A and application of the initialization voltage pulse B, or between application of the initialization voltage pulse A and the short-circuit, or any combination of the above-listed timings.

11. A wearable device comprising:

the electrochromic device according to claim 1.

12. The wearable device according to claim 11, wherein the wearable device is in the shape of a pair of spectacles.

13. A method for driving an electrochromic device, the method comprising:

controlling to apply voltage to an electrochromic layer with a first electrode and a second electrode according to a driving pattern that is at least one selected from the group consisting of a first driving pattern, a second driving pattern, and an initialization driving pattern, wherein the electrochromic device includes:

the first electrode;

a first auxiliary electrode in contact with the first electrode;

the second electrode;

a second auxiliary electrode in contact with the second electrode and to have an average distance of 100 mm or less with the first auxiliary electrode, and the first auxiliary electrode and the second auxiliary electrode do not overlap with each other on a plan view;

the electrochromic layer in contact with the first electrode, or the second electrode, or both, but not to be in direct contact with the first auxiliary electrode and the second auxiliary electrode; and a solid electrolyte layer in contact with at least one selected from the group consisting of the first electrode, the second electrode, and the electrochromic layer, but not to be in direct contact with the first auxiliary electrode and the second auxiliary electrode, wherein the first driving pattern is a driving pattern configured to turn the electrochromic layer into a first coloring state, and the first driving pattern is a driving pattern configured to apply a first voltage pulse A for increasing a response speed of the electrochromic layer, to apply a first voltage pulse B for forming the first coloring state where the first voltage pulse B is lower than the first voltage pulse A, and then to maintain a state where voltage is not applied, wherein the second driving pattern is a driving pattern configured to turn the first coloring state into a second coloring state that has coloring density lower than coloring density of the first coloring state, and the second driving pattern is a driving pattern configured to apply a second voltage pulse A for increasing a response speed of the electrochromic layer, and then to maintain a state where voltage is not applied, and wherein the initialization driving pattern is a driving pattern configured to form an initial decolored state, and the initialization driving pattern is a driving pattern configured to apply initialization voltage pulse A that has reverse polarity to the polarity of the first voltage pulse A and is for increasing a response speed of the electrochromic layer, and then to apply initialization voltage pulse B that is for forming an initial decolored state and makes potential of the electrochromic layer substantially 0 V, or to cause a short-circuit.

\* \* \* \* \*